US010531097B2

(12) United States Patent
Nakamura et al.

(10) Patent No.: US 10,531,097 B2
(45) Date of Patent: Jan. 7, 2020

(54) PICTURE CODING DEVICE, PICTURE CODING METHOD, AND PICTURE CODING PROGRAM

(71) Applicant: JVC KENWOOD Corporation, Yokohama-shi (JP)

(72) Inventors: Hiroya Nakamura, Yokosuka (JP); Shigeru Fukushima, Yokosuka (JP)

(73) Assignee: JVC KENWOOD Corporation, Yokohama-shi (JP)

(*) Notice: Subject to any disclaimer, the term of this patent is extended or adjusted under 35 U.S.C. 154(b) by 0 days.

(21) Appl. No.: 16/229,291

(22) Filed: Dec. 21, 2018

(65) Prior Publication Data
US 2019/0116363 A1 Apr. 18, 2019

Related U.S. Application Data

(63) Continuation of application No. 15/943,827, filed on Apr. 3, 2018, now Pat. No. 10,200,693, which is a (Continued)

(30) Foreign Application Priority Data

Jun. 20, 2011 (JP) .................................. 2011-136641
Jun. 20, 2011 (JP) .................................. 2011-136642

(51) Int. Cl.
*H04N 19/159* (2014.01)
*H04N 19/11* (2014.01)
(Continued)

(52) U.S. Cl.
CPC ........... *H04N 19/159* (2014.11); *H04N 19/11* (2014.11); *H04N 19/157* (2014.11);
(Continued)

(58) Field of Classification Search
CPC ....... H04N 9/641; H04N 7/0135; H04N 7/012
See application file for complete search history.

(56) References Cited

U.S. PATENT DOCUMENTS 5,650,824 A * 7/1997 Huang .................... H04N 7/012
348/450
6,330,665 B1 * 12/2001 Wise ...................... G06F 9/3867
712/300
(Continued)

FOREIGN PATENT DOCUMENTS

WO 2007034601 A1 3/2007

OTHER PUBLICATIONS

ISO/IEC 14496-10 Information Technology-Coding of audio-visual objects—part 10: Advanced Video Coding. [cited in parent].
(Continued)

*Primary Examiner* — Tsion B Owens
(74) *Attorney, Agent, or Firm* — Brundidge & Stanger, P.C.

(57) ABSTRACT

There is provided a picture coding device that performs intra prediction coding of a picture signal including a luma signal and a chroma signal in units of blocks and codes information relating to an intra prediction mode. When the intra prediction of a picture signal is made in units of coding blocks, in a case where a chroma format is 4:2:2, in a mode for setting a chroma intra prediction mode in accordance with the luma intra prediction mode, an intra prediction unit sets the chroma intra prediction mode based on the luma intra prediction mode and the chroma format and makes an intra prediction of the chroma signal.

3 Claims, 28 Drawing Sheets

Related U.S. Application Data continuation of application No. 15/798,728, filed on Oct. 31, 2017, now Pat. No. 9,942,555, which is a continuation of application No. 15/402,640, filed on Jan. 10, 2017, now Pat. No. 9,848,195, which is a continuation of application No. 15/152,998, filed on May 12, 2016, now Pat. No. 9,794,576, which is a continuation of application No. 14/860,246, filed on Sep. 21, 2015, now Pat. No. 9,369,716, which is a continuation of application No. 14/490,286, filed on Sep. 18, 2014, now Pat. No. 9,179,164, which is a continuation of application No. 14/132,423, filed on Dec. 18, 2013, now Pat. No. 8,891,620, which is a continuation of application No. PCT/JP2012/003879, filed on Jun. 14, 2012.

(51) Int. Cl.
| | | |
|---|---|---|
| *H04N 19/176* | (2014.01) | |
| *H04N 19/186* | (2014.01) | |
| *H04N 19/157* | (2014.01) | |
| *H04N 19/70* | (2014.01) | |
| *H04N 19/463* | (2014.01) | |
| *H04N 19/593* | (2014.01) | |
| *H04N 19/172* | (2014.01) | |

(52) U.S. Cl.
CPC ......... *H04N 19/176* (2014.11); *H04N 19/186* (2014.11); *H04N 19/463* (2014.11); *H04N 19/593* (2014.11); *H04N 19/70* (2014.11); *H04N 19/172* (2014.11)

(56) References Cited

U.S. PATENT DOCUMENTS

| | | | | |
|---|---|---|---|---|
| 7,492,950 B2* | 2/2009 | Suzuki | ................. | H04N 11/044 382/232 |
| 8,369,404 B2* | 2/2013 | Sekiguchi | ............. | H04N 19/70 375/240.12 |
| 8,891,620 B2 | 11/2014 | Nakamura | | |
| 8,964,840 B2* | 2/2015 | Min | ........................ | H04N 19/44 375/240.12 |
| 9,179,164 B2 | 11/2015 | Nakamura | | |
| 9,369,716 B2 | 6/2016 | Nakamura | | |
| 9,571,856 B2* | 2/2017 | Sun | ...................... | H04N 19/149 |
| 9,794,576 B2 | 10/2017 | Nakamura | | |
| 9,848,195 B2 | 12/2017 | Nakamura | | |
| 9,942,555 B2 | 4/2018 | Nakamura | | |
| 2013/0039423 A1* | 2/2013 | Helle | ................... | H04N 19/197 375/240.13 |
| 2013/0083846 A1* | 4/2013 | Kumakura | ........... | H04N 19/593 375/240.08 |
| 2013/0272401 A1* | 10/2013 | Seregin | .................. | H04N 19/46 375/240.12 |
| 2014/0003512 A1* | 1/2014 | Sato | ..................... | H04N 19/105 375/240.12 |
| 2014/0056357 A1* | 2/2014 | Tanizawa | .............. | H04N 19/105 375/240.16 |
| 2014/0105291 A1 | 4/2014 | Nakamura | | |
| 2014/0198855 A1* | 7/2014 | Sole Rojals | ......... | H04N 19/176 375/240.16 |
| 2015/0003526 A1 | 1/2015 | Nakamura | | |
| 2016/0014410 A1 | 1/2016 | Nakamura | | |
| 2017/0150155 A1 | 5/2017 | Nakamura | | |
| 2018/0054619 A1 | 2/2018 | Nakamura | | |

OTHER PUBLICATIONS

Thomas Wiegand, et al "WD2: Working Draft 2 of High-Efficiency Video Coding," Joint Collaborative Team on Video Coding (JCT-VC) of ITU-T SG16 WP3 and ISO/IEC JTC/SC29/WG11 JCTVC-D503 _r1, 4th Meeting: Deagu, Korea, Mar. 2011, pp. 1-83. [cited in parent].

L. Dong, et al, "Improved Chroma Intra Mode Signaling," Joint Collaborative Team on Video Coding (JCT-VC) of ITU-TSG16 WP3 and ISO/IEC JTC1/SC29/WG11, JCTVC-D255, 4th Meeting: Deagu, Korea, Jan. 2011, pp. 1-4 [cited in parent].

Jingjing Dai et al, "Improved Signaling and Binarization of Chroma Intra Prediction Mode," Joint Collaborative Team on Video Coding (JCT-VC) of ITU-T SG16 WP3 and ISO/IEC JTC1/SC29/WG11, JCTVC-D278_r2, 4th Meeting: Daegu, Korea, Jan. 2011, pp. 1-5 [cited in parent].

Hiroya Nakamura et al, "Coding order of luma and chrome intra prediction modes," Joint Collaborative Team on Video Coding (JCT-VC) of ITU-T SG16 WP3 and ISO/IEC JTC1/SC29/WG11, JCTVC-F094, 6th Meeting: Torino, Italy, Jul. 2011, pp. 1-21 [cited in parent].

International Search Report and Written Opinion in PCT International Application No. PCT/JP2012/003879, dated Sep. 4, 2012 [cited in parent].

Notification of Reasons for Refusal in Japanese Patent Application No. 2011-136641, dated Aug. 12, 2014, [cited in parent].

* cited by examiner

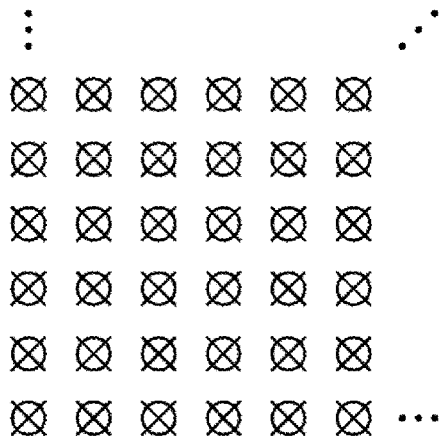
FIG.3C
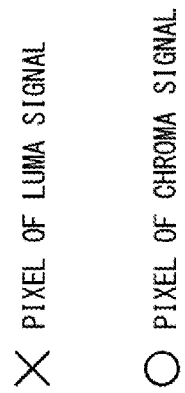
× PIXEL OF LUMA SIGNAL
○ PIXEL OF CHROMA SIGNAL
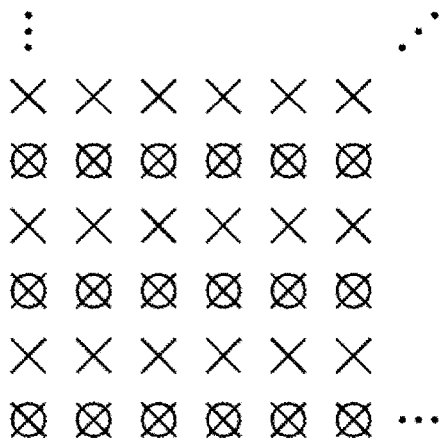
FIG.3B
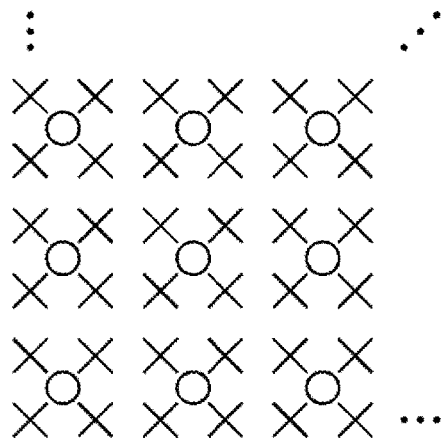
FIG.3E
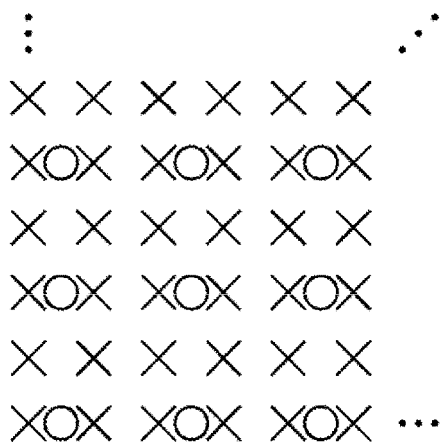
FIG.3A
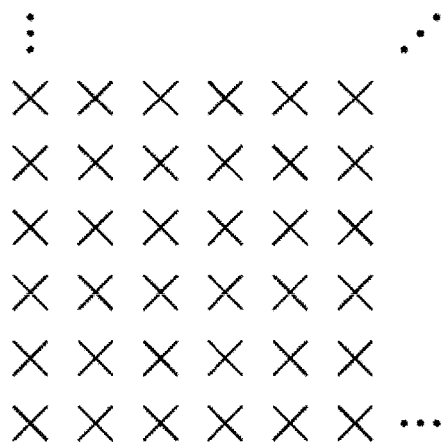
FIG.3D

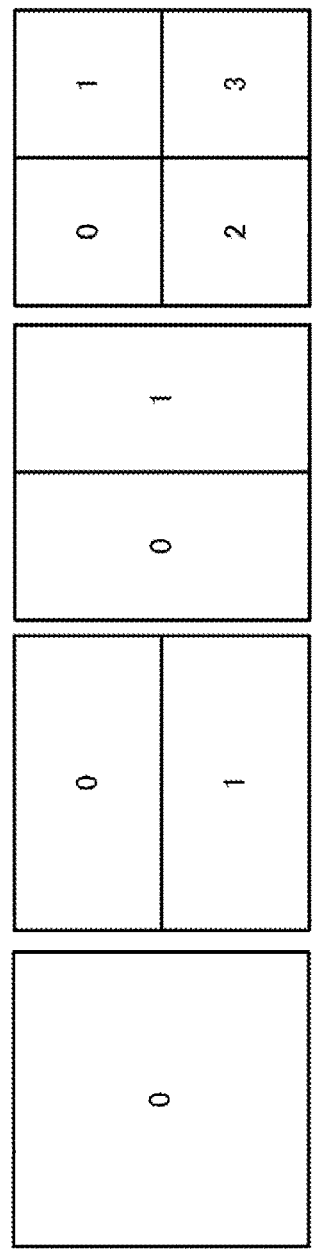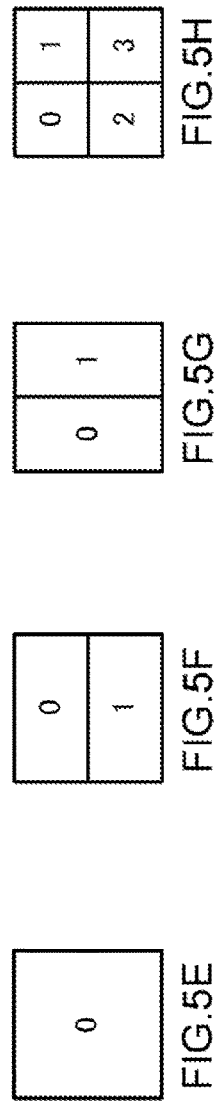

| seq_parameter_set_rbsp( ) { | Descriptor |
|---|---|
| ...... | |
| chroma_format_idc | ue(v) |
| if(chroma_format_idc == 3) | |
| separate_colour_plane_flag | u(1) |
| ...... | |
| } | |

FIG.14

| SYNTAX ELEMENT intra_chroma_pred_mode | LUMA INTRA PREDICTION MODE | | | | |
|---|---|---|---|---|---|
| | 0 | 1 | 2 | 3 | 4...33 |
| 0 (CASE OF 4 : 2 : 0 OR 4 : 4 : 4) | 0 | 1 | 2 | 3 | SAME VALUE AS VALUE OF LUMA INTRA PREDICTION MODE |
| 0 (CASE OF 4 : 2 : 2) | 0 | 1 | 2 | 19 | SEE FIG. 15 |
| 1 | 1 | 0 | 0 | 0 | 0 |
| 2 | 2 | 2 | 1 | 1 | 1 |
| 3 | 3 | 3 | 3 | 2 | 2 |
| 4 | ~ | ~ | ~ | ~ | 3 |

FIG.15

| VALUE OF LUMA INTRA PREDICTION MODE | 0 | 1 | 2 | 3 | 4 | 5 | 6 | 7 | 8 | 9 | 10 | 11 |
|---|---|---|---|---|---|---|---|---|---|---|---|---|
| VALUE OF CHROMA INTRA PREDICTION MODE (4:2:2) | 0 | 1 | 2 | 19 | 11 | 12 | 24 | 26 | 33 | 9 | 20 | 18 |

| VALUE OF LUMA INTRA PREDICTION MODE | 12 | 13 | 14 | 15 | 16 | 17 | 18 | 19 | 20 | 21 | 22 | 23 |
|---|---|---|---|---|---|---|---|---|---|---|---|---|
| VALUE OF CHROMA INTRA PREDICTION MODE (4:2:2) | 22 | 23 | 18 | 28 | 31 | 9 | 4 | 20 | 11 | 0 | 0 | 12 |

| VALUE OF LUMA INTRA PREDICTION MODE | 24 | 25 | 26 | 27 | 28 | 29 | 30 | 31 | 32 | 33 |
|---|---|---|---|---|---|---|---|---|---|---|
| VALUE OF CHROMA INTRA PREDICTION MODE (4:2:2) | 23 | 5 | 10 | 3 | 27 | 15 | 16 | 32 | 9 | 9 |

FIG.16

| CHROMA INTRA PREDICTION MODE | LUMA INTRA PREDICTION MODE | | | | |
|---|---|---|---|---|---|
| | 0 | 1 | 2 | 3 | 4...33 |
| 0 | 0 | 1 | 1 | 1 | 1 |
| 1 | 1 | 0 | 2 | 2 | 2 |
| 2 | 2 | 2 | 0 | 3 | 3 |
| 3 | 3 | 3 | 3 | 0 | 4 |
| 4...33 | – | – | – | – | 0 |

| coding_unit( x0, y0, log2CUSize ) { | Descriptor |
|---|---|
| ...... | |
| x1 = x0 + ( ( 1 << log2CUSize ) >> 1 ) | |
| y1 = y0 + ( ( 1 << log2CUSize ) >> 1 ) | |
| if( PartMode == PART_2Nx2N ) { | |
| prediction_unit( x0, y0, log2CUSize, log2CUSize, 0 , 0 ) | |
| } else if( PartMode == PART_2NxN ) { | |
| prediction_unit( x0, y0, log2CUSize, log2CUSize − 1, 0 , log2CUSize > Log2MinCUSize ) | |
| prediction_unit( x0, y1, log2CUSize, log2CUSize − 1, 1 , 0 ) | |
| } else if( PartMode == PART_Nx2N ) { | |
| prediction_unit( x0, y0, log2CUSize − 1, log2CUSize, 0 , log2CUSize > Log2MinCUSize ) | |
| prediction_unit( x1, y0, log2CUSize − 1, log2CUSize, 1 , 0 ) | |
| } else { /* PART_NxN */ | |
| prediction_unit( x0, y0, log2CUSize − 1, log2CUSize − 1, 0 , 0 ) | |
| prediction_unit( x1, y0, log2CUSize − 1, log2CUSize − 1, 1 , 0 ) | |
| prediction_unit( x0, y1, log2CUSize − 1, log2CUSize − 1, 2 , 0 ) | |
| prediction_unit( x1, y1, log2CUSize − 1, log2CUSize − 1, 3 , 0 ) | |
| } | |
| } | |
| ...... | |
| } | |

FIG.19

| prediction_unit( x0, y0, log2PUWidth, log2PUHeight, PartIdx , InferredMergeFlag ) { | Descriptor |
|---|---|
| ...... | |
| if( PredMode == MODE_INTRA ) { | |
|    prev_intra_luma_pred_flag[ x0 ][ y0 ] | u(1) \| ae(v) |
|    if( prev_intra_luma_pred_flag[ x0 ][ y0 ] ) | |
|      if( NumMPMCand > 1 ) | |
|        mpm_idx[ x0 ][ y0 ] | u(1) \| ae(v) |
|    else | |
|      rem_intra_luma_pred_mode[ x0 ][ y0 ] | ce(v) \| ae(v) |
|    if( ( ChromaArrayType != 0 && PartIdx == 0 ) \|\| ( ChromaArrayType == 2 && PartIdx == 2 ) \|\| ChromaArrayType == 3 ) | |
|      intra_chroma_pred_mode[ x0 ][ y0 ] | ue(v) \| ae(v) |
| } else { /* MODE_INTER */ | |
|    ...... | |
|    } | |
| } | |

PICTURE CODING DEVICE, PICTURE CODING METHOD, AND PICTURE CODING PROGRAM

CROSS REFERENCE TO RELATED APPLICATIONS

This application is a Continuation of U.S. patent application Ser. No. 15/943,827, filed Apr. 3, 2018; which is a continuation of application Ser. No. 15/798,728, filed Oct. 31, 2017, now U.S. Pat. No. 9,942,555; which is a continuation of Ser. No. 15/402,640, filed Jan. 10, 2017, now U.S. Pat. No. 9,848,195; which is a Continuation of U.S. patent application Ser. No. 15/152,998, filed May 12, 2016, now U.S. Pat. No. 9,794,576; which is a Continuation of U.S. patent application Ser. No. 14/860,246, filed Sep. 21, 2015, now U.S. Pat. No. 9,369,716, which is a Continuation of U.S. patent application Ser. No. 14/490,286, filed Sep. 18, 2014, now U.S. Pat. No. 9,179,164, which is a Continuation of U.S. patent application Ser. No. 14/132,423, filed Dec. 18, 2013, now U.S. Pat. No. 8,891,620, which is a Continuation of PCT International Application No. PCT/JP2012/003879, filed Jun. 14, 2012, which claims the benefit of Japanese Patent Application Nos. 2011-136641 and 2011-136642, filed Jun. 20, 2011, all of which are incorporated by reference in their entirety.

BACKGROUND OF THE INVENTION

The present invention relates to a picture coding and decoding technology, and more particularly, to an intra coding and decoding technology.

As a representative compression coding mode of moving pictures, there is an MPEG-4 AVC/H.264 standard. According to MPEG-4 AVC/H.264, coding is performed in units of macroblocks acquired by partitioning a picture into a plurality of rectangular blocks. The size of the macroblock is defined as 16.times.16 pixels in a luma signal regardless of the picture size. While a chroma signal is also included in the macroblock, the size of the chroma signal included in the macroblock differs in accordance with a chroma format of a picture to be coded. Thus, in a case where the chroma format is 4:2:0, the size of the chroma signal is 8.times.8 pixels, in a case where the chroma format is 4:2:2, the size of the chroma signal is 8.times.16 pixels, and, in a case where the chroma format is 4:4:4, the size of the chroma signal is 16.times.16 pixels.

As the chroma format, the ratio of sampled pixel numbers of three signals of one luma information unit and two chroma information units is denoted by X:Y:Z. As the chroma formats of a picture that is a target for being coded and decoded in accordance with MPEG-4 AVC/H.264, there are 4:2:0, 4:2:2, 4:4:4, and monochrome.

FIGS. 3A to 3E are diagrams that illustrate the chroma formats of a picture. In the figures, "X" denotes the position of a pixel of a luma signal on the plane of the screen, and "0" denotes the position of a pixel of a chroma signal.

The chroma format of 4:2:0 illustrated in FIG. 3A is a chroma format in which chroma signals are sampled in both horizontal and vertical directions at a half density with respect to luma signals. In addition, in the chroma format of 4:2:0, chroma signals may be sampled at positions illustrated in FIG. 3E.

The chroma format of 4:2:2 illustrated in FIG. 3B is a chroma format in which chroma signals are sampled in the horizontal direction at a half density, and in the vertical direction at the same density with respect to luma signals.

The chroma format of 4:4:4 illustrated in FIG. 3C is a chroma format in which chroma signals and luma signals are sampled at the same density.

The chroma format of monochrome illustrated in FIG. 3D is a chroma format that is configured only by luma signals without any chroma signal.

While the luma signals and the chroma signals are set so as to share coding information such as motion compensation and are coded and decoded, in the chroma format of 4:4:4, a structure is also provided in which one luma signal and two chroma signals are independently coded and decoded as three monochrome signals.

In the AVC/H.264 mode, a technique is used in which a prediction is made based on coded/decoded blocks within the coding/decoding target pixel. Such a technique is called an intra prediction. In addition, motion compensation is used in which a coded/decoded picture is set as a reference picture, and a motion from the reference picture is predicted. A technique for predicting a motion based on the motion compensation is called an inter prediction.

First, in an intra prediction made in intra coding according to the AVC/H.264 mode, units in which switching between intra prediction modes is performed will be described. FIGS. 4A to 4C are diagrams that illustrate the units in which switching between intra prediction modes is performed. In intra coding according to the AVC/H.264 mode, as the units in which switching between intra prediction modes is performed, three types including a "4.times.4 intra prediction", a "16.times.16 intra prediction", and an "8.times.8 intra prediction" are prepared.

In the "4.times.4 intra prediction", luma signals of a macroblock (a luma signal 16.times.16 pixel block and a chroma signal 8.times.8 pixel block) are partitioned into 16 4.times.4 pixel blocks, a mode is selected from among 9 types of 4.times.4 intra prediction modes in units of the partitioned 4.times.4 pixels, and intra predictions are sequentially made (FIG. 4A).

In the "16.times.16 intra prediction", a mode is selected from among 4 types of 16.times.16 intra prediction modes in units of 16.times.16 pixel blocks of luma signals, and intra predictions are made (FIG. 4B).

In the "8.times.8 intra prediction", luma signals of a macroblock are partitioned into 4 8.times.8 pixel blocks, a mode is selected from among 9 types of 8.times.8 intra prediction modes in units of the partitioned 8.times.8 pixels, and intra predictions are sequentially made (FIG. 4C).

In addition, in intra predictions of chroma signals, in a case where the chroma format is 4:2:0 or 4:2:2, a mode is selected from among 4 types of intra prediction modes of chroma signals in units of macroblocks, and the intra predictions are made.

In a case where a 16.times.16 intra prediction is selected, the intra prediction mode of a luma signal is coded as one mode of a syntax element mb_type representing the type of a macroblock, and an intra prediction mode of a chroma signal is separately coded.

In a case where a 4.times.4 intra prediction is selected, after intra prediction modes of 16 luma signals are consecutively coded, an intra prediction mode of a chroma signal is coded.

In a case where an 8.times.8 intra prediction is selected, after intra prediction modes of four luma signals are consecutively coded, an intra prediction mode of a chroma signal is coded.

Next, units in which an inter prediction is made in inter coding according to the AVC/H.264 mode will be described. FIGS. 5A to 5H are diagrams that illustrate macroblock partitions and sub-macroblock partitions. Here, for the simplification of description, only pixel blocks of luma signals are illustrated. In the MPEG series, a macroblock is defined as a square area. Generally, in the MPEG series including the AVC/H.264 mode, a block that is defined as 16.times.16 pixels (16 horizontal pixels and 16 vertical pixels) is called a macroblock. In addition, in the AVC/H.264 mode, a block that is defined as 8.times.8 pixels is called a sub-macroblock. A macroblock partition represents a small block acquired by further partitioning the macroblock for a motion compensation prediction. A sub-macroblock partition represents a small block acquired by further partitioning the sub-macroblock for a motion compensation prediction.

FIG. 5A is a diagram illustrating that a macroblock is configured by one macroblock partition that is configured by luma signals of 16.times.16 pixels and two chroma signals corresponding thereto. Here, such a configuration will be referred to as a macroblock type of a 16.times.16 mode.

FIG. 5B is a diagram illustrating that a macroblock is configured by two macroblock partitions each being configured by luma signals of 16.times.8 pixels (horizontal 16 pixels and vertical 8 pixels) and two chroma signals corresponding thereto. These two macroblock partitions are vertically aligned. Here, such a configuration will be referred to as a macroblock type of a 16.times.8 mode.

FIG. 5C is a diagram illustrating that a macroblock is configured by two macroblock partitions each being configured by luma signals of 8.times.16 pixels (horizontal 8 pixels and vertical 16 pixels) and two chroma signals corresponding thereto. These two macroblock partitions are horizontally aligned. Here, such a configuration will be referred to as a macroblock type of an 8.times.16 mode.

FIG. 5D is a diagram illustrating that a macroblock is configured by four macroblock partitions each being configured by luma signals of 8.times.8 pixels and two chroma signals corresponding thereto. Each two of these four macroblock partitions are aligned vertically and horizontally. Here, such a configuration will be referred to as a macroblock type of an 8.times.8 mode.

FIG. 5E is a diagram illustrating that a sub-macroblock is configured by one sub-macroblock partition that is configured by luma signals of 8.times.8 pixels and two chroma signals corresponding thereto. Here, such a configuration will be referred to as a sub-macroblock type of the 8.times.8 mode.

FIG. 5F is a diagram illustrating that a sub-macroblock is configured by two sub-macroblock partitions each being configured by luma signals of 8.times.4 pixels (horizontal 8 pixels and vertical 4 pixels) and two chroma signals corresponding thereto. These two sub-macroblock partitions are vertically aligned. Here, such a configuration will be referred to as a sub-macroblock type of an 8.times.4 mode.

FIG. 5G is a diagram illustrating that a sub-macroblock is configured by two sub-macroblock partitions each being configured by luma signals of 4.times.8 pixels (horizontal 4 pixels and vertical 8 pixels) and two chroma signals corresponding thereto. These two sub-macroblock partitions are horizontally aligned. Here, such a configuration will be referred to as a sub-macroblock type of a 4.times.8 mode.

FIG. 5H is a diagram illustrating that a sub-macroblock is configured by four sub-macroblock partitions each being configured by luma signals of 4.times.4 pixels and two chroma signals corresponding thereto. Each two of these four sub-macroblock partitions are aligned vertically and horizontally. Here, such a configuration will be referred to as a sub-macroblock type of a 4.times.4 mode.

In the AVC/H.264 coding mode, a structure is employed in which any one of the above-described motion compensation block sizes can be selected and used. First, as the motion compensation block size in the unit of a macroblock, any one of macroblock types of the 16.times.16, 16.times.8, 8.times.16, and 8.times.8 modes may be selected. In a case where the macroblock type of the 8.times.8 mode is selected, as the motion compensation block size in the unit of a sub-macroblock, any one of the sub-macroblock types of the 8.times.8, 8.times.4, 4.times.8, and 4.times.4 modes may be selected.

Non-Patent Document 1: ISO/IEC 14496-10 Information technology—Coding of audio-visual objects—Part 10: Advanced Video Coding is an example of related art.

When information relating to the intra prediction mode of a picture signal is to be coded, information relating to the intra prediction mode of a luma signal and information relating to the intra prediction mode of a chroma signal are coded and are arranged within a bitstream. However, at that time, in a case where the arrangement is not in correspondence with the chroma format, the processing efficiency may be degraded.

SUMMARY OF THE INVENTION

The present invention is contrived in consideration of such situations, and an object thereof is to provide a picture coding and decoding technology capable of coding a picture signal with high efficiency by performing intra predictions of a luma signal and a chroma signal in accordance with the chroma format.

In order to solve the above problem, according to an aspect of the present invention, there is provided a picture coding device that performs intra prediction coding of a picture signal including a luma signal and a chroma signal in units of blocks and codes information relating to an intra prediction mode. The picture coding device includes: an intra prediction unit (103) that, when an intra prediction of the picture signal is made in units of minimal coding blocks set in advance, in a case where a partition mode in which the luma signal is partitioned horizontally and vertically is set, makes an intra prediction of the chroma signal in units of prediction blocks of the intra prediction of the chroma signal within the minimal coding block set in accordance with a chroma format; and a bitstream constructing unit (113) that constructs a bitstream in which information relating to a luma intra prediction mode of the prediction block of the luma signal and information relating to a chroma intra prediction mode of the prediction block of the chroma signal located at a reference position that is the same as the position of the prediction block of the luma signal are continuous.

According to another aspect of the present invention, there is also provided a picture coding device that performs intra prediction coding of a picture signal including a luma signal and a chroma signal in units of blocks and codes information relating to an intra prediction mode, and the picture coding device includes: a luma signal intra prediction unit (103) that, when an intra prediction of the picture signal is made in units of minimal coding blocks set in advance, in a case where a partition mode in which the luma signal is partitioned horizontally and vertically is set, sets prediction blocks of first to fourth luma signals acquired by partitioning the luma signal of the minimal coding block horizontally and vertically and predicts a luma signal based on neighboring blocks of coded luma signals in accordance with a luma intra prediction mode for each prediction block of the luma signal; a chroma signal intra prediction unit (103) that, in a case where the partition mode is set, and a chroma format is 4:2:0, sets a prediction block of the chroma signal without partitioning the chroma signal of the minimal coding block and predicts a chroma signal based on neighboring blocks of coded chroma signals in accordance with a chroma intra prediction mode; and a bitstream constructing unit (113) that constructs a bitstream in which information relating to the prediction modes is arranged in order of, within the minimal coding block, the luma intra prediction mode of the prediction block of the first luma signal, the chroma intra prediction mode of the prediction block of the chroma signal located at a reference position that is the same as the position of the prediction block of the first luma signal, the luma intra prediction mode of the prediction block of the second luma signal, the luma intra prediction mode of the prediction block of the third luma signal, and the luma intra prediction mode of the prediction block of the fourth luma signal, by coding information relating to the prediction mode of the minimal coding block.

According to further another aspect of the present invention, there is also provided a picture coding device that performs intra prediction coding of a picture signal including a luma signal and a chroma signal in units of blocks and codes information relating to an intra prediction mode, and the picture coding device includes: a luma signal intra prediction unit (103) that, when an intra prediction of the picture signal is made in units of minimal coding blocks set in advance, in a case where a partition mode in which the luma signal is partitioned horizontally and vertically is set, sets prediction blocks of first to fourth luma signals acquired by partitioning the luma signal of the minimal coding block horizontally and vertically and predicts a luma signal based on neighboring blocks of coded luma signals in accordance with a luma intra prediction mode for each prediction block of the luma signal; a chroma signal intra prediction unit (103) that, in a case where the partition mode is set, and a chroma format is 4:4:4, sets prediction blocks of first to fourth chroma signals acquired by partitioning the chroma signal of the minimal coding block horizontally and vertically and predicts the chroma signal based on neighboring blocks of coded chroma signals in accordance with a chroma intra prediction mode for each prediction block of the chroma signal; and a bitstream constructing unit (113) that constructs a bitstream in which information relating to the prediction modes is arranged in order of, within the minimal coding block, the luma intra prediction mode of the prediction block of the first luma signal, the chroma intra prediction mode of the prediction block of the first chroma signal located at a reference position that is the same as the position of the prediction block of the first luma signal, the luma intra prediction mode of the prediction block of the second luma signal, the chroma intra prediction mode of the prediction block of the second chroma signal located at a reference position that is the same as the position of the prediction block of the second luma signal, the luma intra prediction mode of the prediction block of the third luma signal, the chroma intra prediction mode of the prediction block of the third chroma signal located at a reference position that is the same as the position of the prediction block of the third luma signal, the luma intra prediction mode of the prediction block of the fourth luma signal, and the chroma intra prediction mode of the prediction block of the fourth chroma signal located at a reference position that is the same as the position of the prediction block of the fourth luma signal by coding information relating to the prediction mode of the minimal coding block.

According to further another aspect of the present invention, there is also provided a picture coding device that performs intra prediction coding of a picture signal including a luma signal and a chroma signal in units of blocks and codes information relating to an intra prediction mode, and the picture coding device includes: a luma signal intra prediction unit (103) that, when an intra prediction of the picture signal is made in units of minimal coding blocks set in advance, in a case where a partition mode in which the luma signal is partitioned horizontally and vertically is set, sets prediction blocks of first to fourth luma signals acquired by partitioning the luma signal of the minimal coding block horizontally and vertically and predicts a luma signal based on neighboring blocks of coded luma signals in accordance with a luma intra prediction mode for each prediction block of the luma signal; a chroma signal intra prediction unit (103) that, in a case where the partition mode is set, and a chroma format is 4:2:2, sets prediction blocks of first and second chroma signals acquired by horizontally partitioning the chroma signal of the minimal coding block and predicts the chroma signal based on neighboring blocks of coded chroma signals in accordance with a chroma intra prediction mode for each prediction block of the chroma signal; and a bitstream constructing unit (113) that constructs a bitstream in which information relating to the prediction modes is arranged in order of, within the minimal coding block, the luma intra prediction mode of the prediction block of the first luma signal, the chroma intra prediction mode of the prediction block of the first chroma signal located at a reference position that is the same as the position of the prediction block of the first luma signal, the luma intra prediction mode of the prediction block of the second luma signal, the luma intra prediction mode of the prediction block of the third luma signal, the chroma intra prediction mode of the prediction block of the second chroma signal located at a reference position that is the same as the position of the prediction block of the third luma signal, and the luma intra prediction mode of the prediction block of the fourth luma signal by coding information relating to the prediction mode of the minimal coding block.

According to further another aspect of the present invention, there is provided a picture coding method for performing intra prediction coding of a picture signal including a luma signal and a chroma signal in units of blocks and coding information relating to an intra prediction mode, and the picture coding method includes: when an intra prediction of the picture signal is made in units of minimal coding blocks set in advance, in a case where a partition mode in which the luma signal is partitioned horizontally and vertically is set, making an intra prediction of the chroma signal in units of prediction blocks of the intra prediction of the chroma signal within the minimal coding block set in accordance with a chroma format; and constructing a bitstream in which information relating to a luma intra prediction mode of the prediction block of the luma signal and information relating to a chroma intra prediction mode of the prediction block of the chroma signal located at a reference position that is the same as the position of the prediction block of the luma signal are continuous.

According to further another aspect of the present invention, there is also provided a picture coding method for performing intra prediction coding of a picture signal including a luma signal and a chroma signal in units of blocks and coding information relating to an intra prediction mode, and the picture coding method includes: when an intra prediction of the picture signal is made in units of minimal coding blocks set in advance, in a case where a partition mode in which the luma signal is partitioned horizontally and vertically is set, setting prediction blocks of first to fourth luma signals acquired by partitioning the luma signal of the minimal coding block horizontally and vertically and predicting a luma signal based on neighboring blocks of coded luma signals in accordance with a luma intra prediction mode for each prediction block of the luma signal; in a case where the partition mode is set, and a chroma format is 4:2:0, setting a prediction block of the chroma signal without partitioning the chroma signal of the minimal coding block and predicting a chroma signal based on neighboring blocks of coded chroma signals in accordance with a chroma intra prediction mode; and constructing a bitstream in which information relating to the prediction modes is arranged in order of, within the minimal coding block, the luma intra prediction mode of the prediction block of the first luma signal, the chroma intra prediction mode of the prediction block of the chroma signal located at a reference position that is the same as the position of the prediction block of the first luma signal, the luma intra prediction mode of the prediction block of the second luma signal, the luma intra prediction mode of the prediction block of the third luma signal, and the luma intra prediction mode of the prediction block of the fourth luma signal by coding information relating to the prediction mode of the minimal coding block.

According to further another aspect of the present invention, there is also provided a picture coding method for performing intra prediction coding of a picture signal including a luma signal and a chroma signal in units of blocks and coding information relating to an intra prediction mode, and the picture coding method includes: when an intra prediction of the picture signal is made in units of minimal coding blocks set in advance, in a case where a partition mode in which the luma signal is partitioned horizontally and vertically is set, setting prediction blocks of first to fourth luma signals acquired by partitioning the luma signal of the minimal coding block horizontally and vertically and predicting a luma signal based on neighboring blocks of coded luma signals in accordance with a luma intra prediction mode for each prediction block of the luma signal; in a case where the partition mode is set, and a chroma format is 4:4:4, setting prediction blocks of first to fourth chroma signals acquired by partitioning the chroma signal of the minimal coding block horizontally and vertically and predicting the chroma signal based on neighboring blocks of coded chroma signals in accordance with a chroma intra prediction mode for each prediction block of the chroma signal; and constructing a bitstream in which information relating to the prediction modes is arranged in order of, within the minimal coding block, the luma intra prediction mode of the prediction block of the first luma signal, the chroma intra prediction mode of the prediction block of the first chroma signal located at a reference position that is the same as the position of the prediction block of the first luma signal, the luma intra prediction mode of the prediction block of the second luma signal, the chroma intra prediction mode of the prediction block of the second chroma signal located at a reference position that is the same as the position of the prediction block of the second luma signal, the luma intra prediction mode of the prediction block of the third luma signal, the chroma intra prediction mode of the prediction block of the third chroma signal located at a reference position that is the same as the position of the prediction block of the third luma signal, the luma intra prediction mode of the prediction block of the fourth luma signal, and the chroma intra prediction mode of the prediction block of the fourth chroma signal located at a reference position that is the same as the position of the prediction block of the fourth luma signal by coding information relating to the prediction mode of the minimal coding block.

According to further another aspect of the present invention, there is also provided a picture coding method for performing intra prediction coding of a picture signal including a luma signal and a chroma signal in units of blocks and coding information relating to an intra prediction mode, and the picture coding method includes: when an intra prediction of the picture signal is made in units of minimal coding blocks set in advance, in a case where a partition mode in which the luma signal is partitioned horizontally and vertically is set, setting prediction blocks of first to fourth luma signals acquired by partitioning the luma signal of the minimal coding block horizontally and vertically and predicting a luma signal based on neighboring blocks of coded luma signals in accordance with a luma intra prediction mode for each prediction block of the luma signal; in a case where the partition mode is set, and a chroma format is 4:2:2, setting prediction blocks of first and second chroma signals acquired by horizontally partitioning the chroma signal of the minimal coding block and predicting the chroma signal based on neighboring blocks of coded chroma signals in accordance with a chroma intra prediction mode for each prediction block of the chroma signal; and constructing a bitstream in which information relating to the prediction modes is arranged in order of, within the minimal coding block, the luma intra prediction mode of the prediction block of the first luma signal, the chroma intra prediction mode of the prediction block of the first chroma signal located at a reference position that is the same as the position of the prediction block of the first luma signal, the luma intra prediction mode of the prediction block of the second luma signal, the luma intra prediction mode of the prediction block of the third luma signal, the chroma intra prediction mode of the prediction block of the second chroma signal located at a reference position that is the same as the position of the prediction block of the third luma signal, and the luma intra prediction mode of the prediction block of the fourth luma signal by coding information relating to the prediction mode of the minimal coding block.

According to an aspect of the present invention, there is provided a picture decoding device that performs intra prediction decoding of a picture signal including a luma signal and a chroma signal in units of blocks by decoding information relating to an intra prediction mode, and the picture decoding device includes: an intra prediction unit (206) that, when an intra prediction of the picture signal is made in units of coding blocks, in a case where a chroma format is 4:2:2, in a mode for setting a chroma intra prediction mode in accordance with a luma intra prediction mode, sets a chroma intra prediction mode based on the luma intra prediction mode and the chroma format and makes an intra prediction of the chroma signal.

According to another aspect of the present invention, there is also provided a picture decoding device that performs intra prediction decoding of a picture signal including a luma signal and a chroma signal in units of blocks by decoding information relating to an intra prediction mode, and the picture decoding device includes: a bitstream decoding unit (203) that consecutively decodes information relating to a luma intra prediction mode of a prediction block of a luma signal and information relating to a chroma intra prediction mode of a prediction block of a chroma signal based on a bitstream in which the information relating to the luma intra prediction mode of the prediction block of the luma signal and the information relating to the chroma intra prediction mode of the prediction block of the chroma signal located at a reference position that is the same as the position of the prediction block of the luma signal are continuous; and an intra prediction unit (206) that, when an intra prediction of the picture signal is made in units of minimal decoding blocks set in advance, in a case where a partition mode in which the luma signal is partitioned horizontally and vertically is set, makes an intra prediction of the chroma signal based on the decoded chroma intra prediction mode in units of prediction blocks of the intra prediction of the chroma signal within the minimal decoding block set in accordance with a chroma format.

According to further another aspect of the present invention, there is also provided a picture decoding device that performs intra prediction decoding of a picture signal including a luma signal and a chroma signal in units of blocks by decoding information relating to an intra prediction mode, and the picture decoding device includes: a bitstream decoding unit (203) that derives a partition mode in which the luma signal is partitioned horizontally and vertically when an intra prediction of a picture signal is made in units of minimal decoding blocks set in advance and decodes information relating to a luma intra prediction mode for each prediction block of the luma signal and information relating to a chroma intra prediction mode for each prediction block of the chroma signal based on a bitstream in which coding information relating to the prediction mode is arranged; a luma signal intra prediction unit (206) that, in a case where the partition mode is set, sets prediction blocks of first to fourth luma signals acquired by partitioning the luma signal of the minimal decoding block horizontally and vertically and predicts the luma signal based on the neighboring blocks of decoded luma signals in accordance with each luma intra prediction mode acquired based on the information relating to the luma intra prediction mode for each prediction block of the decoded luma signal; and a chroma signal intra prediction unit (206) that, in a case where the partition mode is set, and a chroma format is 4:4:4, sets prediction blocks of first to fourth chroma signals acquired by partitioning the chroma signal of the minimal decoding block horizontally and vertically and predicts the chroma signal based on neighboring blocks of decoded chroma signals in accordance with each chroma intra prediction mode that is acquired based on the information relating to the chroma intra prediction mode for each prediction block of the decoded chroma signal. The chroma signal intra prediction unit (206), in a case where the chroma format is 4:4:4 and a mode for setting the chroma intra prediction mode in accordance with the luma intra prediction mode is designated based on the information relating to the chroma intra prediction mode for each prediction block of the decoded chroma signal, sets chroma intra prediction modes of first, second, third, and fourth chroma signals by using values representing the luma intra prediction modes of the prediction blocks of the first, second, third, and fourth luma signals within the minimal decoding block as values representing the chroma intra prediction modes of the prediction blocks of the first, second, third, and fourth chroma signals within the minimal decoding block that are located at respective same reference positions.

According to further another aspect of the present invention, there is also provided a picture decoding device that performs intra prediction decoding of a picture signal including a luma signal and a chroma signal in units of blocks by decoding information relating to an intra prediction mode, and the picture decoding device includes: a bitstream decoding unit (203) that derives a partition mode in which the luma signal is partitioned horizontally and vertically when an intra prediction of a picture signal is made in units of minimal decoding blocks set in advance and decodes information relating to a luma intra prediction mode for each prediction block of the luma signal and information relating to a chroma intra prediction mode for each prediction block of the chroma signal based on a bitstream in which coding information relating to the prediction mode is arranged; a luma signal intra prediction unit (206) that, in a case where the partition mode is set, sets prediction blocks of first to fourth luma signals acquired by partitioning the luma signal of the minimal decoding block horizontally and vertically and predicts the luma signal based on neighboring blocks of decoded luma signals in accordance with each luma intra prediction mode acquired based on the information relating to the luma intra prediction mode for each prediction block of the decoded luma signal; and a chroma signal intra prediction unit (206) that, in a case where the partition mode is set, and a chroma format is 4:2:2, sets prediction blocks of first and second chroma signals acquired by partitioning the chroma signal of the minimal decoding block horizontally and vertically and predicts the chroma signal based on neighboring blocks of decoded chroma signals in accordance with each chroma intra prediction mode that is acquired based on the information relating to the chroma intra prediction mode for each prediction block of the decoded chroma signal. The chroma signal intra prediction unit (206), in a case where the chroma format is 4:2:2 and a mode for setting the chroma intra prediction mode in accordance with the luma intra prediction mode is designated based on the information relating to the chroma intra prediction mode for each prediction block of the decoded chroma signal, sets chroma intra prediction modes of prediction blocks of the first and second chroma signals by converting values representing the luma intra prediction modes of the prediction blocks of the first and third luma signals within the minimal decoding block into values representing the chroma intra prediction modes of the prediction blocks of the first and second chroma signals within the minimal decoding block that are located at respective same reference positions in accordance with a conversion rule set in advance.

According to further another aspect of the present invention, there is provided a picture decoding method for performing intra prediction decoding of a picture signal including a luma signal and a chroma signal in units of blocks by decoding information relating to an intra prediction mode, and the picture decoding method includes, when an intra prediction of the picture signal is made in units of coding blocks, in a case where a chroma format is 4:2:2, in a mode for setting a chroma intra prediction mode in accordance with a luma intra prediction mode, setting a chroma intra prediction mode based on the luma intra prediction mode and the chroma format and making an intra prediction of the chroma signal.

According to further another aspect of the present invention, there is also provided a picture decoding method for performing intra prediction decoding of a picture signal including a luma signal and a chroma signal in units of blocks by decoding information relating to an intra prediction mode, and the picture decoding method includes: consecutively decoding information relating to a luma intra prediction mode of a prediction block of a luma signal and information relating to a chroma intra prediction mode of a prediction block of a chroma signal based on a bitstream in which the information relating to the luma intra prediction mode of the prediction block of the luma signal and the information relating to the chroma intra prediction mode of the prediction block of the chroma signal located at a reference position that is the same as the position of the prediction block of the luma signal are continuous; and when an intra prediction of the picture signal is made in units of minimal decoding blocks set in advance, in a case where a partition mode in which the luma signal is partitioned horizontally and vertically is set, making an intra prediction of the chroma signal based on the decoded chroma intra prediction mode in units of prediction blocks of the intra prediction of the chroma signal within the minimal decoding block set in accordance with a chroma format.

According to further another aspect of the present invention, there is also provided a picture decoding method for performing intra prediction decoding of a picture signal including a luma signal and a chroma signal in units of blocks by decoding information relating to an intra prediction mode, and the picture decoding method includes: deriving a partition mode in which the luma signal is partitioned horizontally and vertically when an intra prediction of a picture signal is made in units of minimal decoding blocks set in advance and decoding information relating to a luma intra prediction mode for each prediction block of the luma signal and information relating to a chroma intra prediction mode for each prediction block of the chroma signal based on a bitstream in which coding information relating to the prediction mode is arranged; in a case where the partition mode is set, setting prediction blocks of first to fourth luma signals acquired by partitioning the luma signal of the minimal decoding block horizontally and vertically and predicting the luma signal based on the neighboring blocks of decoded luma signals in accordance with each luma intra prediction mode acquired based on the information relating to the luma intra prediction mode for each prediction block of the decoded luma signal; and in a case where the partition mode is set, and a chroma format is 4:4:4, setting prediction blocks of first to fourth chroma signals acquired by partitioning the chroma signal of the minimal decoding block horizontally and vertically and predicting the chroma signal based on neighboring blocks of decoded chroma signals in accordance with each chroma intra prediction mode that is acquired based on the information relating to the chroma intra prediction mode for each prediction block of the decoded chroma signal. In the setting of prediction blocks and predicting the chroma signal, in a case where the chroma format is 4:4:4 and a mode for setting the chroma intra prediction mode in accordance with the luma intra prediction mode is designated based on the information relating to the chroma intra prediction mode for each prediction block of the decoded chroma signal, chroma intra prediction modes of prediction blocks of first, second, third, and fourth chroma signals are set by using values representing the luma intra prediction modes of the prediction blocks of the first, second, third, and fourth luma signals within the minimal decoding block as values representing the chroma intra prediction modes of the prediction blocks of the first, second, third, and fourth chroma signals within the minimal decoding block that are located at respective same reference positions.

According to further another aspect of the present invention, there is also provided a picture decoding method for performing intra prediction decoding of a picture signal including a luma signal and a chroma signal in units of blocks by decoding information relating to an intra prediction mode, and the picture decoding method includes: deriving a partition mode in which the luma signal is partitioned horizontally and vertically when an intra prediction of a picture signal is made in units of minimal decoding blocks set in advance and decoding information relating to a luma intra prediction mode for each prediction block of the luma signal and information relating to a chroma intra prediction mode for each prediction block of the chroma signal based on a bitstream in which coding information relating to the prediction mode is arranged; in a case where the partition mode is set, setting prediction blocks of first to fourth luma signals acquired by partitioning the luma signal of the minimal decoding block horizontally and vertically and predicting the luma signal based on neighboring blocks of decoded luma signals in accordance with each luma intra prediction mode acquired based on the information relating to the luma intra prediction mode for each prediction block of the decoded luma signal; and in a case where the partition mode is set, and a chroma format is 4:2:2, setting prediction blocks of first and second chroma signals acquired by partitioning the chroma signal of the minimal decoding block horizontally and vertically and predicting the chroma signal based on neighboring blocks of decoded chroma signals in accordance with each chroma intra prediction mode that is acquired based on the information relating to the chroma intra prediction mode for each prediction block of the decoded chroma signal. In the setting of prediction blocks and predicting of the chroma signal, in a case where the chroma format is 4:2:2 and a mode for setting the chroma intra prediction mode in accordance with the luma intra prediction mode is designated based on the information relating to the chroma intra prediction mode for each prediction block of the decoded chroma signal, chroma intra prediction modes of prediction blocks of the first and second chroma signals are set by converting values representing the luma intra prediction modes of the prediction blocks of the first and third luma signals within the minimal decoding block into values representing the chroma intra prediction modes of the prediction blocks of the first and second chroma signals within the minimal decoding block that are located at respective same reference positions in accordance with a conversion rule set in advance.

In addition, an arbitrary combination of constituent elements described above and any conversion of the representation of the present invention among a device, a system, a recording medium, a computer program, and the like are also effective as aspects of the present invention.

BRIEF DESCRIPTION OF THE DRAWINGS

FIGS. 3A to 3E are diagrams that illustrate chroma formats of a picture;

FIGS. 5A to 5H are diagrams that illustrate units in which an inter prediction according to the AVC/H.264 mode is made;

Figures 7A, 7B, 7C, 7D:
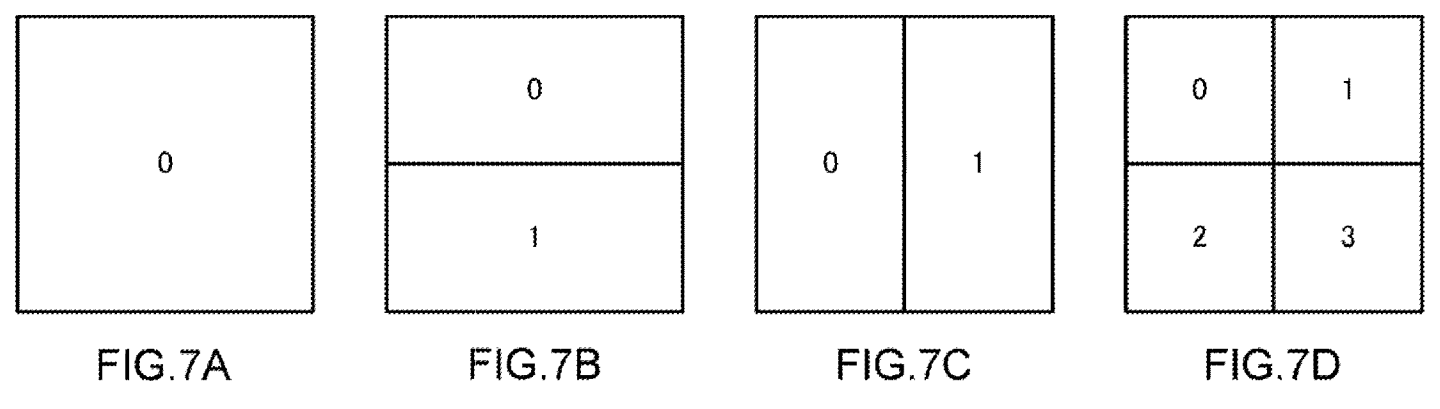

FIGS. 7A to 7D are diagrams that illustrate partition modes defined in this example;

FIG. 10 is a diagram that illustrates an example of the definition of syntax at the time of coding chroma format information using the sequence parameter set that is a header for coding information relating to coding the entire sequence defined in this example;

FIG. 14 is a conversion table used for calculating the value of a chroma intra prediction mode based on the value of a syntax element used on the decoding side and the value of a luma intra prediction mode of a prediction block that is located at the same position as the position of a prediction block of a chroma signal that is defined in this example;

FIG. 15 is a conversion table used for calculating the value of a chroma intra prediction mode based on the value of a luma intra prediction mode of a prediction block located at the same position as the position of a prediction block of chroma signals in a case where the chroma format is 4:2:2 that is defined in this example;

FIG. 16 is a conversion table used for calculating the value of a syntax element relating to the chroma intra prediction mode based on the value of the chroma intra prediction mode used on the coding side defined in this embodiment and the value of the luma intra prediction mode of a prediction block located at the same position as the position of the prediction block of the chroma signal, in other words, the prediction block of a luma signal belonging to the same prediction unit;

FIG. 18 illustrates an example of a syntax rule for coding and decoding coding information in units of coding blocks that is defined in this example;

FIG. 19 illustrates an example of a syntax rule used for coding and decoding coding information of a prediction unit that is defined in this example;

DETAILED DESCRIPTION OF THE PREFERRED EMBODIMENT

The invention will now be described by reference to the preferred embodiments. This does not intend to limit the scope of the present invention, but to exemplify the invention.

This embodiment relates to coding a moving picture, and, more particularly, in units of blocks acquired by partitioning a picture into rectangles having an arbitrary size and an arbitrary shape, reducing the coding amount by using an intra prediction for making a prediction based on the pixel value of a neighboring block that is in a state in which coding and decoding have been completed in a coding process and decoding has been completed in a decoding process (hereinafter, the state is assumed in which decoding has been completed) and an inter prediction made through motion compensation based on a picture that has been decoded.

First, technologies and technical terms used in this example will be defined.

Chroma Format

In description of the embodiment, the chroma formats of a picture that is a target for coding and decoding are assumed to be monochrome, 4:2:0, 4:2:2, and 4:4:4 that are set as targets also in the AVC/H.264 mode, and coding and decoding are performed with a luma signal and a chroma signal being set as a set. However, the description of the chroma signal will not be presented for the case of the monochrome. In addition, in a method for independently coding luma signals and chroma signals in the chroma format of 4:4:4, in this example, the chroma format is assumed to be the monochrome.

Tree Block and Coding Block

Figure 6:
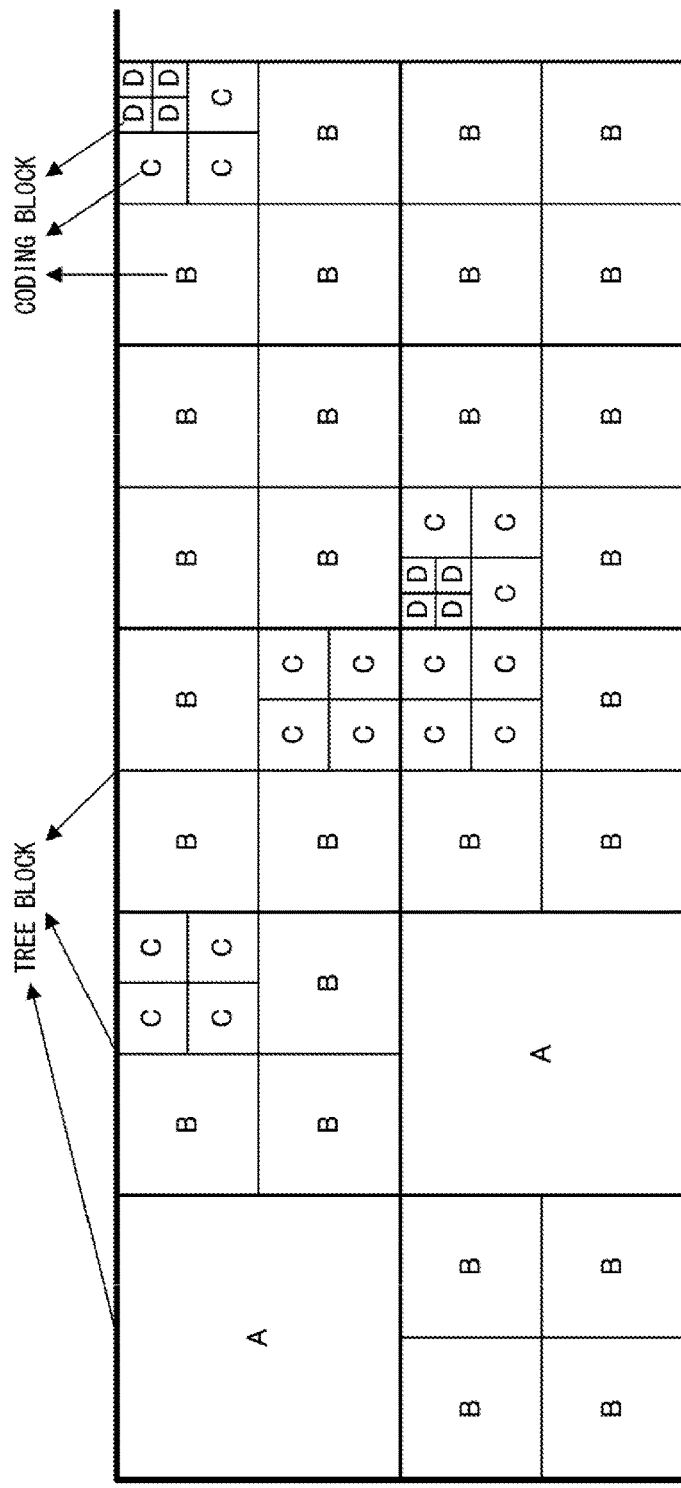
FIG. 6 is a diagram that illustrates tree blocks and coding blocks defined in this example.

According to the embodiment, as illustrated in FIG. 6, the inside of a screen is uniformly partitioned in units of squares having a same arbitrary size. This unit is defined as a tree block and is set as a basic unit for address management that is performed for specifying a coding/decoding target block (a coding target block in the coding process and a decoding target block in the decoding process) within the picture. The tree block is configured by one luma signal and two chroma signals except for the case of the monochrome. The size of the tree block can be freely set to be a size of the power of "2" in accordance with the picture size or the texture within the screen. The tree block can optimize the coding process in accordance with the texture within the screen and, as is necessary, can form blocks having a small size by hierarchically partitioning luma signals and chroma signals within the tree block into four parts (forming each two partitions vertically and horizontally). These blocks are defined as coding blocks and are used as basic units at the time of performing coding and decoding. The coding block is configured by one luma signal and two chroma signals except for the case of the monochrome. A maximum size of the coding block is the same as the size of the tree block. A coding block of a minimum size of the coding block will be referred to as a minimal coding block and can be freely set to have a size of the power of "2".

As illustrated in FIG. 6, a coding block A is formed as one coding block without partitioning the tree block. A coding block B is a coding block acquired by partitioning the tree block into four parts. A coding block C is a coding block that is acquired by partitioning the tree block into four parts and partitioning one of the four parts into four parts. A coding block D is a coding block that is acquired by partitioning the tree block into four parts and hierarchically partitioning one of the four parts into four parts twice and is a coding block of a minimal size.

In description made here, it is assumed that the chroma format is 4:2:0, the size of the tree block is set to be 64.times.64 pixels in a luma signal and 32.times.32 pixels in a chroma signal, and the size of the minimal coding block is set to be 8.times.8 pixels in the luma signal and 4.times.4 pixels in the chroma signal. In the case illustrated in FIG. 6, the size of the coding block A is 64.times.64 pixels in the luma signal and 32.times.32 pixels in the chroma signal, the size of the coding block B is 32.times.32 pixels in the luma signal and 16.times.16 pixels in the chroma signal, the size of the coding block C is 16.times.16 pixels in the luma signal and 8.times.8 pixels in the chroma signal, and the size of the coding block D is 8.times.8 pixels in the luma signal and 4.times.4 pixels in the chroma signal. In addition, in a case where the chroma format is 4:4:4, the sizes of the luma signal and the chroma signal of each coding block are the same. In a case where the chroma format is 4:2:2, the size of the coding block A is 32.times.64 pixels in the chroma signal, the size of the coding block B is 16.times.32 pixels in the chroma signal, the size of the coding block C is 8.times.16 pixels in the chroma signal, and the size of the coding block D, which is the minimal coding block, is 4.times.8 pixels in the chroma signal.

Prediction Mode

In units of coding blocks, switching between an intra prediction for making a prediction based on neighboring coded/decoded picture signals and an inter prediction for making a prediction based on picture signals of a coded/decoded picture is performed. A mode for identifying the intra prediction or the inter prediction is defined as a prediction mode PredMode. The prediction mode PredMode has a value of the intra prediction MODE_INTRA or the inter prediction (MODE_INTER) and is used for selective coding.

Partition Mode, Prediction Block, and Prediction Unit

In a case where the intra prediction and the inter prediction are made with the inside of a screen being partitioned into blocks, in order to further decrease the units in which switching between the intra prediction and the inter prediction is performed, the prediction is made with the coding block being partitioned as is necessary. A mode used for identifying the method of partitioning luma signals and chroma signals of the coding block is defined as a partition mode PartMode. In addition, the partitioned block is defined as a prediction block. As illustrated in FIGS. 7A to 7D, four types of partition modes PartMode are defined in accordance with the methods of partitioning luma signals of the coding block. A partition mode PartMode in which a coding block is regarded as one prediction block without partitioning luma signals of the coding block (FIG. 7A) is defined as 2N.times.2N partition PART_2N.times.2N, a partition mode PartMode in which a coding block is regarded as two prediction blocks by partitioning luma signals of the coding block into two parts in the horizontal direction (FIG. 7B) is defined as 2N.times.N partition PART_2N.times.N, a partition mode PartMode in which a coding block is regarded as two prediction blocks by partitioning luma signals of the coding block into two parts in the vertical direction (FIG. 7C) is defined as N.times.2N partition PART_N.times.2N, and a partition mode PartMode in which a coding block is regarded as four prediction blocks by partitioning luma signals of the coding block into four parts through horizontal and vertical equal partitioning (FIG. 7D) is defined as N.times.N partition PART_N.times.N. In addition, chroma signals are also partitioned with the same vertical and horizontal partition ratios of luma signals for each partition mode PartMode except for the case of the N.times.N partition PART_N.times.N of the intra prediction MODE_INTRA. The vertical and horizontal partition ratios of chroma signals of the coding block of the N.times.N partition PART_N.times.N of the intra prediction MODE_INTRA differ in accordance with the type of the chroma format, which will be described later.

Inside the coding block, in order to specify each prediction block, numbers starting from "0" are assigned to prediction blocks present inside the coding block in order of coding. These numbers are defined as partition indexes PartIdx. A number written inside each prediction block of a coding block illustrated in FIGS. 7A to 7D represents the partition index PartIdx of the prediction block. In the 2N.times.N partition PART_2N.times.N illustrated in FIG. 7B, the partition index PartIdx of the upper prediction block is set as "0", and the partition index PartIdx of the lower prediction block is set as "1". In the N.times.2N partition PART_N.times.2N illustrated in FIG. 7C, the partition index PartIdx of the left prediction block is set as "0", and the partition index PartIdx of the right prediction block is set as "1". In the N.times.N partition PART_N.times.N illustrated in FIG. 7D, the partition index PartIdx of the upper left prediction block is set as "0", the partition index PartIdx of the upper right prediction block is set as "1", the partition index PartIdx of the lower left prediction block is set as "2", and the partition index PartIdx of the lower right prediction block is set as "3".

In addition, since prediction blocks of a luma signal and a chroma signal that are located at the same position have a high correlation in both the intra prediction and the inter prediction, in the embodiment, a coding process and a decoding process are performed for coding information of prediction blocks of a luma signal and a chroma signal as one prediction unit. In addition, a partition index PartIdx is also assigned to the prediction unit, and a partition index PartIdx of a same value is assigned to the prediction blocks of a luma signal and a chroma signal that are located at the same position.

In a case where the prediction mode PredMode is the intra prediction MODE_INTRA, for a coding block other than the coding block D (in this example, 8.times.8 pixels in the luma signal) that is the minimal coding block, the 2N.times.2N partition PART_2N.times.2N is defined as the partition mode PartMode. On the other hand, only for the coding block D that is the minimal coding block, the 2N.times.2N partition PART_2N.times.2N and the N.times.N partition PART_N.times.N are defined as the partition modes Part-Mode.

In a case where the prediction mode PredMode is the inter prediction MODE_INTER, for a coding block other than the coding block D that is the minimal coding block, the 2N.times.2N partition PART_2N.times.2N, the 2N.times.N partition PART_2N.times.N, and the N.times.2N partition PART_N.times.2N are defined as the partition modes Part-Mode. On the other hand, only for the coding block D that is the minimal coding block, the N.times.N partition PART_N.times.N is defined as the partition mode PartMode in addition to the 2N.times.2N partition PART_2N.times.2N, the 2N.times.N partition PART_2N.times.N, and the N.times.2N partition PART_N.times.2N. The reason for not defining the N.times.N partition PART_N.times.N in a coding block other than the minimal coding block is that, for a coding block other than the minimal coding block, a small coding block can be represented by partitioning the coding block into four parts.

Intra Prediction and Intra Prediction Mode

Figure 8:
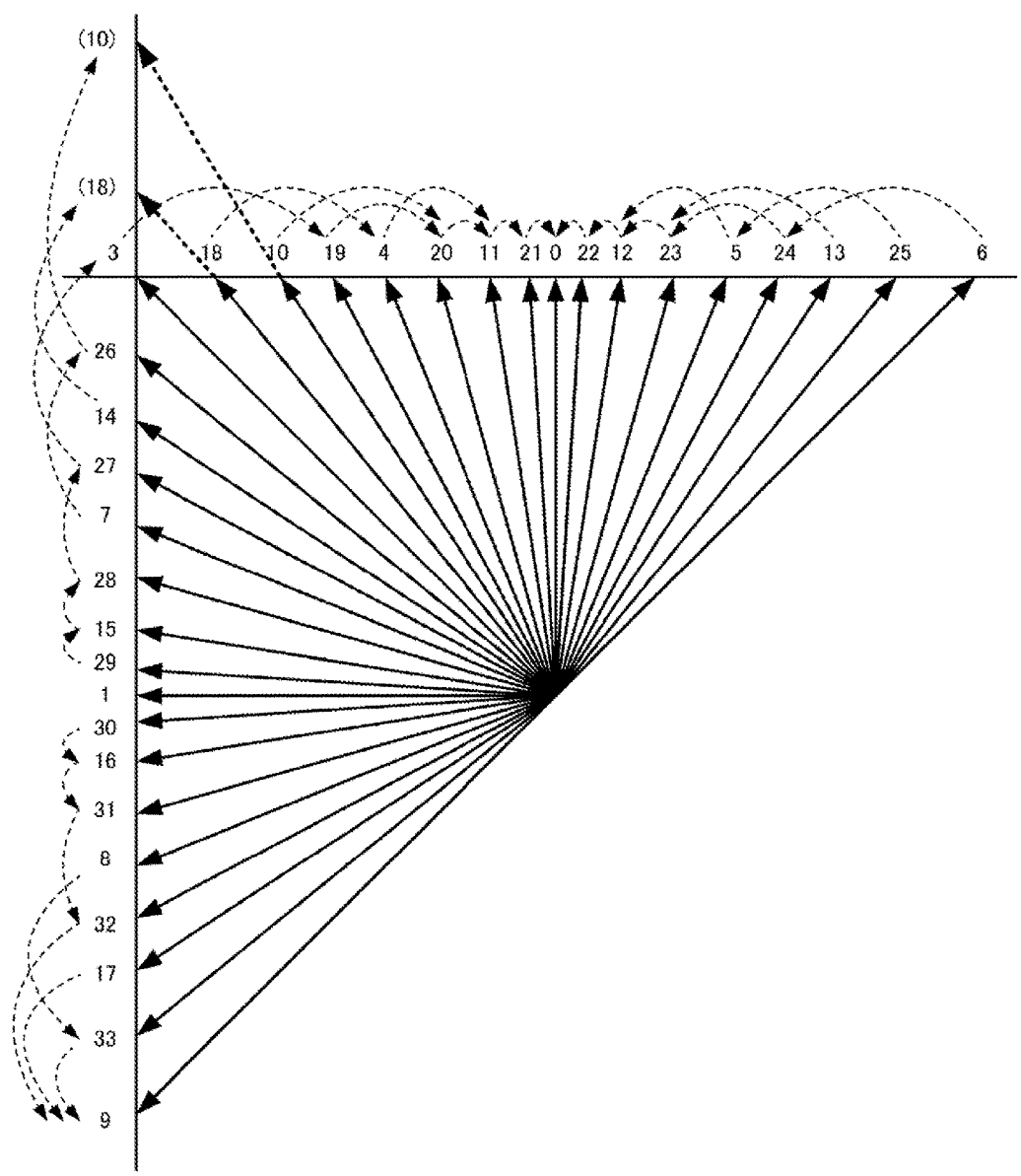
FIG. 8 is a diagram that illustrates values of intra prediction modes and prediction directions defined in this example.

In an intra prediction, the values of pixels of the processing target block are predicted based on values of pixels of a neighboring decoded block within the same screen. In a coding device and a decoding device of this example, one of intra prediction modes of 34 kinds is selected, and the intra prediction is made. FIG. 8 is a diagram that illustrates values of the intra prediction modes and prediction directions defined in this example. The direction indicated by a solid-line arrow represents a prediction direction of the intra prediction, in other words, a direction that is referred to in the intra prediction, and the intra prediction of a pixel located at a start point of the arrow is made by referring to a decoded pixel in the direction indicated by the arrow in a neighboring block. Each number represents a value of the intra prediction mode. As the intra prediction modes intraPredMode, in addition to a vertical prediction (intra prediction mode intraPredMode=0) that makes a prediction in the vertical direction from the decoded block located on the upper side, a horizontal prediction (intra prediction mode intraPredMode=1) that makes a prediction in the horizontal direction from the decoded block located on the left side, an average prediction (intra prediction mode intraPredMode=2) that makes a prediction by calculating an average value from a neighboring decoded block, and an average prediction (intra prediction mode intraPredMode=3) that makes a prediction at the angle of the inclination of 45 degrees from a neighboring decoded block, angle predictions (intra prediction modes intraPredMode=4 to 33) that make predictions of 30 kinds for making predictions in directions inclined at various angles from a neighboring decoded block are defined.

The intra prediction mode is prepared respectively for luma signals and chroma signals, the intra prediction mode for luma signals is defined as a luma intra prediction mode, and the intra prediction mode for chroma signals is defined as a chroma intra prediction mode. In the coding and decoding of the luma intra prediction mode, a structure is used in which the correlation with the luma intra prediction mode of a neighboring block is used, in a case where it is determined that a prediction can be made based on the luma intra prediction mode of a neighboring block on the coding side, information used for specifying the block that is referred to is transmitted, and, in a case where it is determined that another value may be preferably set to the luma intra prediction mode rather than making a prediction based on the luma intra prediction mode of a neighboring block, the value of the luma intra prediction mode is further coded or decoded. By predicting the luma intra prediction mode of the coding/decoding target block based on the luma intra prediction mode of the neighboring block, the amount of codes to be transmitted can be reduced. On the other hand, in the coding and decoding of the chroma intra prediction mode, a structure is used in which the correlation with the luma intra prediction mode of a prediction block of luma signals that is located at the same position as the position of a prediction block of chroma signals is used, in a case where it is determined that a prediction can be made based on the luma intra prediction mode on the coding side, a value of the chroma intra prediction mode is predicted based on the value of the luma intra prediction mode, and, in a case where it is determined that an independent value may be preferably set to the chroma intra prediction mode rather than making a prediction based on the luma intra prediction mode, the value of the chroma intra prediction mode is coded or decoded. By predicting the chroma intra prediction mode based on the luma intra prediction mode, the amount of codes to be transmitted can be reduced.

Transform Block

Similarly to a conventional case, also in this embodiment, by using an orthogonal transform for transforming a discrete signal into a frequency domain such as a discrete cosine transform (DCT) or a discrete sine transform (DST) and an inverse transform thereof, the amount of codes is reduced. The transform or the inverse transform is performed in units of transform blocks acquired by hierarchically partitioning a coding block into four parts. In the embodiment, four kinds of conversion sizes of 32.times.32 pixels, 16.times.16 pixels, 8.times.8 pixels, and 4.times.4 pixels are defined, and a 32.times.32 transform, a 16.times.16 transform, an 8.times.8 transform, and a 4.times.4 transform and inverse transforms thereof are performed.

Positions of Tree Block, Coding Block, Prediction Block, and Transform Block

Figure 9:
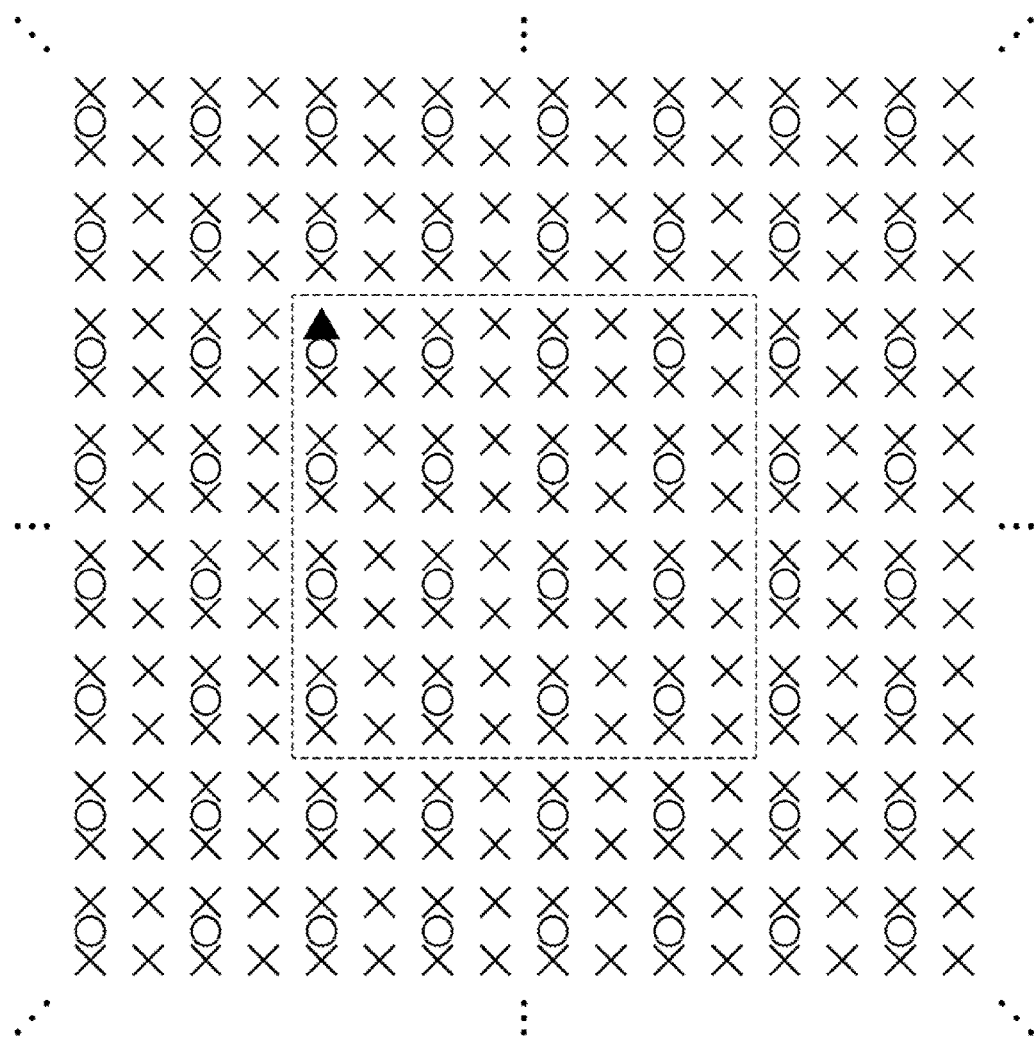
FIG. 9 is a diagram that illustrates an example of the positions of blocks defined in this example.

As the position of each block such as the tree block, the coding block, the prediction block, or the transform block described in this example, the position of a pixel of a luma signal that is located at an uppermost and leftmost position on the screen of luma signals is set as the origin (0, 0), and the position of a pixel of a luma signal that is located at the uppermost and leftmost position included in the area of each block is represented as two-dimensional coordinates (x, y). The directions of the coordinate axes, the rightward side in the horizontal direction and the downward side in the vertical direction are set as positive directions, and the unit is one pixel unit of a luma signal. Not only in a case where the chroma format is 4:4:4 in which the picture sizes (the numbers of pixels) are the same in the luma signal and the chroma signal but also in a case where the chroma format is 4:2:0 or 4:2:2 in which the picture sizes (the numbers of pixels) in the luma signal and the chroma signal are different from each other, the position of each block of chroma signals is represented by using the coordinates of a pixel of luma signals included in the area of the block, and the unit is one pixel of a luma signal. In this way, it is apparent that the position of each block of chroma signals can be specified, and, by only comparing the values of coordinates, the relation between the positions of the block of luma signals and the block of chroma signals becomes clear. FIG. 9 is a diagram that illustrates an example of the positions of blocks defined in this example in a case where the chroma format is 4:2:0. In FIG. 9, "X" represents the position of a pixel of a luma signal on the plane of a screen, and ".smallcircle."

represents the position of a pixel of a chroma signal. A dotted-line rectangle illustrated in FIG. 9 is a block E of luma signals of 8.times.8 pixels and is also a block F of chroma signals of 4.times.4 pixels. In addition, ".tangle-solidup." is the position of a pixel of a luma signal, which is located at an uppermost and leftmost position, in the block E of the luma signals of the 8.times.8 pixels represented by dotted lines. Accordingly, ".tangle-solidup." is the position of the block E of the luma signals of the 8.times.8 pixels represented by dotted lines, and the coordinates of a luma signal of a pixel represented by ".tangle-solidup." are the coordinates of the block E of luma signals of the 8.times.8 pixels represented by the dotted lines. Similarly, ".tangle-solidup." is the position of a pixel of a luma signal, which is located at an uppermost and leftmost position, included in the area of the block F of chroma signals of the 4.times.4 pixels represented by the dotted lines as well. Accordingly, ".tangle-solidup." is the position of the block F of chroma signals of 4.times.4 pixels represented by the dotted lines, and the coordinates of a luma signal of a pixel represented by ".tangle-solidup." are the coordinates of the block F of chroma signals of the 4.times.4 pixels represented by the dotted lines. In the embodiment, regardless of the type of the chroma format and the shape and the size of the block, only in a case where the x component and the y component of the coordinates of the block of luma signals, which is defined, and the coordinates of the block of chroma signals are all the same, such blocks are defined to be located at the same position.

Figure 1:
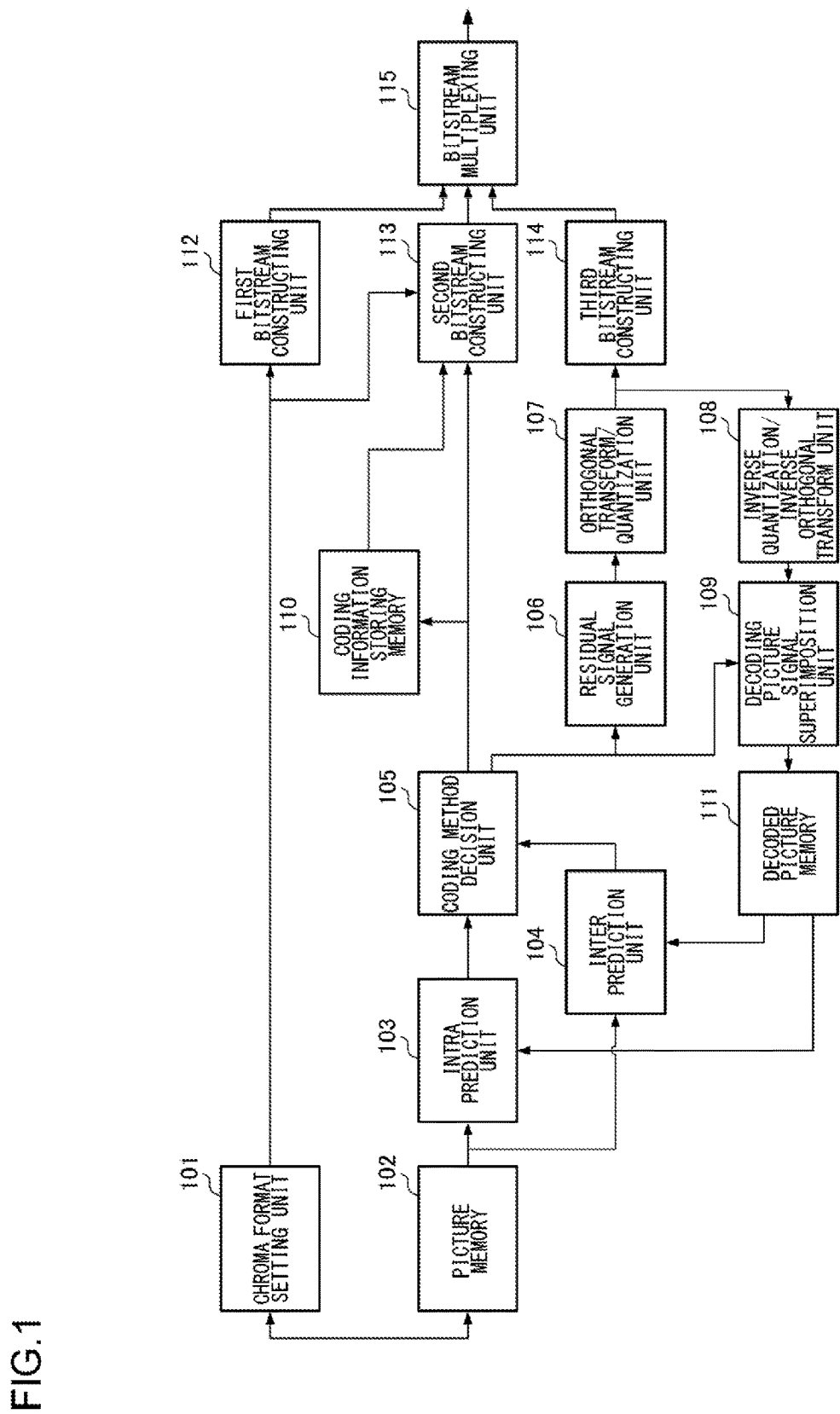
FIG. 1 is a block diagram that illustrates the configuration of a picture coding device according to an embodiment.

FIG. 1 is a block diagram that illustrates the configuration of a moving picture coding device according to the embodiment. The moving picture coding device according to the embodiment is equipped with a chroma format setting unit 101, a picture memory 102, an intra prediction unit 103, an inter prediction unit 104, a coding method decision unit 105, a residual signal generation unit 106, an orthogonal transform/quantization unit 107, an inverse quantization/inverse orthogonal transform unit 108, a decoding picture signal superimposition unit 109, a decoded picture memory 111, a first bitstream constructing unit 112, a second bitstream constructing unit 113, a third bitstream constructing unit 114, and a bitstream multiplexing unit 115.

The chroma format setting unit 101 sets the chroma format of a picture signal that is a coding target. It may be configured such that a chroma format is determined based on a coding picture signal supplied to the chroma format setting unit 101, and the chroma format is set, or a chroma format may be externally set. The information of the chroma format in which only the luma signal is set to 4:2:0, 4:2:2, or 4:4:4 is supplied to the first bitstream constructing unit 112 and also to the second bitstream constructing unit 113, and a coding process that is based on the chroma format is performed. In addition, although not illustrated in the figure, also in the picture memory 102, the intra prediction unit 103, the inter prediction unit 104, the coding method decision unit 105, the residual signal generation unit 106, the orthogonal transform/quantization unit 107, the inverse quantization/inverse orthogonal transform unit 108, the decoding picture signal superimposition unit 109, and the third bitstream constructing unit 114 illustrated in FIG. 1, a coding process is performed based on the set chroma format, and information is managed in the coding information storing memory 110 and the decoded picture memory 111 based on the set chroma format.

In the picture memory 102, picture signals that are coding targets supplied in order of time are temporarily stored. The picture signals that are coding targets stored in the picture memory 102 are sorted, are partitioned in units of coding blocks in a plurality of combinations according to the setting, are further partitioned in units of prediction blocks, and are supplied to the intra prediction unit 103 and the inter prediction unit 104.

The intra prediction unit 103, in units of prediction blocks according to each partition mode PartMode in units of a plurality of coding blocks, makes intra predictions corresponding to a plurality of luma intra prediction modes and chroma intra prediction modes for luma signals and chroma signals of the prediction block that is a coding target based on the decoded picture signals stored in the decoded picture memory 111, thereby acquiring intra prediction signals. In addition, as the chroma intra prediction mode, a value predicted based on the luma intra prediction mode in accordance with the chroma format or one of "0" (vertical direction), "1" (horizontal direction), "2" (average), and "3" (inclination of 45 degrees), which are representative intra prediction modes, is selected to be limited thereto. Here, a method of predicting the chroma intra prediction mode based on the luma intra prediction mode will be described later.

By subtracting an intra prediction signal in units of prediction blocks from the signal that is the coding target supplied in units of prediction blocks for each pixel, a predicted residual signal is acquired. An evaluation value used for evaluating the code amount and the distortion amount is calculated by using the predicted residual signal, a mode that is optimal from the viewpoint of the code amount and the distortion amount is selected in units of prediction blocks from among a plurality of intra prediction modes, and intra prediction information, an intra prediction signal, and an evaluation value of the intra prediction corresponding to the intra prediction mode selected as a candidate for the intra prediction of the prediction block are supplied to the coding method decision unit 105. The prediction processing units in which the intra prediction is made will be described later.

The inter prediction unit 104 performs inter predictions according to a plurality of inter prediction modes (an L0 prediction, an L1 prediction, and both predictions) and a reference picture based on decoded picture signals stored in the decoded picture memory 111 in units corresponding to the partition modes PartMode of a plurality of coding block units, in other words, in units of prediction blocks, thereby acquiring inter prediction signals. At that time, a motion vector search is performed, and the inter prediction is made in accordance with the searched motion vector. In addition, in the case of the both predictions, by averaging two inter prediction signals for each pixel or performing weighted addition thereof, the inter predictions of both the predictions are performed. An inter prediction signal in units of prediction blocks is subtracted from the signal of the coding target supplied in units of prediction blocks for each pixel, thereby deriving a predicted residual signal. An evaluation value used for evaluating the code amount and the distortion amount is calculated by using the predicted residual signal, a mode that is optimal from the viewpoint of the code amount and the distortion amount is selected from among the plurality of inter prediction modes in units of prediction blocks, and the inter prediction information, the inter prediction signal, and the evaluation value of the inter prediction corresponding to the selected inter prediction mode as a candidate for the inter prediction of the prediction block are supplied to the coding method decision unit 105.

The coding method decision unit 105 determines a partition method, a prediction mode PredMode, and a partition mode PartMode of the coding block, which is optimal, based on the intra prediction evaluation value corresponding to the intra prediction information and the inter prediction evaluation value corresponding to the inter prediction information that are selected in each prediction block in units of a plurality of coding blocks, supplies coding information that includes the intra prediction information or the inter prediction information according to the determination to the second bitstream constructing unit 113, stores the coding information in the coding information storing memory 110, and supplies a prediction signal that has been intra-predicted or inter-predicted according to the determination to the residual signal generation unit 106 and the decoding picture signal superimposition unit 109.

The residual signal generation unit 106 generates a residual signal by subtracting the prediction signal that has been intra-predicted or inter-predicted from the picture signal to be coded for each pixel and supplies the residual signal to the orthogonal transform/quantization unit 107.

The orthogonal transform/quantization unit 107 generates an orthogonally transformed and quantized residual signal by performing an orthogonal transform and quantization for transforming the residual signal to be supplied into a frequency domain such as a DCT or a DST in accordance with a quantization parameter and supplies the orthogonally transformed and quantized residual signal to the third bitstream constructing unit 114 and the inverse quantization/inverse orthogonal transform unit 108.

The first bitstream constructing unit 112 calculates values of syntax elements relating to coding information in units of sequences, pictures, and slices in accordance with a semantics rule used for defining the meaning and the deriving method of the syntax elements, constructs a first bitstream by performing entropy coding of the calculated value of each syntax element through variable-length coding, arithmetic coding, or the like in accordance with the syntax rule, and supplies the coded first bitstream to the bitstream multiplexing unit 115. In addition, the value of the syntax element relating to the chroma format is calculated by the first bitstream constructing unit 112. The syntax element relating to the chroma formation is calculated based on the chroma format information that is supplied from the chroma format setting unit 101. FIG. 10 is an example of the definition of syntax at the time of coding the chroma format information using the sequence parameter set that is a header used for coding information relating to coding of the entire sequence defined in this example. A syntax element chroma_format_idc represents the type of the chroma format. As the meaning of the syntax chroma_format_idc, a value 0 represents monochrome, a value 1 represents 4:2:0, a value 2 represents 4:2:2, and a value 3 represents 4:4:4. In addition, the meaning of the syntax element separate_colour_plane_flag represents whether or not a luma signal and chroma signals are separately coded. A case where the value of the syntax element separate_colour_plane_flag is "0" represents that two chroma signals are coded with being associated with the luma signal. A case where the value of the syntax element chroma_format_idc is "1" represents that the luma signal and the two chroma signals are separately coded. Only in a case where the value of the syntax element chroma_format_idc is "3", in other words, in a case where the chroma format is 4:4:4, the value of the syntax element chroma_format_idc can be set to "0" or "1", and, for any other chroma format, the value of the syntax element separate_colour_plane_flag is constantly coded with being "0".

The second bitstream constructing unit 113 calculates the value of the syntax element relating to the coding information determined by the coding method decision unit 105 for each prediction block in addition to the coding information in units of coding blocks in accordance with the semantics rule that defines the meaning and the deriving method of the syntax element. More particularly, in addition to the coding information in units of coding blocks such as the partition method, the prediction mode PredMode, and the partition mode PartMode of the coding block, the value of the syntax element relating to the coding information in units of prediction blocks is calculated. In a case where the prediction mode PredMode is the intra prediction, the values of the syntax elements relating to the intra prediction mode including the luma intra prediction mode and the chroma intra prediction mode are calculated. On the other hand, in a case where the prediction mode PredMode is the inter prediction, the values of syntax elements relating to the inter prediction mode, information used for specifying a reference picture, and the inter prediction information such as a motion vector are calculated. Entropy coding using variable-length coding, arithmetic coding, or the like is performed for the calculated value of each syntax element in accordance with the syntax rule, a second bitstream is constructed, and the coded second bitstream is supplied to the bitstream multiplexing unit 115. Detailed processing contents relating to the calculation of syntax elements and the entropy coding relating to the luma intra prediction mode and the chroma intra prediction mode that are performed by the second bitstream constructing unit 113 will be described later.

The third bitstream constructing unit 114 constructs a third bitstream by performing entropy coding of the orthogonally-transformed and quantized residual signal through the variable-length coding, arithmetic coding, or the like in accordance with the defined syntax rule and supplies the third bitstream to the bitstream multiplexing unit 115.

The bitstream multiplexing unit 115 constructs a bitstream by multiplexing the first bitstream, the second bitstream, and the third bitstream in accordance with a defined syntax rule and outputs the multiplexed bitstream.

The inverse quantization/inverse orthogonal transform unit 108 calculates a residual signal by performing inverse quantization and inverse orthogonal transform of the orthogonally-transformed and quantized residual signal that is supplied from the orthogonal transform/quantization unit 107 and supplies the calculated residual signal to the decoding picture signal superimposition unit 109. The decoding picture signal superimposition unit 109 constructs a decoded picture by superimposing the prediction signal that has been intra-predicted or inter-predicted in accordance with the determination made by the coding method decision unit 105 and the residual signal that has been inversely-quantized and inversely-orthogonal transformed by the inverse quantization/inverse orthogonal transform unit 108 each other and stores the constructed decoded picture in the decoded picture memory 111. In addition, a filtering process for decreasing block distortion or the like due to coding may be performed for the decoded picture, and the processed decoded picture may be stored in the decoded picture memory 111.

Figure 2:
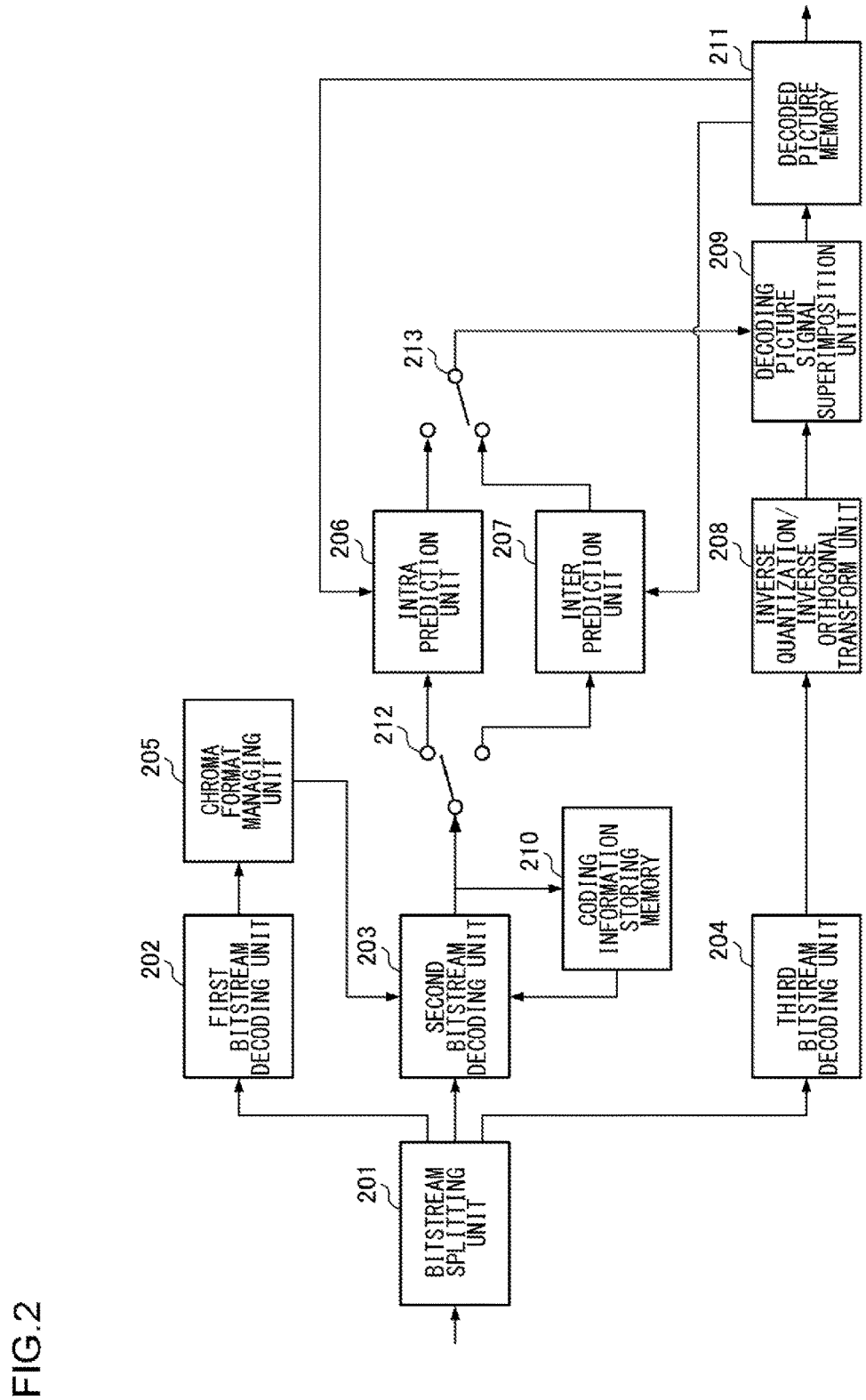
FIG. 2 is a block diagram that illustrates the configuration of a picture decoding device according to an embodiment.
Figures 4A, 4B, 4C:
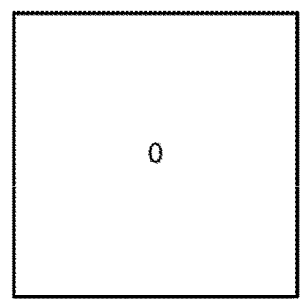
FIGS. 4A to 4C are diagrams that illustrate units in which switching between intra prediction modes according to an AVC/H.264 mode is performed.

FIG. 2 represents blocks that illustrate the configuration of a moving picture decoding device, which corresponds to the moving picture coding device illustrated in FIG. 1, according to an embodiment. The moving picture decoding device according to the embodiment is equipped with a bitstream splitting unit 201, a first bitstream decoding unit 202, a second bitstream decoding unit 203, a third bitstream decoding unit 204, a chroma format managing unit 205, an intra prediction unit 206, an inter prediction unit 207, an inverse quantization/inverse orthogonal transform unit 208, a decoding picture signal superimposition unit 209, a coding information storing memory 210, a decoded picture memory 211, and switches 212 and 213.

A bitstream supplied to the bitstream splitting unit 201 is split in accordance with a defined syntax rule, a first bitstream representing coding information in units of sequences, pictures, and slices is supplied to the first bitstream decoding unit 202, a second bitstream including coding information in units of coding blocks is supplied to the second bitstream decoding unit 203, and a third bitstream including an orthogonally transformed and quantized residual signal is supplied to the third bitstream decoding unit 204.

The first bitstream decoding unit 202 performs entropy decoding of the supplied first bitstream in accordance with a syntax rule and acquires values of syntax elements relating to the coding information in units of sequences, pictures, and slices. The coding information in units of sequences, pictures, and slices is calculated based on values of syntax elements relating to the coding information, which has been decoded, in units of sequences, pictures, and slices in accordance with a semantics rule used for defining the meaning and the deriving method of the syntax elements. The first bitstream decoding unit 202 is a bitstream decoding unit that corresponds to the first bitstream constructing unit 112 disposed on the coding side and has a function for returning the bitstream including the coding information in units of sequences, pictures, and slices, which has been coded by the first bitstream constructing unit 112 to each coding information. The chroma format information coded by the first bitstream constructing unit 112 is calculated based on the value of the syntax element relating to chroma format information that is acquired by performing entropy decoding of the second bitstream using the first bitstream decoding unit 202. In accordance with the syntax rule illustrated in FIG. 10 and the semantics rule, the type of the chroma format is specified based on the value of the syntax element chroma_format_idc, and, as the value of the syntax element chroma_format_idc, "0" represents monochrome, "1" represents 4:2:0, "2" represents 4:2:2, and "3" represents 4:4:4. In addition, in a case where the value of the syntax element chroma_format_idc is "3", the syntax element separate_colour_plane_flag is decoded, and it is determined whether or not a luma signal and chroma signals are separately coded. The calculated chroma format information is supplied to the chroma format managing unit 205.

The chroma format managing unit 205 manages the supplied chroma format information. The supplied chroma format information is supplied to the second bitstream decoding unit 203, and the process of calculating coding information of a coding block and a prediction block based on the chroma format information is performed. Although not illustrated in the figure, also in the third bitstream decoding unit 204 and the intra prediction unit 206, the inter prediction unit 207, the inverse quantization/inverse orthogonal transform unit 208, and the decoding picture signal superimposition unit 209 illustrated in FIG. 2, a decoding process based on the chroma format information is performed, and data is managed based on the chroma format information in the coding information storing memory 210 and the decoded picture memory 211.

The second bitstream decoding unit 203 performs entropy decoding of the supplied first bitstream in accordance with the syntax rule, thereby acquiring values of syntax elements relating to the coding information in units of coding blocks and prediction blocks. In accordance with the semantics rule that defines the meaning and deriving method of the syntax elements, the coding information in units of coding blocks and in units of prediction blocks is calculated based on the values of the syntax elements relating to the supplied coding information in units of coding blocks and in units of prediction blocks. The second bitstream decoding unit 203 is a coding information calculating unit that corresponds to the second bitstream constructing unit 113 disposed on the coding side and has a function for returning the second bitstream including the coding information in units of coding blocks and in units of prediction blocks, which has been coded by the second bitstream constructing unit 113, to each coding information. More specifically, based on each syntax element acquired by decoding the second bitstream in accordance with the defined syntax rule, in addition to the partition method, the prediction mode PredMode, and the partition mode PartMode of the coding block, in a case where the prediction mode PredMode is the intra prediction, an intra prediction mode that includes the luma intra prediction mode and the chroma intra prediction mode is acquired. On the other hand, in a case where the prediction mode PredMode is the inter prediction, inter prediction information such as the inter prediction mode, information used for specifying a reference picture, and a motion vector is acquired. In a case where the prediction mode PredMode is an intra prediction, the intra prediction mode including the luma intra prediction mode and the chroma intra prediction mode is supplied to the intra prediction unit 206 through the switch 212. In a case where the prediction mode PredMode is the inter prediction, the inter prediction information such as the inter prediction mode, information used for specifying a reference picture, and a motion vector is supplied to the inter prediction unit 207 through the switch 212. Detailed processes relating to the entropy decoding process performed by the second bitstream decoding unit 203 and the process of calculating the values of the luma intra prediction mode and the chroma intra prediction mode based on the syntax elements relating to the luma intra prediction mode and the chroma intra prediction mode will be described later.

The third bitstream decoding unit 204 calculates an orthogonally transformed and quantized residual signal by decoding the supplied bitstream and supplies the orthogonally transformed and quantized residual signal to the inverse quantization/inverse orthogonal transform unit 208.

The intra prediction unit 206 generates a predicted picture signal by performing an intra prediction based on a decoded neighboring block stored in the decoded picture memory 211 in accordance with the supplied intra prediction mode including the luma intra prediction mode and the chroma intra prediction mode and supplies the predicted picture signal to the decoding picture signal superimposition unit 209 through the switch 213. In addition, the units in which the intra prediction is made will be described later.

The inter prediction unit 207 generates a predicted picture signal by making an inter prediction using motion compensation based on the decoded reference picture stored in the decoded picture memory 211 by using the inter prediction mode, the information used for specifying the reference picture, and the inter prediction information such as a motion vector, which are to be supplied, and supplies the predicted picture signal to the decoding picture signal superimposition unit 209 through the switch 213. In addition, in the case of the both predictions, a final predicted picture signal is generated by adaptably multiplying two motion compensation predicted picture signals of the L0 and L1 predictions by weighing factors and superimposing the predicted picture signals each other.

The inverse quantization/inverse orthogonal transform unit 208 performs an inverse orthogonal transform and inverse quantization of the orthogonally transformed and quantized residual signal that has been decoded by the third bitstream decoding unit 204, thereby acquiring an inversely-orthogonal transformed and inversely-quantized residual signal.

The decoding picture signal superimposition unit 209 decodes the decoding picture signal by superimposing the predicted picture signal that has been predicted by the intra prediction unit 206 or the inter prediction unit 207 and the residual signal that has been inversely-orthogonal transformed and inversely quantized by the inverse quantization/inverse orthogonal transform unit 208 each other and stores the decoding picture signal in the decoded picture memory 211. When the decoded picture is stored in the decoded picture memory 211, a filtering process for decreasing block distortion or the like due to coding may be performed for the decoded picture before the decoded picture is stored in the decoded picture memory 211. The decoding picture signals stored in the decoded picture memory 211 are output in the output order.

Next, the prediction processing units in which the intra prediction is made, which is one of the features of the embodiment, will be described in detail.

First, a minimal unit of the orthogonal transform according to this example will be described. By using a characteristic of picture coding in which, while degradation in the picture quality of a low frequency component easily stands out, degradation in the picture quality of a high frequency component does not easily stand out, the code amount is reduced by quantizing the high frequency component more roughly than the low frequency component. However, in the case of the 2.times.2 conversion, it is difficult to sufficiently divide the signal into sufficient number of frequency components, and accordingly, the reduction effectiveness of the code amount is low. In addition, in a case where the processing unit of the intra prediction, the transformation, and the quantization is too small, the number of processing units corresponding thereof increases, whereby the processing becomes complex. Thus, in this example, the minimal unit of the orthogonal transform is set as 4.times.4 pixels.

Next, a minimal unit of the intra prediction made in this example, in other words, a minimal size of the prediction block in the case of the intra prediction will be described. In the intra prediction, since the pixel value of the processing target block is predicted based on the pixel values of a neighboring block that has been decoded within the same screen, it is necessary to complete the decoding process before the coding and decoding process of the subsequent block. More specifically, by using the prediction signal acquired by the intra prediction, a residual signal is calculated, an orthogonal transform, quantization, inverse-quantization, and inverse transform are performed for the residual signal, and a resultant signal is superimposed with the prediction signal, whereby the decoding process is completed, and a state is formed in which an intra prediction of a subsequent block can be made. Accordingly, it is necessary to perform the intra prediction in units of which the size is equal to or larger than the size of the minimal transform block. The reason for this is that, when the intra prediction is made in units of which the size is smaller than the size of the minimal transform block, thereafter, an orthogonal transform cannot be performed, and the decoding process cannot be performed. Accordingly, in this example, a minimal unit of the intra prediction, in other words, a minimal size of the prediction block at the time of performing the intra prediction is set as 4.times.4 pixels that is the same as the minimal unit of the orthogonal transform.

Next, a minimal size of the coding block according to this example will be described. In the minimal coding block, the partition mode PartMode is defined to be the N.times.N partition in both the intra prediction MODE_INTRA and the inter prediction of the prediction mode PredMode. While the N.times.N partition is a partition mode PartMode in which a coding block is partitioned into four prediction blocks through horizontal and vertical equal partition of luma signals of the coding block, the minimal unit of the intra prediction according to this example is set as 4.times.4 pixels, and accordingly, the minimal size of the coding block is 8.times.8 pixels in the luma signal.

Next, the method of partitioning chroma signals of the coding block for the N.times.N partition at the time of performing an intra prediction will be described. FIGS. 11A to 11D are diagrams that illustrate methods of partitioning chroma signals of a coding block for the N.times.N partition at the time of performing the intra prediction.

Figure 11:
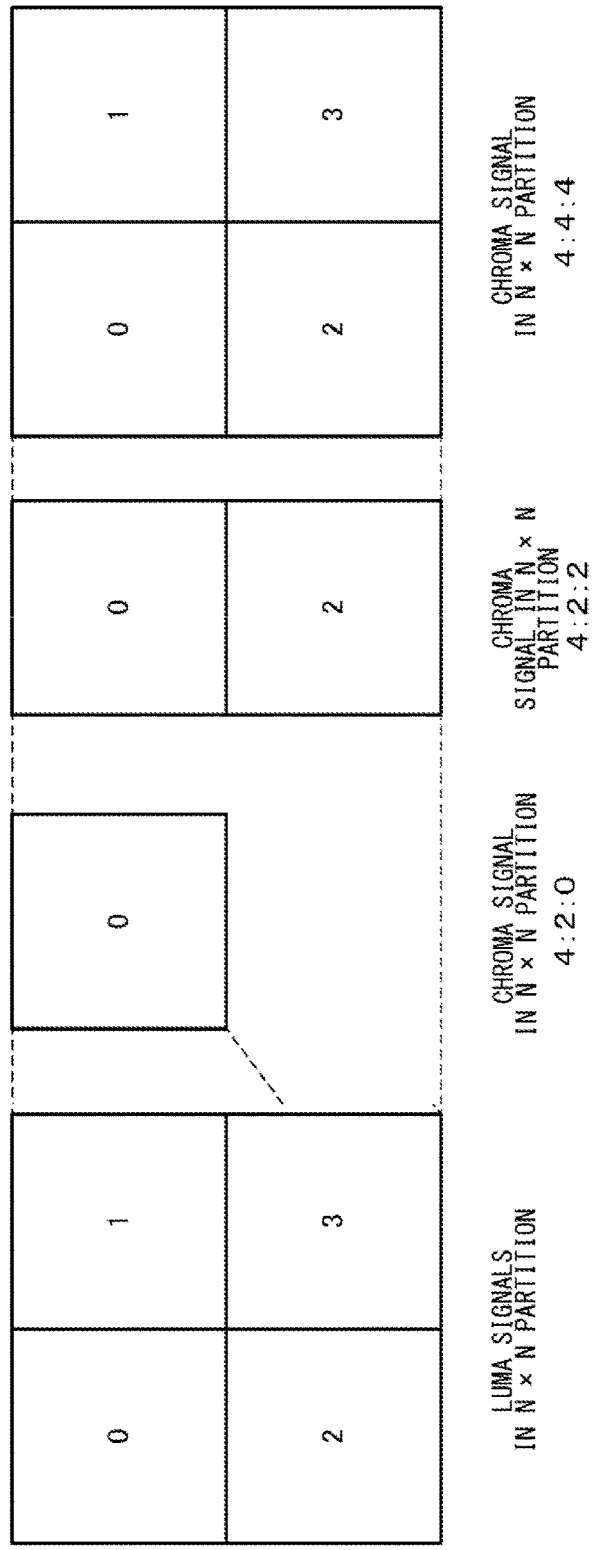
FIGS. 11A to 11D are diagrams that illustrate methods of partitioning chroma signals of a coding block for N.times.N partition at the time of performing an intra prediction defined in this example.

In a case where the chroma format is 4:2:0, when the minimal size of the coding block is 8.times.8 pixels in the luma signal, the minimal size of the coding block is 4.times.4 pixels in the chroma signal, and the coding block cannot be further partitioned. Thus, in this embodiment, in a case where the chroma format is 4:2:0, when the prediction mode is the intra prediction, and the partition mode PartMode is the N.times.N partition, as illustrated in FIG. 11A, an intra prediction is made in units of 4.times.4 pixels with the coding block being partitioned into four prediction blocks through horizontal and vertical equal partition of the coding block in the luma signal. However, in the chroma signal, as illustrated in FIG. 11B, the coding block is not partitioned and is set as one prediction block, and an intra prediction is made in units of 4.times.4 pixels of which the size is the same as the size of the prediction block of luma signals. In addition, the partition index PartIdx of the prediction block of chroma signals is set to "0".

In addition, in a case where the chroma format is 4:2:2, when the minimal size of the coding block is 8.times.8 pixels in the luma signal, the minimal size of the coding block is 4.times.8 pixels in the chroma signal. Accordingly, while the coding block can be equally partitioned horizontally, the coding block cannot be equally partitioned vertically. Therefore, in this embodiment, in the case where the chroma format is 4:2:2, when the prediction mode is an intra prediction, and the partition mode (PartMode) is N.times.N partition, as illustrated in FIG. 11A, in a luma signal, an intra prediction is made in units of 4.times.4 pixels for the coding block as four prediction blocks acquired through horizontal and vertical equal partition. On the other hand, in a chroma signal, as illustrated in FIG. 11C, an intra prediction is made similarly in units of 4.times.4 pixels for the coding block as two prediction blocks acquired through only the horizontal equal partition of the coding block without vertical partition thereof. In addition, the partition indexes PartIdx of the prediction blocks of chroma signals are set to "0" and "2" in the coding order (order from the upper side to the lower side). The reason for setting the partition index PartIdx of the lower block to "2" is that the lower prediction block of chroma signals is located at the same position as the position of the prediction block of which the partition index PartIdx of the luma signals is "2".

The prediction block of chroma signals and the prediction block of luma signals being at the same position represents that, when the coordinates of the uppermost and leftmost pixel of each prediction block is set as the reference position, the reference positions of the prediction block of chroma signals and the prediction block of luma signals being the same.

In a case where the chroma format is 4:4:4, when the minimal size of the coding block is 8.times.8 pixels in the luma signal, the minimal size of the coding block is 8.times.8 pixels in the chroma signal, and, similarly to the luma signal, the coding block can be partitioned into four prediction blocks through horizontal and vertical equal partition. Thus, in this embodiment, in a case where the chroma format is 4:4:4, when the prediction mode is the intra prediction, and the partition mode PartMode is the N.times.N partition, as illustrated in FIG. 11A, in the luma signal, an intra prediction is made in units of 4.times.4 pixels with the coding block being partitioned into four prediction blocks through horizontal and vertical equal partition of the coding block, and, also in the chroma signal, as illustrated in FIG. 11C, an intra prediction is made in units of 4.times.4 pixels with the coding block being partitioned into four prediction blocks through horizontal and vertical equal partition of the coding block. In addition, similarly to the luma signal, the partition indexes PartIdx of the prediction blocks of chroma signals are set to "0", "1", "2", and "3" in the coding order (the order of the upper left side, the upper right side, the lower left side, and the lower right side).

In the embodiment, regardless of the type of the chroma format, in a case where the values of the partition index PartIdx of the prediction block of the luma signals and the partition index PartIdx of the prediction block of the chroma signals are the same, the coordinates (the coordinates of a pixel located at the uppermost and leftmost position in the prediction block) representing the position of the prediction block of the luma signals and the coordinates (the coordinates of a pixel located at the uppermost and leftmost position in the prediction block) representing the position of the prediction block of the chroma signals are the same, and accordingly, the prediction blocks are located at the same position.

Next, in a case where the chroma format is 4:2:0, a case will be considered in which a coding block is partitioned into four parts in both the luma signal and the chroma signal through N.times.N partition of the inter prediction, and, a prediction block is formed such that the luma signal is 4.times.4 pixels, and the chroma signal is 2.times.2 pixels. In the inter prediction, in both the luma signal and the chroma signal, the inter prediction is made through motion compensation using common coding information. However, in the motion compensation of a chroma signal of which the chroma format is 4:2:0, a value acquired by scaling both the horizontal and vertical components half in the magnitude of the value of the reference motion vector through the luma signal is used. In the inter prediction, as is different from the intra prediction, the decoding signal of a neighboring block within the same picture is not used, and accordingly, an inter prediction processing unit that is smaller than the orthogonal transform processing unit can be used. Accordingly, since the orthogonal transform can be performed in units larger than the prediction block, even in a case where the coding block is partitioned into four parts in the chroma signal, and the inter prediction is made in units of 2.times.2 pixels, the orthogonal transform does not need to be performed necessarily in units of 2.times.2 pixels, and, by combining four prediction blocks after the inter predictions of the four prediction blocks and calculating a residual signal in units of 4.times.4 pixels, the orthogonal transform can be performed in units of 4.times.4 pixels.

Therefore, in the N.times.N partition of the inter prediction, regardless of the type of the chroma format, both the luma signals and the chroma signals are equally partitioned horizontally and vertically so as to form four prediction blocks.

Figure 12:
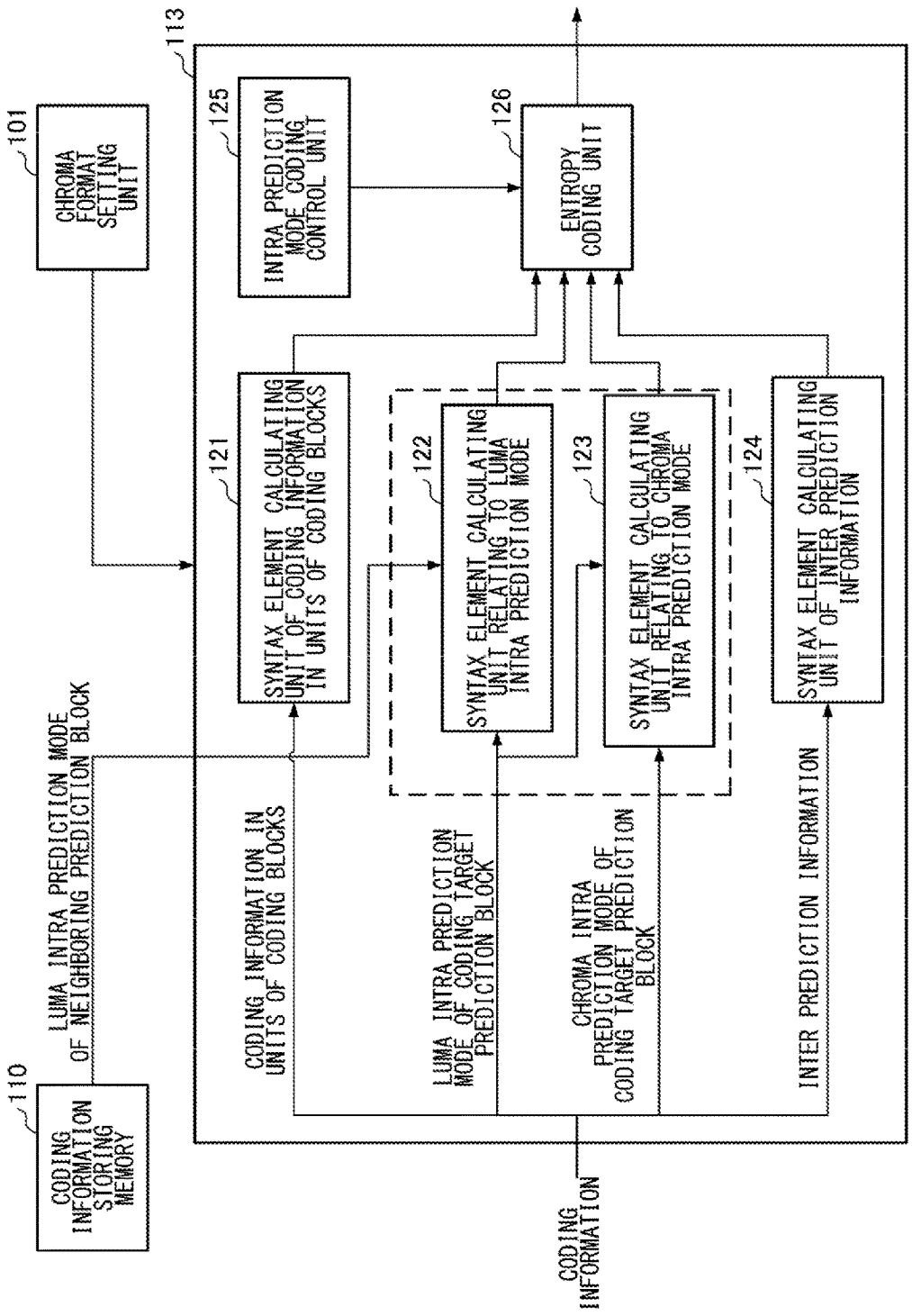
FIG. 12 is a block diagram that illustrates the configuration of a second bitstream constructing unit of the picture coding device according to the embodiment.

Next, the coding process of the coding information in units of coding blocks and prediction blocks that is performed by the second bitstream constructing unit 113 illustrated in FIG. 1 will be described with focusing on points relating to the intra prediction mode that is a feature of the embodiment. FIG. 12 is a block diagram that illustrates the configuration of the second bitstream constructing unit 113 illustrated in FIG. 1.

As illustrated in FIG. 12, the second bitstream constructing unit 113 illustrated in FIG. 1 is configured by: a syntax element calculating unit 121 relating to the coding information in units of coding blocks; a syntax element calculating unit 122 relating to the luma intra prediction mode; a syntax element calculating unit 123 relating to the chroma intra prediction mode; a syntax element calculating unit 124 relating to the inter prediction information; an intra prediction mode coding control unit 125; and an entropy coding unit 126. In each unit configuring the second bitstream constructing unit 113, a process corresponding to the chroma format information supplied from the chroma format setting unit 101 is performed, and a process corresponding to the coding information of the prediction mode, the partition mode PartMode, and the like in units of coding blocks is performed.

The syntax element calculating unit 121 relating to the coding information in units of coding blocks calculates the value of the syntax element relating to the coding information in units of coding blocks and supplies the calculated value of the syntax element to the entropy coding unit 126. The values of the syntax elements relating to the prediction mode PredMode used for determining the intra prediction MODE_INTRA or the inter prediction MODE_INTER of the coding block and the partition mode PartMode used for determining the shape of the prediction block are calculated by the syntax element calculating unit 121 relating to the coding information in units of the coding blocks The syntax element calculating unit 122 relating to the luma intra prediction mode, in a case where the prediction mode PredMode of the coding block is the intra prediction mode MODE_INTRA, calculates the values of syntax element relating to the luma intra prediction mode of the prediction block of the luma signal and supplies the calculated value of the syntax element to the entropy coding unit 126. The syntax elements relating to the luma intra prediction mode are a syntax element prev_intra_luma_pred_flag[x0][y0] that is a flag representing whether or not a prediction can be made based on the luma intra prediction mode of the neighboring block, a syntax element mpm_idx[x0][y0] that is an index indicating a prediction block as a prediction source, and a syntax element rem_intra_luma_pred_mode [x0][y0] that represents the luma intra prediction mode in units of prediction blocks. Here, x0 and y0 are coordinates that represent the position of the prediction block. In the calculation of the value of the syntax element relating to the luma intra prediction mode, the correlation with the luma intra prediction mode of a neighboring block stored in the coding information storing memory 110 is used. In a case where the prediction can be made based on the luma intra prediction mode of the neighboring block, a syntax element prev_intra_luma_pred_flag[x0][y0], which is a flag representing the use of the value, is set to "1" (true), and a value used for specifying a reference destination is set to the syntax element mpm_idx[x0][y0] that is an index indicating a prediction block of the prediction source. On the other hand, in a case where a prediction cannot be made, the syntax element prev_intra_luma_pred_flag[x0][y0] is set to "0" (false), and a value used for specifying the luma intra prediction mode is set to the syntax element rem_intra_luma_pred_mode[x0][y0] that represents the luma intra prediction mode to be coded.

The number of luma intra prediction modes of the prediction block within the coding block differs in accordance with the partitioned block. Thus, in a case where the partition mode PartMode is the 2N.times.2N partition, the values of the syntax elements relating to the luma intra prediction mode of the prediction blocks of one set are calculated for each coding block. In a case where the partition mode is the N.times.N partition, the values of the syntax elements relating to the luma intra prediction modes of prediction blocks of four sets are calculated for each coding block.

The syntax element calculating unit 123 relating to the chroma intra prediction mode, in a case where the prediction mode PredMode of the coding block is the intra prediction MODE_INTRA, calculates the value of the syntax element intra_chroma_pred_mode[x0][y0] relating to the chroma intra prediction mode of the prediction block of chroma signals and supplies the calculated value of the syntax element intra_chroma_pred_mode[x0][y0] to the entropy coding unit 126. In the calculation of the value of the syntax element relating to the chroma intra prediction mode, the correlation with the luma intra prediction mode of the prediction block of luma signals that is located at the same position as the position of the prediction block of chroma signals is used. Thus, in a case where a chroma intra prediction mode can be predicted based on the luma intra prediction mode of the prediction block of luma signals that is located at the same position as the position of the prediction block of chroma signals, the value of the chroma intra prediction mode is predicted based on the value of the luma intra prediction mode. On the other hand, in a case where the chroma intra prediction mode cannot be predicted based on the luma intra prediction mode, a structure is used in which any one of values "0" (vertical direction), "1" (horizontal direction), "2" (average value), and "3" (inclination of 45 degrees), which are representative in intra prediction modes, is set to the chroma intra prediction mode. As a result, the code amount is reduced.

Here, a method of predicting the value of the chroma intra prediction mode based on the value of the luma intra prediction mode and the value of the syntax element relating to the chroma intra prediction mode on the decoding side will be described. FIG. 14 is a conversion table used for calculating the value of the chroma intra prediction mode based on the value of the syntax element intra_chroma_pred_mode[x0][y0] relating to the chroma intra prediction mode defined in this example and the value of the luma intra prediction mode of the prediction block located at the same position as the position of the prediction block of chroma signals. By using this conversion table, the value of the chroma intra prediction mode is calculated on the decoding side.

In a case where the value of the syntax element intra_chroma_pred_mode[x0][y0] is "0", the value of the chroma intra prediction mode is predicted in accordance with the chroma format based on the value of the luma intra prediction mode of the prediction block located at the same position as the position of the prediction block of chroma signals.

In a case where the chroma format is 4:2:0 or 4:4:4, and the value of the syntax element intra_chroma_pred_mode[x0][y0] is "0", the value of the luma intra prediction mode of the prediction block located at the same position as the position of the prediction block of chroma signals is directly set as the value of the chroma intra prediction mode.

In a case where the chroma format is 4:2:2 and the value of the syntax element intra_chroma_pred_mode[x0][y0] is "0", based on a conversion table illustrated in FIG. 15, the value of the chroma intra prediction mode is calculated in accordance with the value of the luma intra prediction mode of the prediction block located at the same position as the position of the prediction block of chroma signals. FIG. 15 is a conversion table used for predicting the value of the chroma intra prediction mode based on the value of the luma intra prediction mode of the prediction block located at the same position as the position of the prediction block of chroma signals in a case where the chroma format is 4:2:2 that is defined in this example.

In a case where the chroma format is 4:2:2, when the value of the chroma intra prediction mode is predicted based on the value of the luma intra prediction mode, the reason for not using the original value, unlike the case of the chroma format of 4:2:0 or 4:4:4, but calculating the value using the conversion table illustrated in FIG. 15 will be described. The chroma format of 4:2:2, as illustrated in FIG. 3B, is a chroma format in which chroma signals are sampled to have a half density of the density of luma signals in the horizontal direction and to have the same density as the density of the luma signals in the vertical direction. Accordingly, when an intra prediction of a chroma signal is performed in a prediction direction acquired by performing ½ times scaling in the horizontal direction for each prediction direction of the luma intra prediction mode or in a prediction direction neighboring thereto, a result that is the same as or close to that of the intra prediction of the luma signal of the prediction block located at the same position as the position of the prediction block of the chroma signal is acquired.

Figure 27B:
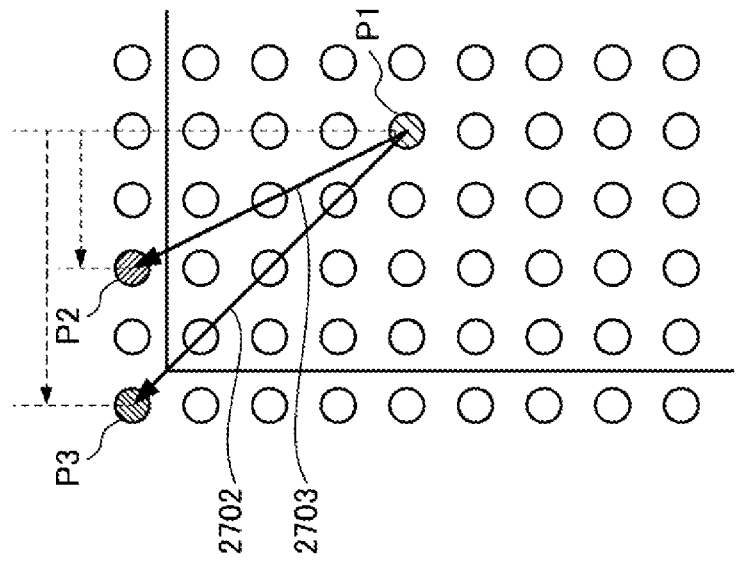
FIGS. 27A and 27B are diagrams that illustrate the correspondence relation between the prediction directions of intra predictions of a luma signal and a chroma signal in a case where the chroma format is 4:2:2.
Figure 27A:
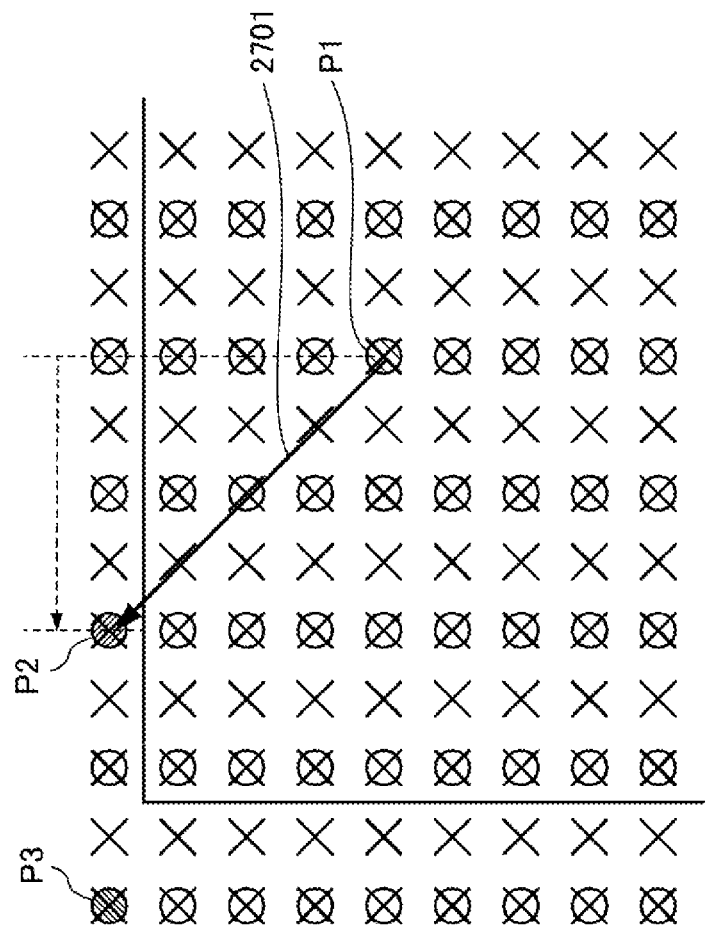

This will be described in detail with reference to FIGS. 27A and 27B. FIGS. 27A and 27B are diagrams that illustrate the correspondence relation between the prediction directions of intra predictions of a luma signal and a chroma signal in a case where the chroma format is 4:2:2. In FIGS. 27A and 27B, "X" represents the position of a pixel of a luma signal, and ".smallcircle." represents the position of a pixel of a chroma signal. In the case where the chroma format is 4:2:2, the chroma signals are sampled in the horizontal direction at a half ratio of that of luma signals. FIG. 27A represents the positions of sampled pixels of luma signals and chroma signals of 4:2:2. Reference sign P1 represents a pixel that is intra-predicted, and reference sign P2 represents a pixel (actually, a pixel neighboring thereto is also referred to due to a filtering process) that is referrer to at the time of making the intra prediction. An arrow, which is denoted by reference sign 2701, directing from the pixel P1 to the pixel P2 represents the intra prediction direction of the pixel P1 of the luma signal.

FIG. 27B represents the array of pixels of chroma signals that have been sampled at a half ratio in the horizontal direction. Here, when an intra prediction of a chroma signal is made, in a case where ½ scaling is not performed in the horizontal direction, the intra prediction direction of the pixel P1 of the chroma signal is the direction of an arrow denoted by reference sign 2702, and in the pixel array of chroma signals, the pixel denoted by reference sign P3 is incorrectly referred to. However, the correct reference destination is a pixel denoted by reference sign P2. Thus, by performing ½-times scaling in the horizontal direction for the intra prediction direction of the luma signal to be set as the intra prediction direction of the chroma signal, as denoted by reference sign 2703, a correct intra prediction direction for the array of chroma signals is calculated, and a pixel neighboring to the upper side that is a correct reference destination located at the end in the intra prediction direction is derived.

In FIGS. 27A and 27B, although a case has been described in which a pixel that is neighboring to the upper side of a prediction block is referred to, a case may be similarly applied in which a pixel that is neighboring to the left side thereof is referred to. In the case of a pixel neighboring to the left side, by performing two-times scaling in the vertical direction for the intra prediction direction of the luma signal (this is the same as deriving the direction of a vector by performing ½-times scaling in the vertical direction), a correct intra prediction direction for the array of chroma signals is calculated, and a pixel (including a pixel that is partially neighboring to the upper side) neighboring to the left side that is a correct reference destination located at the end in the intra prediction direction is derived.

Thus, in the conversion table illustrated in FIG. 15, as denoted by dotted-line arrows illustrated in FIG. 8, when the values of the luma intra prediction mode in which reference destinations are aligned in the horizontal direction (on the horizontal axis) are 3, 18, 10, 19, 4, 20, 11, 21, 0, 22, 12, 23, 5, 24, 13, 25, and 6, by performing ½ times scaling of such values in the horizontal direction, values of the chroma intra prediction modes in the prediction direction closest to the calculated prediction direction are selected, and the values of the chroma intra prediction modes are respectively set to 19, 4, 20, 20, 11, 11, 21, 0, 0, 0, 22, 12, 12, 23, 23, 5, and 24. Here, performing ½ time scaling of the prediction direction of the intra prediction in the horizontal direction is the same as performing two-times scaling thereof in the vertical direction. Thus, when an intra prediction of a chroma signal is performed in a prediction direction derived by performing two-times scaling of each prediction direction of the luma intra prediction mode in the vertical direction or in a prediction direction neighboring thereto, a result of the prediction that is the same as or close to that of the intra prediction of the luma signal of the prediction block located at the same position as the position of the prediction block of chroma signals is derived. Accordingly, in the conversion table illustrated in FIG. 15, as illustrated in FIG. 8, when the values of the luma intra prediction mode in which reference destinations are aligned in the vertical direction (on the vertical axis) are 26, 14, 27, 7, 28, 15, 29, 1, 30, 16, 31, 8, 32, 17, 33, and 9, by performing two-times scaling of such values in the vertical direction, values of the chroma intra prediction modes in a prediction direction closest to the calculated prediction direction are selected, and the values of the chroma intra prediction modes are respectively set to 10, 18, 3, 26, 27, 28, 15, 1, 16, 31, 32, 33, 9, 9, 9, and 9.

Figure 28B:
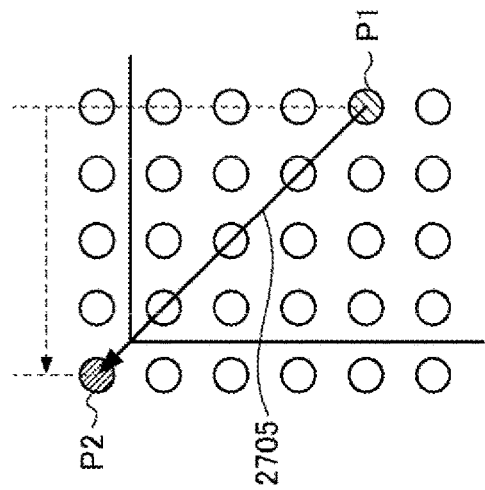
FIGS. 28A and 28B are diagrams that illustrate the correspondence relation between the prediction directions of intra predictions of a luma signal and a chroma signal in a case where the chroma format is 4:2:0.
Figure 28A:
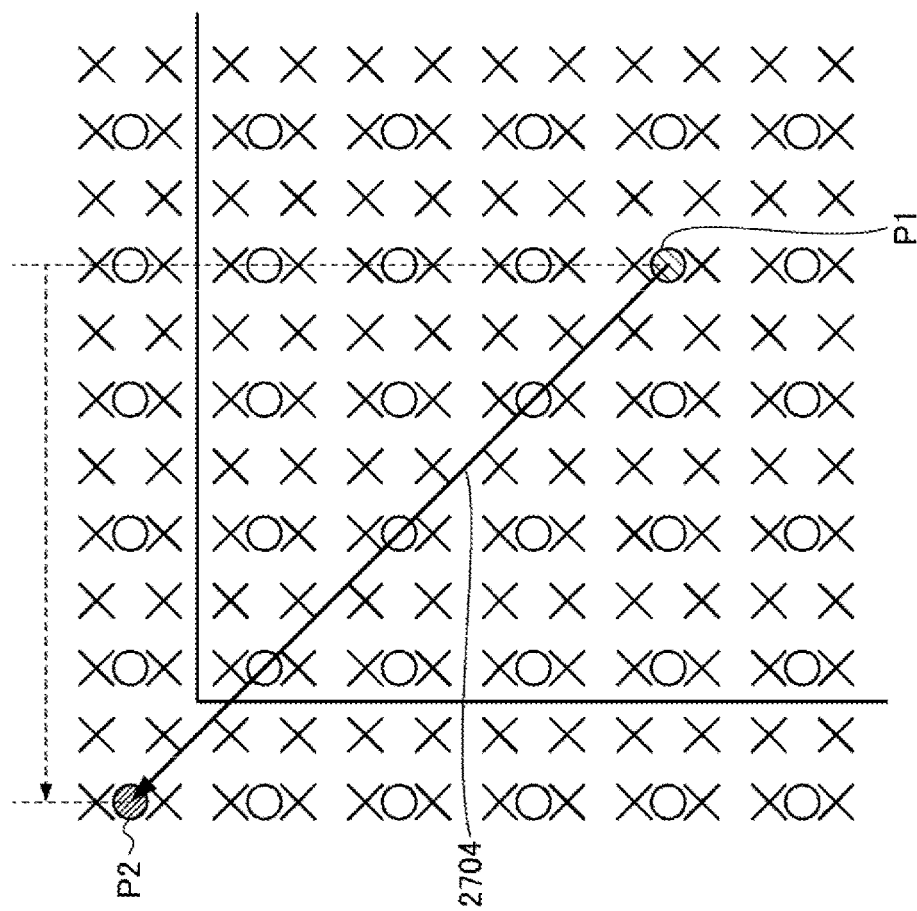

On the other hand, in a case where the chroma format is 4:2:0 or 4:4:4, when the value of the chroma intra prediction mode is predicted based on the value of the luma intra prediction mode, the intra prediction direction of the luma signal and the intra prediction direction of the chroma signal coincide with each other, and the value of the luma intra prediction mode does not need to be converted into the value of the chroma intra prediction mode. This will be described with reference to FIGS. 28A and 28B. FIGS. 28A and 28B are diagrams that illustrate the correspondence relation between the prediction directions of intra predictions of a luma signal and a chroma signal in a case where the chroma format is 4:2:0. FIG. 28A illustrates the arrangement of luma signals and chroma signals in the case where the chroma format is 4:2:0. The chroma signals are sampled at a half ratio horizontally and vertically. An arrow, which is denoted by reference sign 2704 from a pixel P1 to a pixel P2 represents the intra prediction direction of the pixel P1 of the luma signal. In this case, also in the arrangement of chroma signals illustrated in FIG. 28B, the intra prediction direction of the luma signal is, as denoted by reference sign 2705, directly the intra prediction direction of the chroma signal, and accordingly, the pixel P2 that is the reference destination of the pixel P1 of the chroma signal can be correctly referred to.

In addition, in consideration of the above-described points, in a case where the value of the chroma intra prediction mode is predicted, the intra prediction unit 103 predicts the value of the chroma intra prediction mode based on the value of the luma intra prediction mode of the prediction block located at the same position as the position of the prediction block of the chroma signal in accordance with the chroma format. In other words, in a case where the chroma format is 4:2:0 or 4:4:4, and the value of the chroma intra prediction mode is predicted, the value of the luma intra prediction mode of a prediction block located at the same position as the position of the prediction block of the chroma signal is directly set as the value of the chroma intra prediction mode. In a case where the chroma format is 4:2:2, and the value of the chroma intra prediction mode is predicted, based on the conversion table illustrated in FIG. 15, the value of the chroma intra prediction mode is calculated in accordance with the value of the luma intra prediction mode of the prediction block located at the same position as the position of the prediction block of the chroma signal.

In a case where the value of the syntax element intra_chroma_pred_mode[x0][y0] is in the range of "1" to "4", the value of the chroma intra prediction mode is calculated based on a combination of the value of the syntax element intra_chroma_pred_mode[x0][y0] and the value of the luma intra prediction mode of the prediction block located at the same position as the position of the prediction block of the chroma signal.

In a case where the value of the syntax element intra_chroma_pred_mode[x0][y0] is "1", the value of the chroma intra prediction mode takes the value of "0" or "1" in accordance with the value of the luma intra prediction mode of a prediction block located at the same position as the position of the prediction block of the chroma signal.

In a case where the value of the syntax element intra_chroma_pred_mode[x0][y0] is "2", the value of the chroma intra prediction mode takes the value of "1" or "2" in accordance with the value of the luma intra prediction mode of a prediction block located at the same position as the position of the prediction block of the chroma signal.

In a case where the value of the syntax element intra_chroma_pred_mode[x0][y0] is "3", the value of the chroma intra prediction mode takes the value of "2" or "3" in accordance with the value of the luma intra prediction mode of a prediction block located at the same position as the position of the prediction block of the chroma signal.

In a case where the value of the syntax element intra_chroma_pred_mode[x0][y0] is "4", the value of the chroma intra prediction mode takes the value of "3".

FIG. 16 is a conversion table used for calculating the value of a syntax element intra_chroma_pred_mode[x0][y0] relating to the chroma intra prediction mode based on the value of the chroma intra prediction mode and the value of the luma intra prediction mode of a prediction block located at the same position as the position of the prediction block of the chroma signal, in other words, the prediction block of a luma signal belonging to the same prediction unit. The conversion table illustrated in FIG. 16 corresponds to the conversion table illustrated in FIG. 14. By using the conversion table illustrated in FIG. 16, on the coding side, the value of the syntax element intra_chroma_pred_mode[x0][y0] is calculated.

In a case where the value of the chroma intra prediction mode is "0", the value of the syntax element intra_chroma_pred_mode[x0][y0] takes the value of "0" or "1" in accordance with the value of the luma intra prediction mode of a prediction block located at the same position as the position of the prediction block of the chroma signal.

In a case where the value of the chroma intra prediction mode is "1", the value of the syntax element intra_chroma_pred_mode[x0][y0] takes the value of "0", "1", or "2" in accordance with the value of the luma intra prediction mode of a prediction block located at the same position as the position of the prediction block of the chroma signal.

In a case where the value of the chroma intra prediction mode is "2", the value of the syntax element intra_chroma_pred_mode[x0][y0] takes the value of "0", "2", or "3" in accordance with the value of the luma intra prediction mode of a prediction block located at the same position as the position of the prediction block of the chroma signal.

In a case where the value of the chroma intra prediction mode is "3", the value of the syntax element intra_chroma_pred_mode[x0][y0] takes the value of "0", "3", or "4" in accordance with the value of the luma intra prediction mode of a prediction block located at the same position as the position of the prediction block of the chroma signal.

In a case where the value of the chroma intra prediction mode is in the range of "4" to "33", it is represented that the chroma intra prediction mode is predicted based on the value of the luma intra prediction mode of a prediction block located at the same position, and the value of the syntax element intra_chroma_pred_mode[x0][y0] takes the value of "0". However, in a case where the chroma format is 4:2:2, and the value of the chroma intra prediction mode is predicted, the intra prediction unit 103, based on the conversion table illustrated in FIG. 15, calculates the value of the chroma intra prediction mode in accordance with the value of the luma intra prediction mode of a prediction block located at the same position as the position of the prediction block of the chroma signal, and accordingly, the value of the chroma intra prediction mode can take any one of 4, 5, 9, 10, 11, 12, 15, 16, 18, 19, 20, 21, 22, 23, 24, 26, 27, 28, 31, 32, and 33.

In order to specify a prediction block of the luma signal that is located at the same position as the position of the prediction block of the chroma signal, the partition index PartIdx that specifies each prediction block may be referred to, or the coordinates that represent the position of each prediction block may be referred to.

In addition, since the number of chroma intra prediction modes of prediction blocks within a coding block is different in accordance with the type of the chroma format supplied from the chroma format setting unit 101, in a case where the chroma format is 4:2:0, the value of the syntax element relating to the chroma intra prediction mode of one prediction block is calculated for each coding block.

Furthermore, the number of chroma intra prediction modes of prediction blocks within a coding block is different in accordance with a combination of the partition mode and the chroma format, and, in a case where the partition mode is 2N.times.2N partition, the value of the syntax element relating to the chroma intra prediction mode of one prediction block is calculated for each coding block regardless of the type of the chroma format. In a case where the partition mode is N.times.N partition, and the chroma format is 4:2:0, the value of the syntax element relating to the luma intra prediction mode of one prediction block is calculated for each coding block. In a case where the partition mode is N.times.N partition, and the chroma format is 4:2:2, the value of the syntax element relating to the luma intra prediction mode of two prediction blocks is calculated for each coding block. In a case where the partition mode is N.times.N partition, and the chroma format is 4:4:4, the value of the syntax element relating to the luma intra prediction mode of four prediction blocks is calculated for each coding block.

In a case where the prediction mode PredMode of the coding block is the inter prediction MODE_INTER, the syntax element calculating unit 124 relating to the inter prediction information calculates the value of the syntax element relating to the inter prediction information in units of prediction blocks and supplies the calculated value of each syntax element to the entropy coding unit 126. In the inter prediction information in units of prediction blocks, information such as the inter prediction mode (the L0 prediction, the L1 prediction, or both predictions), an index used for specifying a plurality of reference pictures, and a motion vector is included.

The entropy coding unit 126 performs entropy coding of the value of the syntax element relating to the coding information in units of coding blocks that is supplied from the syntax element calculating unit 121 relating to the coding information in units of coding blocks, the value of the syntax element relating to the luma intra prediction mode of the prediction block of the luma signal that is supplied from the syntax element calculating unit 122 relating to the luma intra prediction mode, the value of the syntax element relating to the chroma intra prediction mode of the prediction block of the chroma signal that is supplied from the syntax element calculating unit 123 relating to the chroma intra prediction mode, and the value of the syntax element relating to the inter prediction information in units of prediction blocks that is supplied from the syntax element calculating unit 124 relating to the inter prediction information in accordance with a syntax rule set in advance. At that time, the intra prediction mode coding control unit 125 controls the sequence of the entropy coding of the luma intra prediction mode and the chroma intra prediction mode in accordance with the partition mode and the chroma format, and the entropy coding unit 126 performs the entropy coding process of the luma intra prediction mode and the chroma intra prediction mode in the sequence directed by the intra prediction mode coding control unit 125.

Figure 17A:
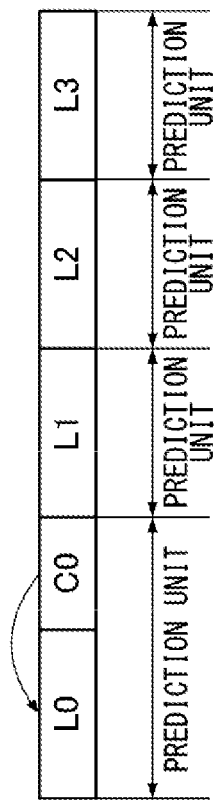
FIGS. 17A to 17C are diagrams that illustrate the sequences of entropy coding or decoding of a syntax element relating to the luma intra prediction mode and the chroma intra prediction mode according to an embodiment.
Figure 17B:
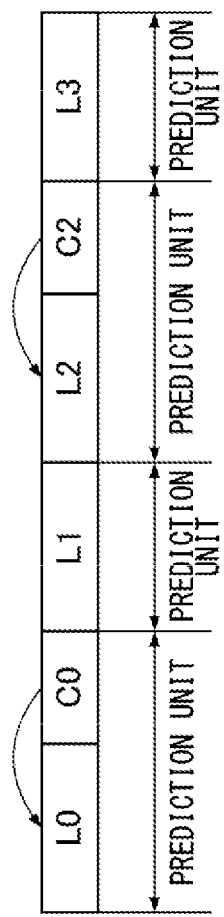
Figure 17C:
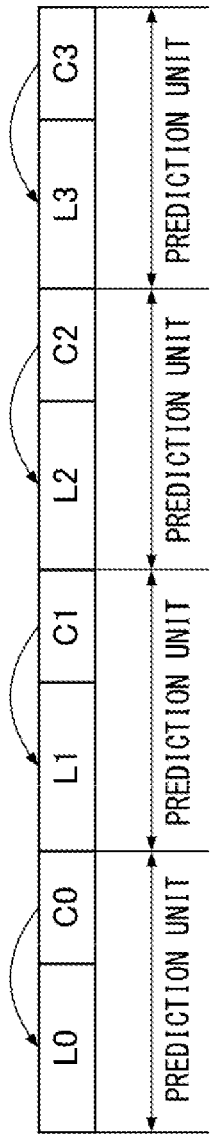

Hereinafter, the sequence of the entropy coding of the luma intra prediction mode and the chroma intra prediction mode at the time of the N.times.N partition, which is performed by the entropy coding unit 126 controlled by the intra prediction mode coding control unit 125, will be described. FIGS. 17A to 17C are diagrams that illustrate entropy coding or decoding sequences of syntax elements relating to the luma intra prediction mode and the chroma intra prediction mode according to the embodiment. FIGS. 17A, 17B, and 17C illustrate the entropy coding and decoding sequences in a case where the chroma formats are respectively 4:2:0, 4:2:2, and 4:4:4. Here, L0, L1, L2, and L3 represent that the partition indexes PartIdx of luma signals are syntax elements relating to the luma intra prediction modes of "0", "1", "2", and "3". In addition, C0, C1, C2, and C3 represent that the partition indexes PartIdx of chroma signals are syntax elements relating to the chroma intra prediction modes of the prediction blocks of "0", "1", "2", and "3"

In a case where the chroma format is 4:2:0, right after L0 is coded, C0 is coded, and, subsequently, L1, L2, and L3 are coded (C1, C2, and C3 are neither present nor coded).

In a case where the chroma format is 4:2:2, L0 is coded, C0 is coded right after L0, subsequently, L1 and L2 are coded, C2 is coded right after L2, and subsequently, L3 is coded (C1 and C3 are neither present nor coded).

In a case where the chroma format is 4:4:4, L0 is coded, C0 is coded right after L0, and subsequently, L1, C1, L2, C2, L3, and C3 are sequentially coded.

In other words, the luma intra prediction mode and the chroma intra prediction mode belonging to the same prediction unit are consecutively coded.

In a case where entropy coding is performed in the coding sequence illustrated in FIGS. 17A to 17C, there are following advantages.

As a first advantage, when the value of the chroma intra prediction mode is calculated based on the value of the syntax element relating to the chroma intra prediction mode that is acquired by performing entropy decoding the bitstream on the decoding side, there is an advantage of simplifying the processing.

In the coding sequence illustrated in FIGS. 17A to 17C, the chroma intra prediction mode is constantly calculated regardless of the prediction mode, the partition mode, and the chroma format by referring to the value of the intra prediction mode calculated based on the syntax element relating to the luma intra prediction mode that has been previously coded, whereby the processing can be simplified.

As a second advantage, when the prediction mode is the intra prediction, and the partition mode is N.times.N partition, there is an advantage of shortening the delay time of a series of processes relating to the intra prediction of a prediction block of a chroma signal on the decoding side.

In the coding sequence illustrated in FIGS. 17A to 17C, right after entropy coding is performed for the syntax element L0 relating to the luma intra prediction mode of the prediction block of a luma signal, by performing entropy coding of the syntax element C0 relating to the chroma intra prediction mode of the prediction block of a chroma signal that is located at the same position as the position of the prediction block of a luma signal belonging to the same prediction unit, on the decoding side, right after entropy decoding is performed for the syntax element L0 relating to the luma intra prediction mode of the prediction block of a luma signal, entropy decoding can be performed for the syntax element C0 relating to the chroma intra prediction mode of the prediction block of a chroma signal that is located at the same position as the position of the prediction block of the luma signal, and the calculation of the chroma intra prediction mode can be quickly started. Accordingly, the intra prediction process of the chroma signal performed thereafter can be quickly started, and, in a case where an intra prediction of a prediction block of a luma signal and an intra prediction of a prediction block of a chroma signal are performed in parallel with each other, the delay time of each process relating to the chroma signal can be shortened. In addition, in a case where the chroma format is 4:2:2 or 4:4:4, as the intra prediction process of the prediction block of a chroma signal having "0" as the partition index PartIdx corresponding to C0 is quickly started, the intra prediction process of a prediction block having a partition index PartIdx as being a value other than "0" referring to the decoding signal of the prediction block of the chroma signal having "0" as the partition index PartIdx can be quickly started. In addition, by performing coding of the syntax element C0 relating to the chroma intra prediction mode before the syntax element L1 relating to the luma intra prediction mode, on the decoding side, the start of the entropy decoding process of the syntax elements L1, L2, and L3 relating to the luma intra prediction mode is delayed. However, in order to start the intra prediction process of the prediction block corresponding to L1, a series of decoding processes (an intra prediction, inverse quantization, and inverse orthogonal conversion) relating to a prediction block corresponding to L0 to be referred to at the time of the intra prediction needs to be completed, and accordingly, there is scarcely a disadvantage due to the delay of the entropy decoding of L1, L2, and L3.

Figure 13:
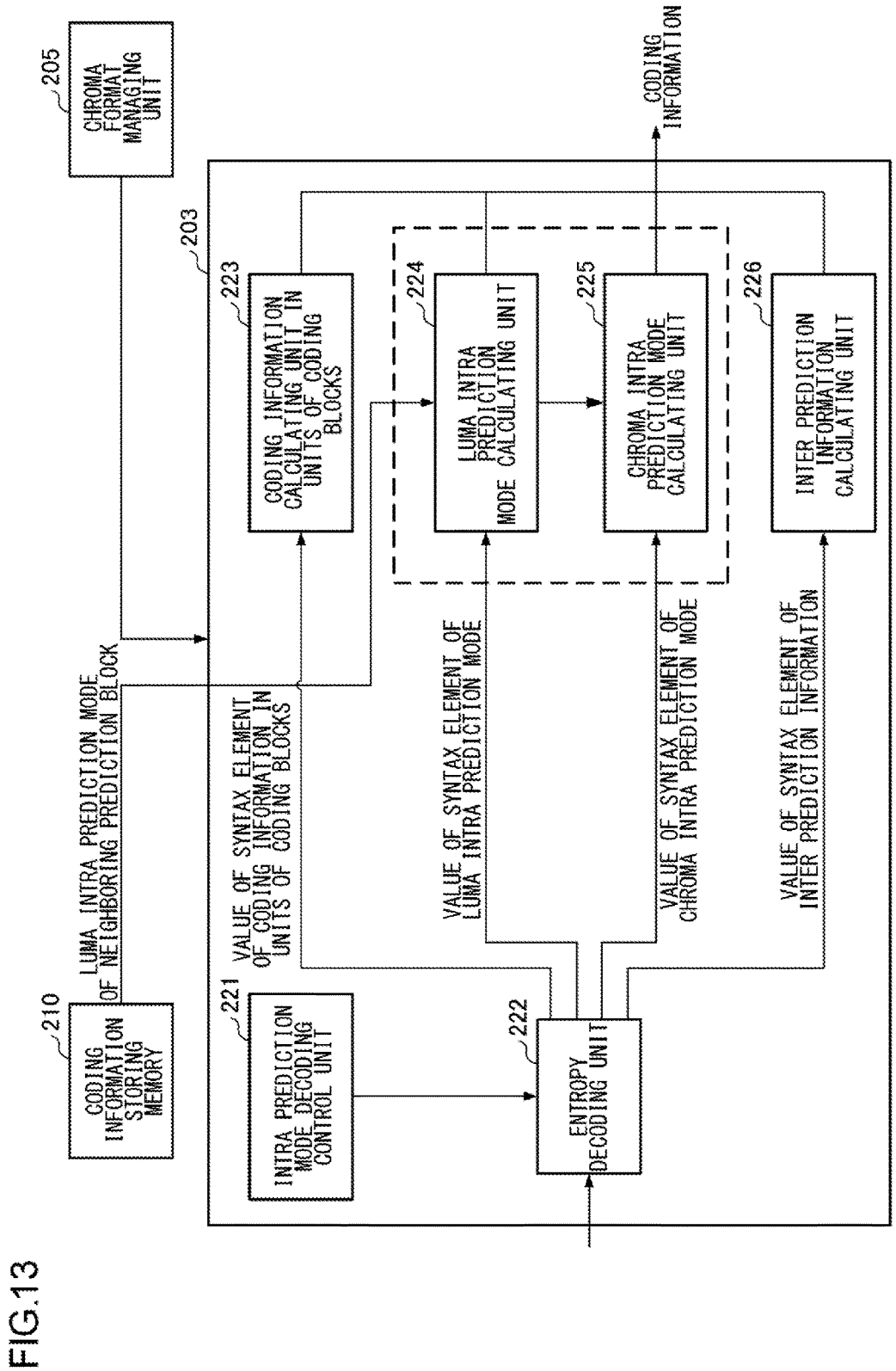
FIG. 13 is a block diagram that illustrates the configuration of a second bitstream decoding unit of the picture decoding device according to the embodiment.

Next, the decoding process of coding information in units of coding blocks and prediction blocks that is performed by the second bitstream decoding unit 203 illustrated in FIG. 2 will be described with focusing on points relating to the intra prediction mode that is a feature of the embodiment. FIG. 13 is a block diagram that illustrates the configuration of the second bitstream decoding unit 203 illustrated in FIG. 2.

As illustrated in FIG. 13, the second bitstream decoding unit 203 illustrated in FIG. 2 is configured by: an intra prediction mode decoding control unit 221; an entropy decoding unit 222; a coding information calculating unit 223 in units of coding blocks; a luma intra prediction mode calculating unit 224; a chroma intra prediction mode calculating unit 225; and an inter prediction information calculating unit 226. Each unit configuring the second bitstream decoding unit 203 performs the process according to the chroma format information supplied from the chroma format managing unit 205 and performs the process according to the coding information such as the prediction mode and the partition mode in units of coding blocks.

The entropy decoding unit 222 performs entropy decoding of a bitstream including coding information in units of coding blocks and prediction blocks, which is supplied from the bitstream splitting unit, in accordance with a syntax rule set in advance and derives the value of the syntax element relating to the coding information in units of coding blocks, the value of the syntax element relating to the luma intra prediction mode of the prediction block of luma signals, the value of the syntax element relating to the chroma intra prediction mode of the prediction block of chroma signals, and the value of the syntax element relating to the inter prediction information in units of prediction blocks. At that time, the intra prediction mode decoding control unit 221 controls the sequence of the entropy decoding of the luma intra prediction mode and the chroma intra prediction mode in accordance with the partition mode and the chroma format, and the entropy decoding unit 222 performs the entropy decoding process of the luma intra prediction mode and the chroma intra prediction mode in the sequence directed by the intra prediction mode decoding control unit 221. The intra prediction mode decoding control unit 221 is a control unit that corresponds to the intra prediction mode coding control unit 125 disposed on the coding side and sets the decoding sequence of the intra prediction mode, which is the same as the coding sequence of the intra prediction mode set by the intra prediction mode coding control unit 125, in accordance with the partition mode and the chroma format and controls the decoding sequence of the intra prediction mode of the entropy decoding unit 222. The entropy decoding unit 222 is a decoding unit that corresponds to the entropy coding unit 126 disposed on the coding side and performs entropy decoding in accordance with the same rule as the syntax rule used by the entropy coding unit 126. In other words, the decoding process of the intra prediction mode is performed in the same sequence as the coding sequence illustrated in FIGS. 17A to 17C. In other words, an luma intra prediction mode and a chroma intra prediction mode belonging to the same prediction unit are consecutively decoded.

The value of the syntax element relating to the coding information in units of coding blocks, which has been acquired by being decoded, is supplied to the coding information calculating unit 223 in units of coding blocks, the value of the syntax element relating to the luma intra prediction mode of the prediction block of luma signals is supplied to the luma intra prediction mode calculating unit 224, the value of the syntax element relating to the chroma intra prediction mode of the prediction block of chroma signals is supplied to the chroma intra prediction mode calculating unit 225, and the value of the syntax element relating to the inter prediction information in units of prediction blocks is supplied to the inter prediction information calculating unit 226.

The coding information calculating unit 223 in units of coding blocks calculates the coding information in units of coding blocks based on the supplied value of the syntax element relating to the coding information in units of the coding blocks and supplies the calculated coding information to the intra prediction unit 206 or the inter prediction unit 207 through the switch 212.

The coding information calculating unit 223 in units of coding blocks is a coding information calculating unit that corresponds to the syntax element calculating unit 121 relating to the coding information in units of coding blocks disposed on the coding side and performs calculation in accordance with the same semantics rule. The values relating to the prediction mode PredMode used for determining either the intra prediction MODE_INTRA or the inter prediction MODE_INTER of the coding block and the partition mode PartMode used for determining the shape of the prediction block are calculated by the coding information calculating unit 223 in units of coding blocks.

In a case where the prediction mode PredMode of the coding block that is calculated by the coding information calculating unit 223 in units of coding blocks is the intra prediction MODE_INTRA, the luma intra prediction mode calculating unit 224 calculates the luma intra prediction mode of the prediction block of luma signals based on the supplied value of the syntax element relating to the luma intra prediction mode of the prediction block of luma signals, supplies the calculated luma intra prediction mode to the chroma intra prediction mode calculating unit 225, and supplies the calculated luma intra prediction mode to the intra prediction unit 206 through the switch 212. The luma intra prediction mode calculating unit 224 is a coding information calculating unit that corresponds to the syntax element calculating unit 122 relating to the luma intra prediction mode disposed on the coding side and performs calculation in accordance with the same semantics rule. As the syntax elements relating to the luma intra prediction mode, there are a syntax element prev_intra_luma_pred_flag[x0][y0] that is a flag representing whether or not a prediction can be made based on the luma intra prediction mode of a neighboring block, a syntax element mpm_idx[x0][y0] that is an index indicating a prediction block of a prediction source, and a syntax element rem_intra_luma_pred_mode[x0][y0] that represents the luma intra prediction mode in units of prediction blocks. In the calculation of the luma intra prediction mode, the correlation with the luma intra prediction mode of a neighboring block stored in the coding information storing memory 210 is used. In a case where the prediction can be made based on the luma intra prediction mode of the neighboring block, the syntax element prev_intra_luma_pred_flag[x0][y0], which is a flag representing the use of the value, is "1" (true), and the luma intra prediction mode of the neighboring prediction block that is directed based on the syntax element mpm_idx[x0][y0] that is an index indicating the prediction block of a prediction source is set as the luma intra prediction mode of the prediction mode. On the other hand, in a case where the syntax element prev_intra_luma_pred_flag[x0][y0] is "0" (false), the luma intra prediction mode is not predicted based on the neighboring prediction block, but the luma intra prediction mode is calculated based on the value of the syntax element rem_intra_luma_pred_mode[x0][y0] that represents the decoded luma intra prediction mode.

The number of luma intra prediction modes of the prediction block within the coding block differs in accordance with the partition mode. Thus, in a case where the partition mode is the 2N.times.2N partition, the values of the luma intra prediction mode of one set of prediction blocks are calculated for each coding block. On the other hand, in a case where the partition mode is the N.times.N partition, the values of the luma intra prediction modes of four sets of prediction blocks are calculated for each coding block.

The chroma intra prediction mode calculating unit 225, in a case where the prediction mode PredMode of the coding block, which is calculated by the coding information calculating unit 223 in units of coding blocks, is the intra prediction MODE_INTRA, calculates the value of the chroma intra prediction mode based on the supplied value of the syntax element intra_chroma_pred_mode[x0][y0] relating to the chroma intra prediction mode of the prediction block of chroma signals and the value of the luma intra prediction mode that is supplied from the luma intra prediction mode calculating unit and supplies the calculated value of the chroma intra prediction mode to the intra prediction unit 206 through the switch 212. The chroma intra prediction mode calculating unit 225 is a coding information calculating unit that corresponds to the syntax element calculating unit 123 relating to the chroma intra prediction mode disposed on the coding side and performs calculation in accordance with the same semantics rule. In the calculation of the value of the chroma intra prediction mode, the correlation with the luma intra prediction mode of the prediction block of luma signals that is located at the same position as the position of the prediction block of chroma signals is used. Thus, in a case where it is determined that a chroma intra prediction mode can be predicted based on the luma intra prediction mode of the prediction block of luma signals that is located at the same position as the position of the prediction block of chroma signals on the coding side, the value of the chroma intra prediction mode is predicted based on the value of the luma intra prediction mode. On the other hand, in a case where it is determined that an independent value is preferably set to the chroma intra prediction mode rather than making a prediction based on the luma intra prediction mode, a structure is used in which any one of "0" (vertical direction), "1" (horizontal direction), "2" (average value), and "3" (inclination of 45 degrees), which are representative intra prediction modes, is set to the chroma intra prediction mode. As a result, the code amount is reduced.

FIG. 14 is a conversion table used for calculating the value of the chroma intra prediction mode based on the value of the syntax element intra_chroma_pred_mode[x0][y0] and the value of the luma intra prediction mode of the prediction block located at the same position as the position of the prediction block of chroma signals. By using this conversion table, the value of the chroma intra prediction mode is calculated. In addition, as the luma intra prediction mode, a luma intra prediction mode calculated based on the value of the syntax element relating to the luma intra prediction mode that has been previously decoded in the decoding sequence is referred to. By performing coding and decoding in the coding sequence or the decoding sequence illustrated in FIGS. 17A to 17C, the luma intra prediction mode to be referred to can be easily specified. As presented in the description of the coding side, in a case where the value of the syntax element intra_chroma_pred_mode[x0][y0] is "0", the value of the chroma intra prediction mode is predicted in accordance with the chroma format based on the value of the luma intra prediction mode of the prediction block located at the same position as the position of the prediction block of chroma signals. In a case where the chroma format is 4:2:0 or 4:4:4, and the value of the syntax element intra_chroma_pred_mode[x0][y0] is "0", the value of the luma intra prediction mode of the prediction block located at the same position as the position of the prediction block of chroma signals is directly set as the value of the chroma intra prediction mode. In a case where the chroma format is 4:2:2 and the value of the syntax element intra_chroma_pred_mode[x0][y0] is "0", based on the conversion table illustrated in FIG. 15, the value of the chroma intra prediction mode is calculated based on the value of the luma intra prediction mode of the prediction block located at the same position as the position of the prediction block of chroma signals. FIG. 15 is a conversion table used for calculating the value of the chroma intra prediction mode based on the value of the luma intra prediction mode of the prediction block located at the same position as the position of the prediction block of chroma signals in a case where the chroma format is 4:2:2 that is defined in this example.

In a case where the prediction mode PredMode of the coding block is the inter prediction MODE_INTER, the inter prediction information calculating unit 226 calculates the inter prediction information based on the value of the syntax element relating to the inter prediction information in units of prediction blocks and supplies the calculated value of the inter prediction information to the inter prediction unit 207 through the switch 212. The inter prediction information calculating unit 226 is a coding information calculating unit that corresponds to the syntax element calculating unit 124 relating to the inter prediction information disposed on the coding side and performs calculation in accordance with the same semantics rule. In the calculated inter prediction information in units of prediction blocks, information such as the inter prediction mode (the L0 prediction, the L1 prediction, or both predictions), an index used for specifying a plurality of reference pictures, and a motion vector is included.

Next, the syntax rule used in this example will be described with focusing on points relating to the intra prediction mode that is a feature of the embodiment. FIG. 18 is an example of a syntax rule for coding and decoding coding information in units of coding blocks that is used by the entropy coding unit 126 disposed on the coding side and the entropy decoding unit 222 disposed on the decoding side. FIG. 19 is an example of a syntax rule used for coding and decoding coding information of a prediction unit that is used by the entropy coding unit 126 disposed on the coding side and the entropy decoding unit 222 disposed on the decoding side.

x0 and y0 illustrated in FIG. 18 are coordinates that represent the position of the coding block. FIG. 18 illustrates entropy coding or entropy decoding of coding information of one set of prediction units that is performed in accordance with a syntax rule represented in FIG. 19 in a case where the partition mode (PartMode) is 2N.times.2N partition (PART_2N.times.2N) in units of coding blocks. In addition, entropy coding or entropy decoding of coding information of four sets of prediction units is illustrated which is performed in accordance with the syntax rule illustrated in FIG. 19 in a case where the partition mode (PartMode) is N.times.N partition (PART_N.times.N).

FIG. 19 illustrates the syntax rule used for coding information of a prediction unit. x0 and y0 illustrated in FIG. 19 are coordinates that represent the positions of a prediction unit of a luma signal and a prediction block. FIG. 19 illustrates the process of the entropy coding or entropy decoding of the syntax element relating to the luma intra prediction mode in units of one set of prediction blocks, which is performed in units of prediction blocks in a case where the prediction mode PredMode is the intra prediction (MODE_INTRA). In a case where the prediction mode (PredMode) is the intra prediction MODE_INTRA, entropy coding or entropy decoding of the syntax element prev_intra_luma_pred_flag[x0][y0] is performed. On the other hand, in a case where the syntax element prev_intra_luma_pred_flag[x0][y0] is "1" (true), entropy coding or entropy decoding of the syntax element mpm_idx[x0][y0] is performed. In a case where the syntax element prev_intra_luma_pred_flag[x0][y0] is "0" (false), entropy coding or entropy decoding of the syntax element rem_intra_luma_pred_mode[x0][y0] is performed.

In addition, entropy coding or entropy decoding of a syntax element intra_chroma_pred_mode[x0][y0] relating to a chroma intra prediction mode that is performed in accordance with a chroma format and a partition index PartIdx is illustrated. The chroma format ChromaArrayType is a variable that represents the chroma format, "0" represents monochrome (basically, although a mode in which luma signals and chroma signals are independently coded at 4:4:4 is included, such a case is regarded as the monochrome in this example), "1" represents 4:2:0, "2" represents 4:2:2, and "3" represents 4:4:4.

In a case where anyone of a condition where the chroma format is 4:2:0, 4:2:2, or 4:4:4 (ChromaArrayType is not "0") and the partition index PartIdx is "0", a condition where the chroma format is 4:2:2 (ChromaArrayType is "2") and the partition index PartIdx is "2", and a condition where the chroma format is 4:4:4 (ChromaArrayType is "3") is satisfied, entropy coding or entropy decoding of a syntax element intra_chroma_pred_mode[x0][y0] relating to the chroma intra prediction mode performed in units of prediction blocks is illustrated. In other words, in a case where the chroma format is 4:2:0, only in a case where the partition index PartIdx is "0", entropy coding or entropy decoding of a syntax element relating to the chroma intra prediction mode having "0" as the partition index PartIdx is performed right after the syntax element relating to the luma intra prediction mode. In addition, in a case where the chroma format is 4:2:2, only in a case where the partition index PartIdx is "0" or "2", right after the syntax element relating to the luma intra prediction mode, entropy coding or entropy decoding of a syntax element relating to the chroma intra prediction mode of the same partition index PartIdx is performed, and, in a case where the chroma format is "4:4:4", in a case where the partition index PartIdx is any one of 0, 1, 2, and 3, right after the syntax element relating to the luma intra prediction mode, entropy coding or entropy decoding of a syntax element relating to the chroma intra prediction mode of the same partition index PartIdx is illustrated. Furthermore, the case of 2N.times.2N partition (PART_2N.times.2N) corresponds to a case where the partition index PartIdx is "0", right after the syntax element relating to the luma intra prediction mode, entropy coding or entropy decoding of a syntax element relating to the chroma intra prediction mode having "0" as the partition index PartIdx is performed.

Figure 20:
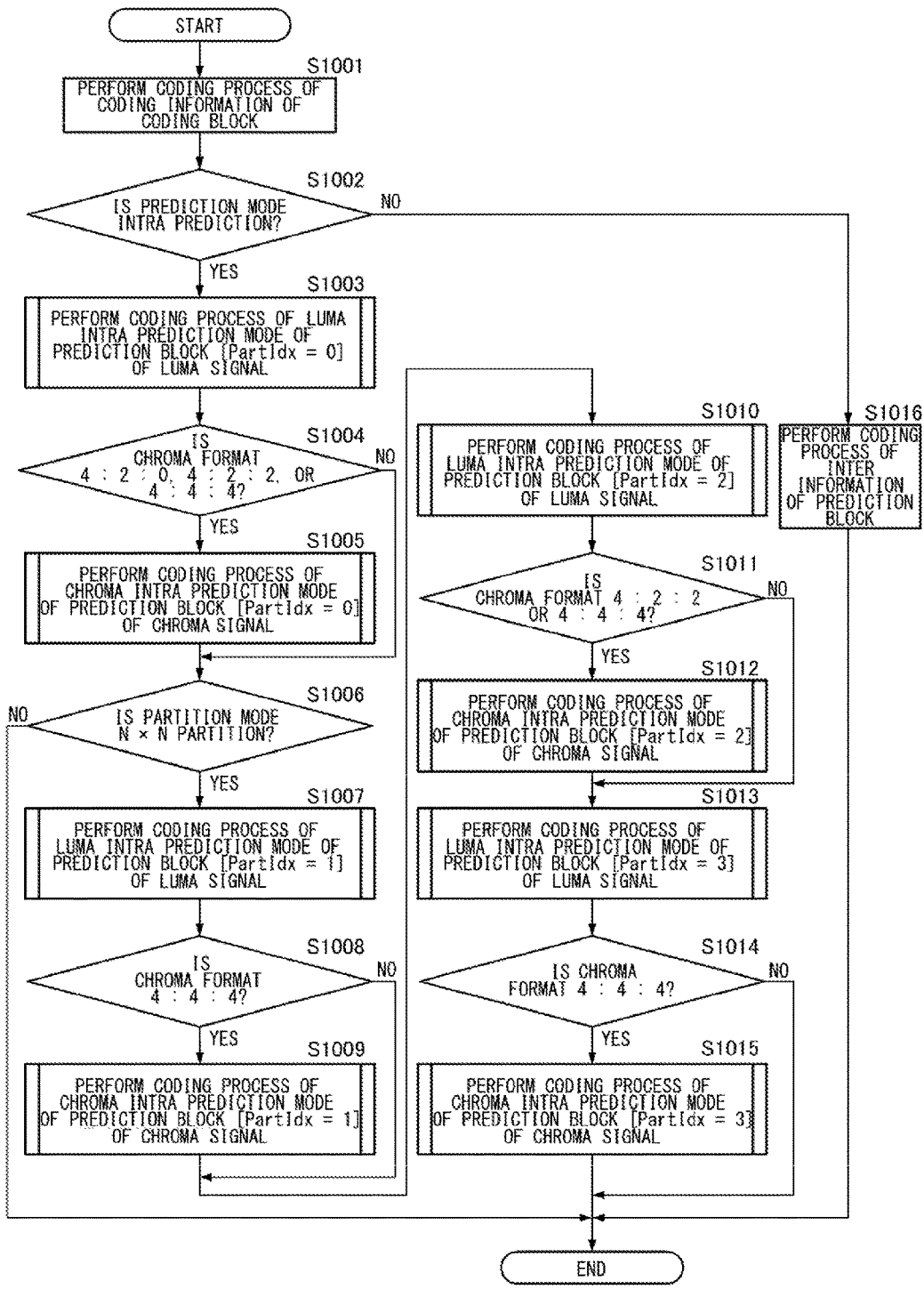
FIG. 20 is a flowchart that illustrates the processing sequence of a coding process in units of coding blocks and prediction blocks that is performed by the second bitstream constructing unit according to the embodiment.

Next, the processing sequence of the coding process of coding information in units of coding blocks and prediction blocks that is performed by the second bitstream constructing unit 113 illustrated in FIG. 1 will be described with focusing on points relating to the intra prediction mode that is a feature of the embodiment. FIG. 20 is a flowchart that illustrates the processing sequence of the coding process in units of coding blocks and prediction blocks that is performed by the second bitstream constructing unit 113 illustrated in FIG. 1.

First, on the coding side, the value of the syntax element relating to coding information including the prediction mode of the coding block, the partition mode, and the like is calculated by the syntax element calculating unit 121 relating to the coding information in units of coding blocks, and entropy coding of the calculated value of the syntax element is performed by the entropy coding unit 126 in step S1001. Subsequently, in a case where the prediction mode PredMode of the coding block is not the intra prediction MODE_INTRA (No in step S1002), the process proceeds to step S1017, the value of the syntax element relating to inter information is calculated for each prediction block in accordance with the partition mode by the syntax element calculating unit 124 relating to the inter prediction information, entropy coding of the calculated value of the syntax element is performed by the entropy coding unit 126 in step S1017, and this coding process ends. In a case where the prediction mode PredMode of the coding block is the intra prediction MODE_INTRA (Yes in step S1002), the process proceeds to a coding process of the intra prediction mode of step S1003 and subsequent steps.

Subsequently, in a case where the prediction mode of the coding block is the intra prediction, a coding process of the luma intra prediction mode of the prediction block, of which the partition index PartIdx is "0", of luma signals is performed by the syntax element calculating unit 122 relating to the luma intra prediction mode and the entropy coding unit 126 in step S1003.

Figure 21:
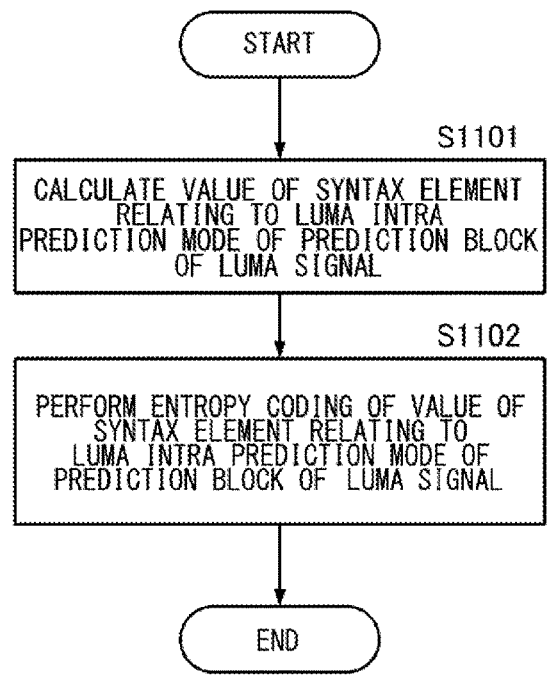
FIG. 21 is a flowchart that illustrates the sequence of a common coding process that is used in steps S1003, S1007, S1010, and S1013, which are illustrated in FIG. 20, according to the embodiment.

Here, the sequence of the coding process of the luma intra prediction mode of the prediction block of luma signals, which is performed by the syntax element calculating unit 122 relating to the luma intra prediction mode and the entropy coding unit 126, will be described by referring to a flowchart illustrated in FIG. 21. FIG. 21 is a flowchart that illustrates the sequence of the coding process of the luma intra prediction mode of the prediction block of luma signals, which is performed by the syntax element calculating unit 122 relating to the luma intra prediction mode and the entropy coding unit 126. First, the value of each syntax element relating to the luma intra prediction mode of the prediction block of luma signals is calculated by the syntax element calculating unit 122 relating to the luma intra prediction mode in step S1101. At this time, the value of the luma intra prediction mode is compared with the luma intra prediction mode of a neighboring block. In a case where a prediction block having the same value is present, the value of the syntax element prev_intra_luma_pred_flag[x0][y0] is set to "1" (true), and a value used for specifying a reference destination is set to the syntax element mpm_idx [x0][y0] that is an index indicating the prediction block of a prediction source. On the other hand, in a case where there is no prediction block having the same value, the value of the syntax element prev_intra_luma_pred_flag[x0][y0] is set to "0" (false), and a value used for specifying the luma intra prediction mode is set to the syntax element rem_intra_luma_pred_mode[x0][y0] that represents the luma intra prediction mode. Subsequently, entropy coding of the value of each syntax element relating to the luma intra prediction mode of the prediction block of luma signals is performed by the entropy coding unit 126 in step S1102, and this coding process ends. The sequence of the coding process illustrated in FIG. 21 is the sequence of a common coding process that is used not only in step S1003 illustrated in FIG. 20 but also in steps S1007, S1010, and S1013.

Again, referring back to FIG. 20, subsequently, in a case where the chroma format is 4:2:0, 4:2:2, or 4:4:4 (Yes in step S1004), a coding process of the chroma intra prediction mode of a prediction block of which the partition index PartIdx of the chroma signal is "0" is performed by the syntax element calculating unit 123 relating to the chroma intra prediction mode and the entropy coding unit 126 in step S1005. On the other hand, in a case where the chroma format is not any one of 4:2:0, 4:2:2, and 4:4:4, in other words, in a case where the chroma format is monochrome (No in step S1004), since there is no prediction block of a chroma signal, step S1005 is skipped, and the process proceeds to the next step S1006.

Figure 22:
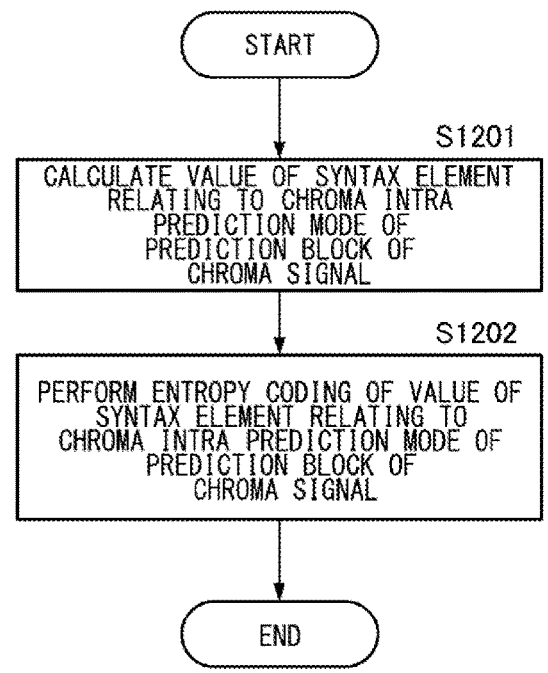
FIG. 22 is a flowchart that illustrates the sequence of a common coding process that is used in steps S1005, S1009, S1012, and S1015, which are illustrated in FIG. 20, according to the embodiment.

Here, the sequence of the coding process of the chroma intra prediction mode of a prediction block of a chroma signal that is performed by the syntax element calculating unit 123 relating to the chroma intra prediction mode and the entropy coding unit 126 will be described with reference to a flowchart represented in FIG. 22. FIG. 22 is a flowchart that represents the sequence of a coding process of a chroma intra prediction mode of a prediction block of a chroma signal that is performed by the syntax element calculating unit 123 relating to the chroma intra prediction mode and the entropy coding unit 126. First, the value of each syntax element relating to the chroma intra prediction mode of a prediction block of a chroma signal is calculated by the syntax element calculating unit 123 relating to the chroma intra prediction mode in step S1201. At this time, the value of the syntax element intra_chroma_pred_mode[x0][y0] relating to the chroma intra prediction mode is calculated by using the conversion table illustrated in FIG. 16 based on the value of the chroma intra prediction mode and the value of a luma intra prediction mode of a prediction block that is located at the same position as the position of the prediction block of the chroma signal. Subsequently, entropy coding of the value of each syntax element relating to the chroma intra prediction mode of the prediction block of the chroma signal is performed by the entropy coding unit 126 in step S1202, and the coding process ends. Here, the sequence of the coding process illustrated in FIG. 22 is the sequence of a coding process that is commonly used also in steps S1009, S1012, and S1015 in addition to step S1005 illustrated in FIG. 20.

Again, referring back to FIG. 20, subsequently, in a case where the partition mode of the coding block is not the N.times.N partition, in other words, in a case where the partition mode is 2N.times.2N (No in step S1006), there is only a prediction block having "0" as the partition index PartIdx, and there is no intra prediction mode to be further coded. Accordingly, this coding process ends.

On the other hand, in a case where the partition mode of the coding block is the N.times.N partition (Yes in step S1006), the process proceeds to the coding process of an intra prediction mode of a prediction block of which the partition index PartIdx is more than "0". First, a coding process of the luma intra prediction mode of a prediction block of which the partition index PartIdx of the luma signal is "1" is performed in accordance with the sequence of the coding process illustrated in FIG. 21 in step S1007. Subsequently, in a case where the chroma format is 4:4:4 (Yes in step S1008), a coding process of the chroma intra prediction mode of a prediction block of which the partition index PartIdx of the chroma signal is "1" is performed in accordance with the sequence of the coding process illustrated in FIG. 22 in step S1009. On the other hand, in a case where the chroma format is not 4:4:4, in other words, in a case where the chroma format is 4:2:0, 4:2:2, or monochrome (No in step S1008), since there is no prediction block of which the partition index PartIdx of the chroma signal is "1", step S1009 is skipped, and the process proceeds to the next step S1010.

Subsequently, a coding process of the luma intra prediction mode of a prediction block of which the partition index PartIdx of the luma signal is "2" is performed in accordance with the sequence of the coding process illustrated in FIG. 21 in step S1010. Subsequently, in a case where the chroma format is 4:2:2 or 4:4:4 (Yes in step S1011), a coding process of the chroma intra prediction mode of a prediction block of which the partition index PartIdx of the chroma signal is "2" is performed in accordance with the sequence of the coding process illustrated in FIG. 22 in step S1012. On the other hand, in a case where the chroma format is neither 4:2:2 nor 4:4:4, in other words, in a case where the chroma format is 4:2:0 or monochrome (No in step S1011), since there is no prediction block of which the partition index PartIdx of the chroma signal is "2", step S1012 is skipped, and the process proceeds to the next step S1013.

Subsequently, a coding process of the luma intra prediction mode of a prediction block of which the partition index PartIdx of the luma signal is "3" is performed in accordance with the sequence of the coding process illustrated in FIG. 21 in step S1013. Subsequently, in a case where the chroma format is 4:4:4 (Yes in step S1014), a coding process of the chroma intra prediction mode of a prediction block of which the partition index PartIdx of the chroma signal is "3" is performed in accordance with the sequence of the coding process illustrated in FIG. 22 in step S1015. On the other hand, in a case where the chroma format is other than 4:4:4, in other words, in a case where the chroma format is 4:2:0, 4:2:2, or monochrome (No in step S1014), since there is no prediction block of which the partition index PartIdx of the chroma signal is "3", step S1015 is skipped, and the coding process ends.

According to this coding process, in accordance with the sequence illustrated in FIGS. 17A to 17C, the luma intra prediction mode and the chroma intra prediction mode belonging to a same prediction unit are consecutively coded, and, when the chroma intra prediction mode is calculated on the decoding side, the calculation process is performed by referring to the luma intra prediction mode that has been previously decoded and calculated. Accordingly, by referring to the luma intra prediction mode, the decoding process of the chroma intra prediction mode can be performed at optimal timing while the coding efficiency of the chroma intra prediction mode is increased.

Figure 23:
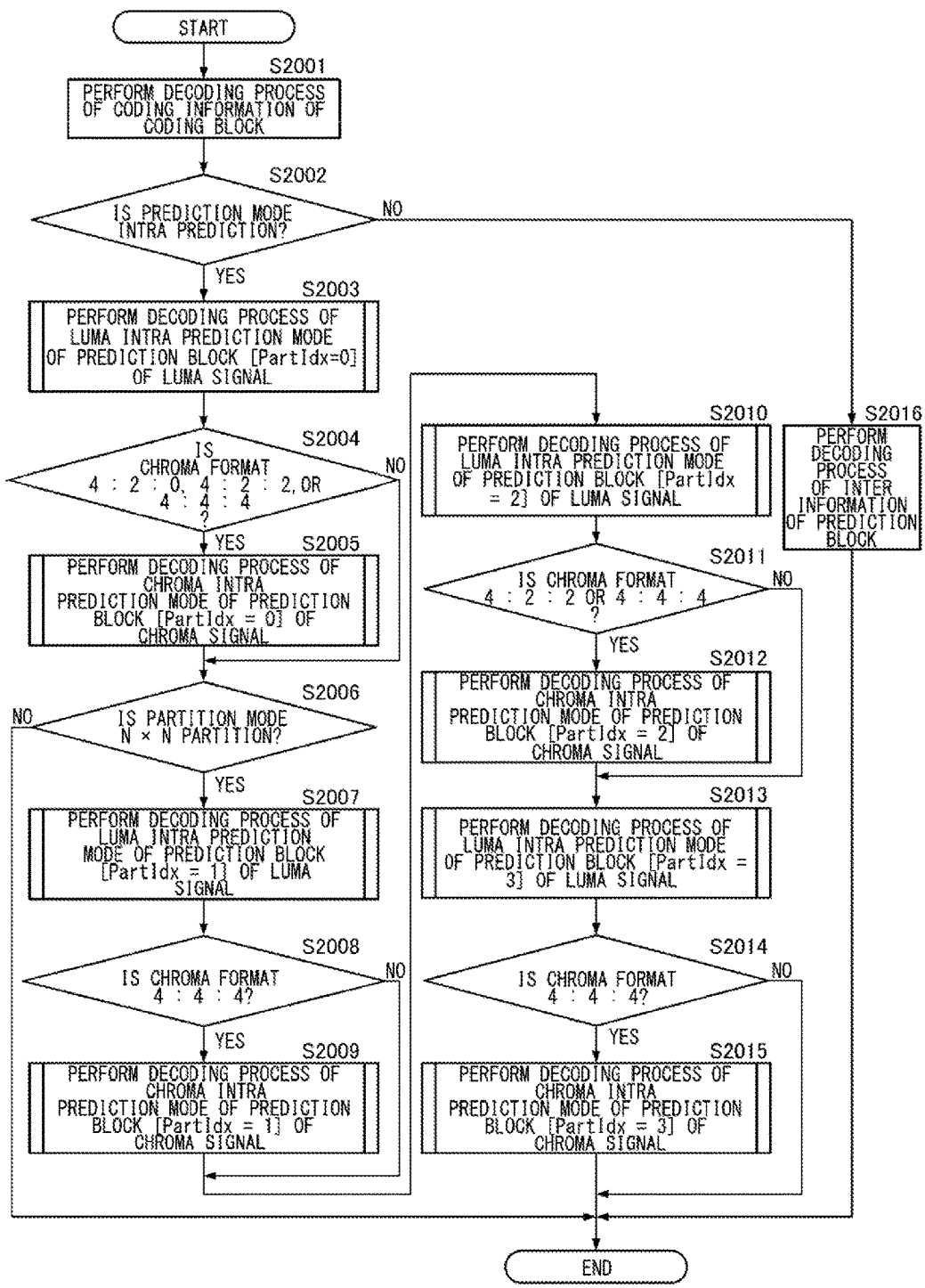
FIG. 23 is a flowchart that illustrates the processing sequence of a decoding process in units of coding blocks and prediction blocks that is performed by the second bitstream decoding unit according to the embodiment.

Next, the processing sequence of the decoding process of coding information in units of coding blocks and prediction blocks that is performed by the second bitstream decoding unit 203 illustrated in FIG. 2 will be described with focusing on points relating to the intra prediction mode that is a feature of the embodiment. FIG. 23 is a flowchart that illustrates the processing sequence of the decoding process in units of coding blocks and prediction blocks that is performed by the second bitstream decoding unit 203 illustrated in FIG. 2.

First, on the decoding side, the value of the syntax element relating to coding information including the prediction mode of the coding block, the partition mode, and the like is derived by performing entropy decoding the bitstream using the entropy decoding unit 222 in step S2001, and the value of the coding information including the prediction mode of the coding block, the partition mode, and the like is calculated based on the value of each syntax element decoded by the coding information calculating unit 223 in units of coding blocks. Subsequently, in a case where the prediction mode PredMode of the coding block is not the intra prediction MODE_INTRA (No in step S2002), the process proceeds to step S2016, the value of the syntax element relating to inter information is acquired for each prediction block in accordance with the partition mode by performing entropy decoding using the entropy decoding unit 222, the value of the inter information is calculated for each prediction block in accordance with the partition mode by the inter prediction information calculating unit 226 in step S2016, and this decoding process ends. In a case where the prediction mode PredMode of the coding block is the intra prediction MODE_INTRA (Yes in step S2002), the process proceeds to a decoding process of the intra prediction mode of step S2003 and subsequent steps.

Subsequently, in a case where the prediction mode of the coding block is the intra prediction, a decoding process of the luma intra prediction mode of the prediction block, of which the partition index PartIdx of is "0", of luma signals is performed by the entropy decoding unit 222 and the luma intra prediction mode calculating unit 224 in step S2003.

Figure 24:
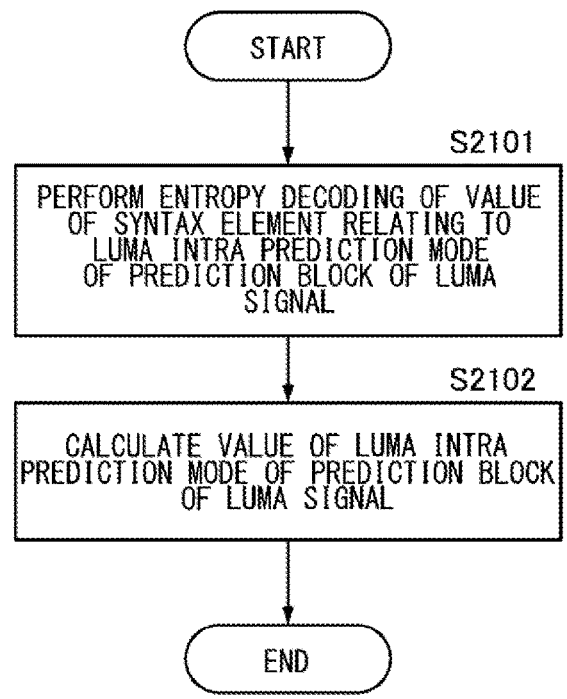
FIG. 24 is a flowchart that illustrates the sequence of a common decoding process that is used in steps S2003, S2007, S2010, and S2013, which are illustrated in FIG. 23, according to the embodiment.

Here, the sequence of the decoding process of the luma intra prediction mode of the prediction block of luma signals, which is performed by the entropy decoding unit 222 and the luma intra prediction mode calculating unit 224, will be described by referring to a flowchart illustrated in FIG. 24. FIG. 24 is a flowchart that illustrates the sequence of the decoding process of the luma intra prediction mode of the prediction block of luma signals, which is performed by the entropy decoding unit 222 and the luma intra prediction mode calculating unit 224. First, entropy decoding of the bitstream is performed by the entropy decoding unit 222, whereby the value of each syntax element relating to the luma intra prediction mode of the prediction block of luma signals is derived in step S2101. Subsequently, the value of the luma intra prediction mode of the prediction block of luma signals is calculated based on the value of each decoded syntax element decoded in step S2101 by the luma intra prediction mode calculating unit 224 of the luma intra prediction mode in step S2102. At this time, in a case where the value of the syntax element prev_intra_luma_pred_flag [x0][y0] is "1" (true), the luma intra prediction mode of the neighboring prediction block indicated by the syntax element mpm_idx[x0][y0] that is an index indicating the prediction block of a prediction source is set as the luma intra prediction mode of the prediction mode. On the other hand, in a case where the value of the syntax element prev_intra_luma_pred_flag[x0][y0] is "0" (false), the luma intra prediction mode is calculated based on the value of the syntax element rem_intra_luma_pred_mode[x0][y0] that represents the luma intra prediction mode, and this decoding process ends. The sequence of the decoding process illustrated in FIG. 24 is the sequence of a common decoding process that is used not only in step S2003 illustrated in FIG. 23 but also in steps S2007, S2010, and S2013.

Again, referring back to FIG. 23, subsequently, in a case where the chroma format is 4:2:0, 4:2:2, or 4:4:4 (Yes in step S2004), the decoding process of the chroma intra prediction mode of the prediction block, of which the partition index PartIdx is "0", of chroma signals is performed by the entropy decoding unit 222 and the chroma intra prediction mode calculating unit 225 in step S2005. In addition, in a case where the chroma format is not any one of 4:2:0, 4:2:2, and 4:4:4, in other words, in a case where the chroma format is monochrome (No in step S2004), since there is no prediction block of a chroma signal, step S2005 is skipped, and the process proceeds to the next step S2006.

Figure 25:
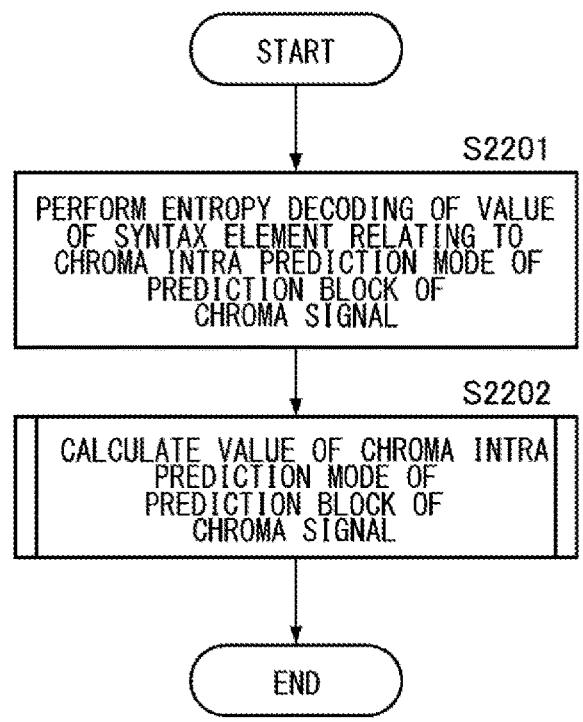
FIG. 25 is a flowchart that illustrates the sequence of a common decoding process that is used in steps S2005, S2009, S2012, and S2015, which are illustrated in FIG. 23, according to the embodiment.
Figure 26:
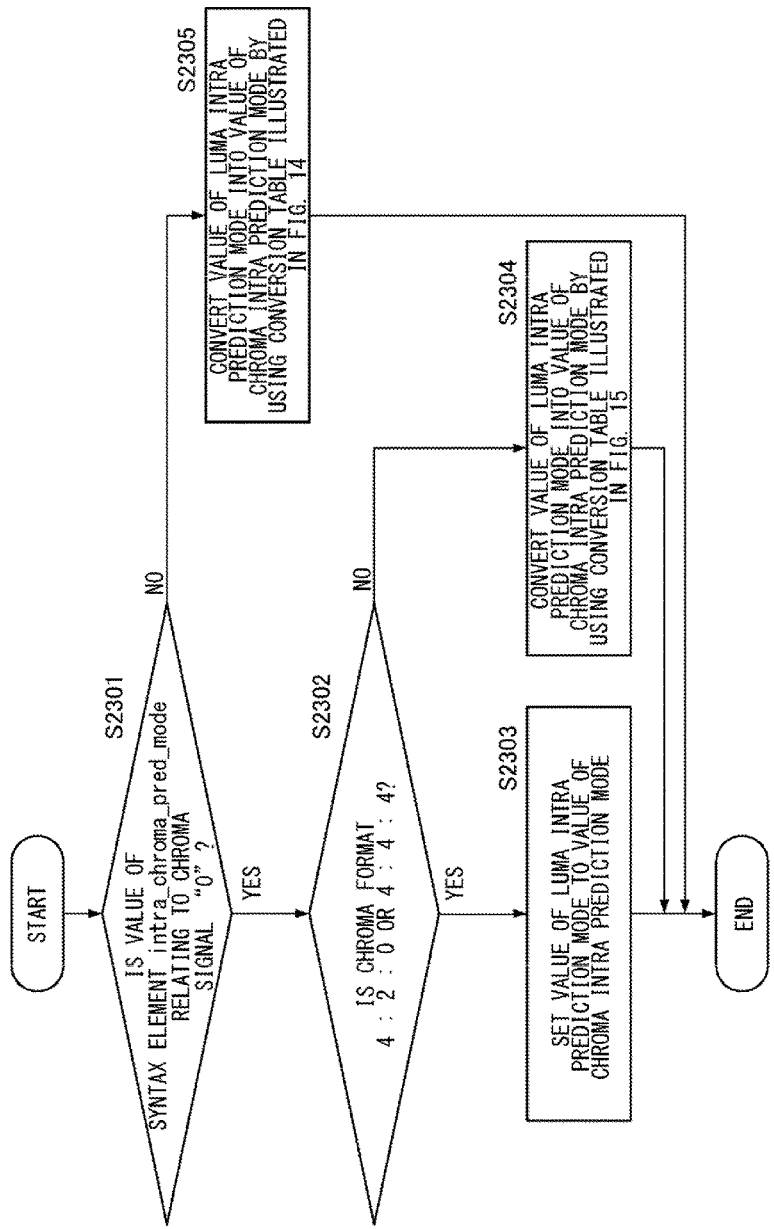
FIG. 26 is a flowchart that illustrates the sequence of the process of calculating the value of a chroma intra prediction mode used in step S2202, which is illustrated in FIG. 25, according to the embodiment.

Here, the sequence of the decoding process of the chroma intra prediction mode of the prediction block of chroma signals that is performed by the entropy decoding unit 222 and the chroma intra prediction mode calculating unit 225 will be described by referring to a flowchart illustrated in FIG. 25. FIG. 25 is a flowchart that illustrates the sequence of the decoding process of the chroma intra prediction mode of the prediction block of chroma signals, which is performed by the entropy decoding unit 222 and the chroma intra prediction mode calculating unit 225. First, the value of the syntax element intra_chroma_pred_mode[x0][y0] relating to the chroma intra prediction mode of the prediction block of chroma signals is calculated by performing entropy decoding the bitstream using the entropy decoding unit 222 in step S2201. Subsequently, the value of the chroma intra prediction mode of the prediction block of chroma signals is calculated by the chroma intra prediction mode calculating unit 225 in step S2202. Here, the sequence of the process of calculating the chroma intra prediction mode of the prediction block of chroma signals that is performed by the chroma intra prediction mode calculating unit 225 will be described by referring to a flowchart illustrated in FIG. 26. FIG. 26 is a flowchart that illustrates the sequence of the process of calculating the chroma intra prediction mode that is performed in step S2202 illustrated in FIG. 25. First, it is determined whether or not the value of the syntax element intra_chroma_pred_mode[x0][y0] relating to the chroma intra prediction mode of the prediction block of chroma signals is "0" in step S2301. In a case where the value of the syntax element is "0" (Yes in step S2301), the process proceeds to step S2302. In a case where the chroma format is 4:2:0 or 4:4:4 (Yes in step S2302), the value of the luma intra prediction mode of the prediction block located at the same position as the position of the prediction block of chroma signals is directly set as the value of the chroma intra prediction mode in step S2303, and this calculation process ends. On the other hand, in a case where the chroma format is 4:2:0 or 4:4:4, in other words, in the case of 4:2:2 (No in step S2302), by using the conversion table illustrated in FIG. 15, the value of the chroma intra prediction mode is calculated based on the value of a luma intra prediction mode of a prediction block that is located at the same position as the position of the prediction block of the chroma signal (step S2304), and this calculation process ends. On the other hand, in a case where the value of the syntax element intra_chroma_pred_mode[x0][y0] is other than "0" (No in step S2301), by using the conversion table illustrated in FIG. 14, the value of the luma intra prediction mode is converted into the value of the chroma intra prediction mode in step S2305, and this calculation process ends. At this time, based on the value of the syntax element intra_chroma_pred_mode[x0][y0] relating to the chroma intra prediction mode decoded in step S2201 and the value of the luma intra prediction mode of a prediction block located at the same position as the position of the prediction block of the chroma signal, in other words, based on the value of the luma intra prediction mode calculated in the latest step, by using the conversion table illustrated in FIG. 14, the value of the syntax element is calculated, and this decoding process ends. The sequence of the decoding process illustrated in FIG. 25 is the sequence of a common decoding process that is used not only in step S2005 illustrated in FIG. 23 but also in steps S2009, S2012, and S2015.

Again, referring back to FIG. 23, subsequently, in a case where the partition mode of the coding block is not the N.times.N partition, in other words, in a case where the partition mode is 2N.times.2N (No in step S2006), since there is only a prediction block of which the partition index PartIdx is "0", and there is no intra prediction mode to be further decoded, this decoding process ends.

On the other hand, in a case where the partition mode of the coding block is the N.times.N partition (Yes in step S2006), the process proceeds to a decoding process of the intra prediction mode of a prediction block of which the partition index PartIdx is more than "0". First, in accordance with the sequence of the decoding process illustrated in FIG. 24, a decoding process of the luma intra prediction mode of a prediction block of which the partition index PartIdx of the luma signal is "1" is performed in step S2007. Subsequently, in a case where the chroma format is 4:4:4 (Yes in step S2008), in accordance with the processing sequence illustrated in FIG. 25, a decoding process of the chroma intra prediction mode of a prediction block of which the partition index PartIdx of the chroma signal is "1" is performed in step S2009. On the other hand, in a case where the chroma format is not 4:4:4, in other words, the chroma format is 4:2:0, 4:2:2, or monochrome (No in step S2008), since there is no prediction block of which the partition index PartIdx of the chroma signal is "1", step S2009 is skipped, and the process proceeds to the next step S2010.

Subsequently, in accordance with the processing sequence illustrated in FIG. 24, a decoding process of the luma intra prediction mode of a prediction block of which the partition index PartIdx of the luma signal is "2" is performed in step S2010. Subsequently, in a case where the chroma format is 4:2:2 or 4:4:4 (Yes in step S2011), in accordance with the processing sequence illustrated in FIG. 25, a decoding process of the chroma intra prediction mode of a prediction block of which the partition index PartIdx of the chroma signal is "2" is performed in step S2012. On the other hand, in a case where the chroma format is neither 4:2:2 nor 4:4:4, in other words, the chroma format is 4:2:0 or monochrome (No in step S2011), since there is no prediction block of which the partition index PartIdx of the chroma signal is "2", step S2012 is skipped, and the process proceeds to the next step S2013.

Subsequently, in accordance with the processing sequence illustrated in FIG. 24, a decoding process of the luma intra prediction mode of a prediction block of which the partition index PartIdx of the luma signal is "3" is performed in step S2013. Subsequently, in a case where the chroma format is 4:4:4 (Yes in step S2014), in accordance with the processing sequence illustrated in FIG. 25, a decoding process of the chroma intra prediction mode of a prediction block of which the partition index PartIdx of the chroma signal is "3" is performed in step S2015. On the other hand, in a case where the chroma format is other than 4:4:4, in other words, the chroma format is 4:2:0, 4:2:2, or monochrome (No in step S2014), since there is no prediction block of which the partition index PartIdx of the chroma signal is "3", step S2015 is skipped, and this decoding process ends.

According to this decoding process, in accordance with the sequence illustrated in FIGS. 17A to 17C, the luma intra prediction mode and the chroma intra prediction mode belonging to a same prediction unit are consecutively decoded, and, when the chroma intra prediction mode is calculated, the calculation process is performed by referring to the luma intra prediction mode that has been previously decoded and calculated. Accordingly, by referring to the luma intra prediction mode, the decoding process of the chroma intra prediction mode can be performed at optimal timing while the coding efficiency of the chroma intra prediction mode is increased.

A bitstream of a moving picture output by the moving picture coding device according to the embodiment described above has a specific data format such that the bitstream can be decoded in accordance with the coding method used in the embodiment, and the moving picture decoding device corresponding to the moving picture coding device can decode the bitstream having this specific data format.

In a case where a wired or wireless network is used so as to allow the bitstream to be transmitted and received between the moving picture coding device and the moving picture decoding device, the bitstream may be converted to a data format that is appropriate to the transmitting form of the transmitting path and be transmitted. In such a case, a moving picture transmitting device that converts the bitstream output by the moving picture coding device into coding data of a data format that is appropriate to the transmitting form of the transmitting path and transmits the coding data to the network and a moving picture receiving device that receives the coding data from the network, restores a bitstream from the coding data, and supplies the restored bitstream to the moving picture decoding device are disposed.

The moving picture transmitting device includes: a memory that buffers a bitstream output by the moving picture coding device; a packet processing unit that packetizes the bitstream; and a transmitting unit that transmits the packetized coding data through a network. The moving picture receiving device includes: a receiving unit that receives packetized coding data through a network; a memory that buffers the received coding data; and a packet processing unit that constructs a bitstream by performing a packet process of the coding data and supplies the bitstream to the moving picture decoding device.

The above-described processes relating to coding and decoding may be realized not only as transmitting/storage/receiving devices using hardware but also by firmware stored in a read only memory (ROM), a flash memory, or the like or software for a computer or the like. The firmware program and the software program may be provided with being recorded in a computer-readable recording medium, be provided from a server through a wired or wireless network, or be provided as data broadcasting of a terrestrial or satellite digital broadcasts.

As above, the embodiment of the present invention has been described. However, the embodiment is merely an example, and it should be understood by those skilled in the art that various changes and modifications may be made in each constituent element and the combination of the processes, and such changes and modifications belong to the scope of the present invention.

[Item 1]

A picture coding device that performs intra prediction coding of a picture signal including a luma signal and a chroma signal in units of blocks and codes information relating to an intra prediction mode, the picture coding device including an intra prediction unit that, when an intra prediction of the picture signal is made in units of coding blocks, in a case where a chroma format is 4:2:2, in a mode for setting a chroma intra prediction mode in accordance with a luma intra prediction mode, sets a chroma intra prediction mode based on the luma intra prediction mode and the chroma format and makes an intra prediction of the chroma signal.

[Item 2]

The picture coding device described in Item 1, wherein, in a case where the chroma format is 4:2:2, in the mode for setting the chroma intra prediction mode in accordance with the luma intra prediction mode, the intra prediction unit sets the chroma intra prediction mode having a prediction direction acquired by converting a prediction direction of the luma intra prediction mode into a direction according to the chroma format and makes the intra prediction of the chroma signal.

[Item 3]

A picture coding device that performs intra prediction coding of a picture signal including a luma signal and a chroma signal in units of blocks and codes information relating to an intra prediction mode, the picture coding device including:

an intra prediction unit that, when an intra prediction of the picture signal is made in units of minimal coding blocks set in advance, in a case where a partition mode in which the luma signal is partitioned horizontally and vertically is set, makes an intra prediction of the chroma signal in units of prediction blocks of the intra prediction of the chroma signal within the minimal coding block set in accordance with a chroma format; and a bitstream constructing unit that constructs a bitstream in which information relating to a luma intra prediction mode of the prediction block of the luma signal and information relating to a chroma intra prediction mode of the prediction block of the chroma signal located at a reference position that is the same as the position of the prediction block of the luma signal are continuous.

[Item 4]

A picture coding device that performs intra prediction coding of a picture signal including a luma signal and a chroma signal in units of blocks and codes information relating to an intra prediction mode, the picture coding device including:

a luma signal intra prediction unit that, when an intra prediction of the picture signal is made in units of minimal coding blocks set in advance, in a case where a partition mode in which the luma signal is partitioned horizontally and vertically is set, sets prediction blocks of first to fourth luma signals acquired by partitioning the luma signal of the minimal coding block horizontally and vertically and predicts a luma signal based on neighboring blocks of coded luma signals in accordance with a luma intra prediction mode for each prediction block of the luma signal;

a chroma signal intra prediction unit that, in a case where the partition mode is set, and a chroma format is 4:4:4, sets prediction blocks of first to fourth chroma signals acquired by partitioning the chroma signal of the minimal coding block horizontally and vertically and predicts the chroma signal based on neighboring blocks of coded chroma signals in accordance with a chroma intra prediction mode for each prediction block of the chroma signal; and a bitstream constructing unit that constructs a bitstream by coding information relating to the prediction mode of the minimal coding block, wherein the chroma signal intra prediction unit, in a case where the chroma format is 4:4:4, in a mode for setting the chroma intra prediction mode in accordance with the luma intra prediction mode, sets chroma intra prediction modes of the prediction blocks of first, second, third, and fourth chroma signals by using values representing the luma intra prediction modes of the prediction blocks of the first, second, third, and fourth luma signals within the minimal coding block as values representing the chroma intra prediction modes of the prediction blocks of the first, second, third, and fourth chroma signals within the minimal coding block that are located at respective same reference positions.

[Item 5]

The picture coding device described in Item 4, wherein, in a case where the chroma format is 4:4:4, the bitstream constructing unit constructs a bitstream in which information relating to the prediction modes is arranged in an order of, within the minimal coding block, the luma intra prediction mode of the prediction block of the first luma signal, the chroma intra prediction mode of the prediction block of the first chroma signal located at a reference position that is the same as the position of the prediction block of the first luma signal, the luma intra prediction mode of the prediction block of the second luma signal, the chroma intra prediction mode of the prediction block of the second chroma signal located at a reference position that is the same as the position of the prediction block of the second luma signal, the luma intra prediction mode of the prediction block of the third luma signal, the chroma intra prediction mode of the prediction block of the third chroma signal located at a reference position that is the same as the position of the prediction block of the third luma signal, the luma intra prediction mode of the prediction block of the fourth luma signal, and the chroma intra prediction mode of the prediction block of the fourth chroma signal located at a reference position that is the same as the position of the prediction block of the fourth luma signal.

[Item 6]

There is provided a picture coding device that performs intra prediction coding of a picture signal including a luma signal and a chroma signal in units of blocks and codes information relating to an intra prediction mode, the picture coding device including:

a luma signal intra prediction unit that, when an intra prediction of the picture signal is made in units of minimal coding blocks set in advance, in a case where a partition mode in which the luma signal is partitioned horizontally and vertically is set, sets prediction blocks of first to fourth luma signals acquired by partitioning the luma signal of the minimal coding block horizontally and vertically and predicts a luma signal based on neighboring blocks of coded luma signals in accordance with a luma intra prediction mode for each prediction block of the luma signal;

a chroma signal intra prediction unit that, in a case where the partition mode is set, and a chroma format is 4:2:2, sets prediction blocks of first and second chroma signals acquired by horizontally partitioning the chroma signal of the minimal coding block and predicts the chroma signal based on neighboring blocks of coded chroma signals in accordance with a chroma intra prediction mode for each prediction block of the chroma signal; and a bitstream constructing unit that constructs a bitstream by coding information relating to the prediction mode of the minimal coding block, wherein the chroma signal intra prediction unit, in a case where the chroma format is 4:2:2, in a mode for setting the chroma intra prediction mode in accordance with the luma intra prediction mode, sets chroma intra prediction modes of the prediction blocks of the first and second chroma signals by converting values representing the luma intra prediction modes of the prediction blocks of the first and third luma signals within the minimal coding block into values representing the chroma intra prediction modes of the prediction blocks of the first and second chroma signals within the minimal coding block that are located at respective same reference positions in accordance with a conversion rule set in advance.

[Item 7]

The picture coding device described in Item 6, wherein, in a case where the chroma format is 4:2:2, the bitstream constructing unit constructs a bitstream in which information relating to the prediction modes is arranged in an order of, within the minimal coding block, the luma intra prediction mode of the prediction block of the first luma signal, the chroma intra prediction mode of the prediction block of the first chroma signal located at a reference position that is the same as the position of the prediction block of the first luma signal, the luma intra prediction mode of the prediction block of the second luma signal, the luma intra prediction mode of the prediction block of the third luma signal, the chroma intra prediction mode of the prediction block of the second chroma signal located at a reference position that is the same as the position of the prediction block of the third luma signal, and the luma intra prediction mode of the prediction block of the fourth luma signal.

[Item 8]

A picture coding method for performing intra prediction coding of a picture signal including a luma signal and a chroma signal in units of blocks and coding information relating to an intra prediction mode, the picture coding method including, when an intra prediction of the picture signal is made in units of coding blocks, in a case where a chroma format is 4:2:2, in a mode for setting a chroma intra prediction mode in accordance with a luma intra prediction mode, setting a chroma intra prediction mode based on the luma intra prediction mode and the chroma format and making an intra prediction of the chroma signal.

[Item 9]

A picture coding method for performing intra prediction coding of a picture signal including a luma signal and a chroma signal in units of blocks and coding information relating to an intra prediction mode, the picture coding method including:

when an intra prediction of the picture signal is made in units of minimal coding blocks set in advance, in a case where a partition mode in which the luma signal is partitioned horizontally and vertically is set, making an intra prediction of the chroma signal in units of prediction blocks of the intra prediction of the chroma signal within the minimal coding block set in accordance with a chroma format; and constructing a bitstream in which information relating to a luma intra prediction mode of the prediction block of the luma signal and information relating to a chroma intra prediction mode of the prediction block of the chroma signal located at a reference position that is the same as the position of the prediction block of the luma signal are continuous.

[Item 10]

A picture coding method for performing intra prediction coding of a picture signal including a luma signal and a chroma signal in units of blocks and coding information relating to an intra prediction mode, the picture coding method including:

when an intra prediction of the picture signal is made in units of minimal coding blocks set in advance, in a case where a partition mode in which the luma signal is partitioned horizontally and vertically is set, setting prediction blocks of first to fourth luma signals acquired by partitioning the luma signal of the minimal coding block horizontally and vertically and predicting a luma signal based on neighboring blocks of coded luma signals in accordance with a luma intra prediction mode for each prediction block of the luma signal;

in a case where the partition mode is set, and a chroma format is 4:4:4, setting prediction blocks of first to fourth chroma signals acquired by partitioning the chroma signal of the minimal coding block horizontally and vertically and predicting the chroma signal based on neighboring blocks of coded chroma signals in accordance with a chroma intra prediction mode for each prediction block of the chroma signal; and constructing a bitstream by coding information relating to the prediction mode of the minimal coding block, wherein, in the setting of prediction blocks and predicting of the chroma signal, in a case where the chroma format is 4:4:4, in a mode for setting the chroma intra prediction mode in accordance with the luma intra prediction mode, chroma intra prediction modes of the prediction blocks of first, second, third, and fourth chroma signals are set by using values representing the luma intra prediction modes of the prediction blocks of the first, second, third, and fourth luma signals within the minimal coding block as values representing the chroma intra prediction modes of the prediction blocks of the first, second, third, and fourth chroma signals within the minimal coding block that are located at respective same reference positions.

[Item 11]

A picture coding method for performing intra prediction coding of a picture signal including a luma signal and a chroma signal in units of blocks and coding information relating to an intra prediction mode, the picture coding method including:

when an intra prediction of the picture signal is made in units of minimal coding blocks set in advance, in a case where a partition mode in which the luma signal is partitioned horizontally and vertically is set, setting prediction blocks of first to fourth luma signals acquired by partitioning the luma signal of the minimal coding block horizontally and vertically and predicting a luma signal based on neighboring blocks of coded luma signals in accordance with a luma intra prediction mode for each prediction block of the luma signal;

in a case where the partition mode is set, and a chroma format is 4:2:2, setting prediction blocks of first and second chroma signals acquired by horizontally partitioning the chroma signal of the minimal coding block and predicting the chroma signal based on neighboring blocks of coded chroma signals in accordance with a chroma intra prediction mode for each prediction block of the chroma signal; and constructing a bitstream by coding information relating to the prediction mode of the minimal coding block, wherein, in the setting of prediction blocks and predicting of the chroma signal, in a case where the chroma format is 4:2:2, in a mode for setting the chroma intra prediction mode in accordance with the luma intra prediction mode, chroma intra prediction modes of the prediction blocks of the first and second chroma signals are set by converting values representing the luma intra prediction modes of the prediction blocks of the first and third luma signals within the minimal coding block into values representing the chroma intra prediction modes of the prediction blocks of the first and second chroma signals within the minimal coding block that are located at respective same reference positions in accordance with a conversion rule set in advance.

[Item 12]

A picture coding program for performing intra prediction coding of a picture signal including a luma signal and a chroma signal in units of blocks and coding information relating to an intra prediction mode, the picture coding program causing a computer to execute, when an intra prediction of the picture signal is made in units of coding blocks, in a case where a chroma format is 4:2:2, in a mode for setting a chroma intra prediction mode in accordance with a luma intra prediction mode, setting a chroma intra prediction mode based on the luma intra prediction mode and the chroma format and making an intra prediction of the chroma signal.

[Item 13]

A picture coding program for performing intra prediction coding of a picture signal including a luma signal and a chroma signal in units of blocks and coding information relating to an intra prediction mode, the picture coding program causing a computer to execute:

when an intra prediction of the picture signal is made in units of minimal coding blocks set in advance, in a case where a partition mode in which the luma signal is partitioned horizontally and vertically is set, making an intra prediction of the chroma signal in units of prediction blocks of the intra prediction of the chroma signal within the minimal coding block set in accordance with a chroma format; and constructing a bitstream in which information relating to a luma intra prediction mode of the prediction block of the luma signal and information relating to a chroma intra prediction mode of the prediction block of the chroma signal located at a reference position that is the same as the position of the prediction block of the luma signal are continuous.

[Item 14]

A picture coding program for performing intra prediction coding of a picture signal including a luma signal and a chroma signal in units of blocks and coding information relating to an intra prediction mode, the picture coding program causing a computer to execute:

when an intra prediction of the picture signal is made in units of minimal coding blocks set in advance, in a case where a partition mode in which the luma signal is partitioned horizontally and vertically is set, setting prediction blocks of first to fourth luma signals acquired by partitioning the luma signal of the minimal coding block horizontally and vertically and predicting a luma signal based on neighboring blocks of coded luma signals in accordance with a luma intra prediction mode for each prediction block of the luma signal;

in a case where the partition mode is set, and a chroma format is 4:4:4, setting prediction blocks of first to fourth chroma signals acquired by partitioning the chroma signal of the minimal coding block horizontally and vertically and predicting the chroma signal based on neighboring blocks of coded chroma signals in accordance with a chroma intra prediction mode for each prediction block of the chroma signal; and constructing a bitstream by coding information relating to the prediction mode of the minimal coding block, wherein, in the setting of prediction blocks and predicting of the chroma signal, in a case where the chroma format is 4:4:4, in a mode for setting the chroma intra prediction mode in accordance with the luma intra prediction mode, chroma intra prediction modes of the prediction blocks of first, second, third, and fourth chroma signals are set by using values representing the luma intra prediction modes of the prediction blocks of the first, second, third, and fourth luma signals within the minimal coding block as values representing the chroma intra prediction modes of the prediction blocks of the first, second, third, and fourth chroma signals within the minimal coding block that are located at respective same reference positions.

[Item 15]

A picture coding program for performing intra prediction coding of a picture signal including a luma signal and a chroma signal in units of blocks and coding information relating to an intra prediction mode, the picture coding program causing a computer to execute:

when an intra prediction of the picture signal is made in units of minimal coding blocks set in advance, in a case where a partition mode in which the luma signal is partitioned horizontally and vertically is set, setting prediction blocks of first to fourth luma signals acquired by partitioning the luma signal of the minimal coding block horizontally and vertically and predicting a luma signal based on neighboring blocks of coded luma signals in accordance with a luma intra prediction mode for each prediction block of the luma signal;

in a case where the partition mode is set, and a chroma format is 4:2:2, setting prediction blocks of first and second chroma signals acquired by horizontally partitioning the chroma signal of the minimal coding block and predicting the chroma signal based on neighboring blocks of coded chroma signals in accordance with a chroma intra prediction mode for each prediction block of the chroma signal; and constructing a bitstream by coding information relating to the prediction mode of the minimal coding block, wherein, in the setting of prediction blocks and predicting of the chroma signal, in a case where the chroma format is 4:2:2, in a mode for setting the chroma intra prediction mode in accordance with the luma intra prediction mode, chroma intra prediction modes of the prediction blocks of the first and second chroma signals are set by converting values representing the luma intra prediction modes of the prediction blocks of the first and third luma signals within the minimal coding block into values representing the chroma intra prediction modes of the prediction blocks of the first and second chroma signals within the minimal coding block that are located at respective same reference positions in accordance with a conversion rule set in advance.

[Item 16]

A picture decoding device that performs intra prediction decoding of a picture signal including a luma signal and a chroma signal in units of blocks by decoding information relating to an intra prediction mode, the picture decoding device including: an intra prediction unit that, when an intra prediction of the picture signal is made in units of coding blocks, in a case where a chroma format is 4:2:2, in a mode for setting a chroma intra prediction mode in accordance with a luma intra prediction mode, sets a chroma intra prediction mode based on the luma intra prediction mode and the chroma format and makes an intra prediction of the chroma signal.

[Item 17]

The picture decoding device described in Item 16, wherein, in a case where the chroma format is 4:2:2, in the mode for setting the chroma intra prediction mode in accordance with the luma intra prediction mode, the intra prediction unit sets the chroma intra prediction mode having a prediction direction acquired by converting a prediction direction of the luma intra prediction mode into a direction according to the chroma format and makes the intra prediction of the chroma signal.

[Item 18]

A picture decoding device that performs intra prediction decoding of a picture signal including a luma signal and a chroma signal in units of blocks by decoding information relating to an intra prediction mode, the picture decoding device including:

a bitstream decoding unit that consecutively decodes information relating to a luma intra prediction mode of a prediction block of a luma signal and information relating to a chroma intra prediction mode of a prediction block of a chroma signal based on a bitstream in which the information relating to the luma intra prediction mode of the prediction block of the luma signal and the information relating to the chroma intra prediction mode of the prediction block of the chroma signal located at a reference position that is the same as the position of the prediction block of the luma signal are continuous; and an intra prediction unit that, when an intra prediction of the picture signal is made in units of minimal decoding blocks set in advance, in a case where a partition mode in which the luma signal is partitioned horizontally and vertically is set, makes an intra prediction of the chroma signal based on the decoded chroma intra prediction mode in units of prediction blocks of the intra prediction of the chroma signal within the minimal decoding block set in accordance with a chroma format.

[Item 19]

A picture decoding device that performs intra prediction decoding of a picture signal including a luma signal and a chroma signal in units of blocks by decoding information relating to an intra prediction mode, the picture decoding device including:

a bitstream decoding unit that derives a partition mode in which the luma signal is partitioned horizontally and vertically when an intra prediction of a picture signal is made in units of minimal decoding blocks set in advance and decodes information relating to a luma intra prediction mode for each prediction block of the luma signal and information relating to a chroma intra prediction mode for each prediction block of the chroma signal based on a bitstream in which coding information relating to the prediction mode is arranged;

a luma signal intra prediction unit that, in a case where the partition mode is set, sets prediction blocks of first to fourth luma signals acquired by partitioning the luma signal of the minimal decoding block horizontally and vertically and predicts the luma signal based on the neighboring blocks of decoded luma signals in accordance with each luma intra prediction mode acquired based on the information relating to the luma intra prediction mode for each prediction block of the decoded luma signal; and a chroma signal intra prediction unit that, in a case where the partition mode is set, and a chroma format is 4:4:4, sets prediction blocks of first to fourth chroma signals acquired by partitioning the chroma signal of the minimal decoding block horizontally and vertically and predicts the chroma signal based on neighboring blocks of decoded chroma signals in accordance with each chroma intra prediction mode that is acquired based on the information relating to the chroma intra prediction mode for each prediction block of the decoded chroma signal, wherein the chroma signal intra prediction unit, in a case where the chroma format is 4:4:4 and a mode for setting the chroma intra prediction mode in accordance with the luma intra prediction mode is designated based on the information relating to the chroma intra prediction mode for each prediction block of the decoded chroma signal, sets chroma intra prediction modes of the prediction blocks of the first, second, third, and fourth chroma signals by using values representing the luma intra prediction modes of the prediction blocks of the first, second, third, and fourth luma signals within the minimal decoding block as values representing the chroma intra prediction modes of the prediction blocks of the first, second, third, and fourth chroma signals within the minimal decoding block that are located at respective same reference positions.

[Item 20]

The picture decoding device described in Item 19, wherein, in a case where the partition mode is derived, and the chroma format is 4:4:4, the bitstream decoding unit, based on a bitstream in which coding information relating to the prediction modes is arranged in order of, within the minimal decoding block, the luma intra prediction mode of the prediction block of first luma signal, the chroma intra prediction mode of the prediction block of first chroma signal located at a reference position that is the same as the position of the prediction block of the first luma signal, the luma intra prediction mode of the prediction block of second luma signal, the chroma intra prediction mode of the prediction block of second chroma signal located at a reference position that is the same as the position of the prediction block of the second luma signal, the luma intra prediction mode of the prediction block of third luma signal, the chroma intra prediction mode of the prediction block of third chroma signal located at a reference position that is the same as the position of the prediction block of the third luma signal, the luma intra prediction mode of the prediction block of fourth luma signal, and the chroma intra prediction mode of the prediction block of fourth chroma signal located at a reference position that is the same as the position of the prediction block of the fourth luma signal, decodes the information relating to the luma intra prediction mode of the prediction block of the luma signal and the information relating to the chroma intra prediction mode of the prediction block of the chroma signal in this order.

[Item 21]

A picture decoding device that performs intra prediction decoding of a picture signal including a luma signal and a chroma signal in units of blocks by decoding information relating to an intra prediction mode, the picture decoding device including:

a bitstream decoding unit that derives a partition mode in which the luma signal is partitioned horizontally and vertically when an intra prediction of a picture signal is made in units of minimal decoding blocks set in advance and decodes information relating to a luma intra prediction mode for each prediction block of the luma signal and information relating to a chroma intra prediction mode for each prediction block of the chroma signal based on a bitstream in which coding information relating to the prediction mode is arranged;

a luma signal intra prediction unit that, in a case where the partition mode is set, sets prediction blocks of first to fourth luma signals acquired by partitioning the luma signal of the minimal decoding block horizontally and vertically and predicts the luma signal based on neighboring blocks of decoded luma signals in accordance with each luma intra prediction mode acquired based on the information relating to the luma intra prediction mode for each prediction block of the decoded luma signal; and a chroma signal intra prediction unit that, in a case where the partition mode is set, and a chroma format is 4:2:2, sets prediction blocks of first and second chroma signals acquired by partitioning the chroma signal of the minimal decoding block horizontally and vertically and predicts the chroma signal based on neighboring blocks of decoded chroma signals in accordance with each chroma intra prediction mode that is acquired based on the information relating to the chroma intra prediction mode for each prediction block of the decoded chroma signal, wherein the chroma signal intra prediction unit, in a case where the chroma format is 4:2:2 and a mode for setting the chroma intra prediction mode in accordance with the luma intra prediction mode is designated based on the information relating to the chroma intra prediction mode for each prediction block of the decoded chroma signal, sets chroma intra prediction modes of the prediction blocks of the first and second chroma signals by converting values representing the luma intra prediction modes of the prediction blocks of the first and third luma signals within the minimal decoding block into values representing the chroma intra prediction modes of the prediction blocks of the first and second chroma signals within the minimal decoding block that are located at respective same reference positions in accordance with a conversion rule set in advance.

[Item 22]

The picture decoding device described in Item 21, wherein, in a case where the partition mode is derived, and the chroma format is 4:2:2, the bitstream decoding unit, based on the bitstream in which the coding information relating to the prediction modes is arranged in order of, within the minimal decoding block, the luma intra prediction mode of the prediction block of the first luma signal, the chroma intra prediction mode of the prediction block of the first chroma signal located at a reference position that is the same as the position of the prediction block of the first luma signal, the luma intra prediction mode of the prediction block of the second luma signal, the luma intra prediction mode of the prediction block of the third luma signal, the chroma intra prediction mode of the prediction block of the second chroma signal located at a reference position that is the same as the position of the prediction block of the third luma signal, and the luma intra prediction mode of the prediction block of the fourth luma signal, decodes the information relating to the luma intra prediction mode of the prediction block of the luma signal and the information relating to the chroma intra prediction mode of the prediction block of the chroma signal in this order.

[Item 23]

A picture decoding method for performing intra prediction decoding of a picture signal including a luma signal and a chroma signal in units of blocks by decoding information relating to an intra prediction mode, the picture decoding method including, when an intra prediction of the picture signal is made in units of coding blocks, in a case where a chroma format is 4:2:2, in a mode for setting a chroma intra prediction mode in accordance with a luma intra prediction mode, setting a chroma intra prediction mode based on the luma intra prediction mode and the chroma format and making an intra prediction of the chroma signal.

[Item 24]

A picture decoding method for performing intra prediction decoding of a picture signal including a luma signal and a chroma signal in units of blocks by decoding information relating to an intra prediction mode, the picture decoding method including:

consecutively decoding information relating to a luma intra prediction mode of a prediction block of a luma signal and information relating to a chroma intra prediction mode of a prediction block of a chroma signal based on a bitstream in which the information relating to the luma intra prediction mode of the prediction block of the luma signal and the information relating to the chroma intra prediction mode of the prediction block of the chroma signal located at a reference position that is the same as the position of the prediction block of the luma signal are continuous; and when an intra prediction of the picture signal is made in units of minimal decoding blocks set in advance, in a case where a partition mode in which the luma signal is partitioned horizontally and vertically is set, making an intra prediction of the chroma signal based on the decoded chroma intra prediction mode in units of prediction blocks of the intra prediction of the chroma signal within the minimal decoding block set in accordance with a chroma format.

[Item 25]

A picture decoding method for performing intra prediction decoding of a picture signal including a luma signal and a chroma signal in units of blocks by decoding information relating to an intra prediction mode, the picture decoding method including:

deriving a partition mode in which the luma signal is partitioned horizontally and vertically when an intra prediction of a picture signal is made in units of minimal decoding blocks set in advance and decoding information relating to a luma intra prediction mode for each prediction block of the luma signal and information relating to a chroma intra prediction mode for each prediction block of the chroma signal based on a bitstream in which coding information relating to the prediction mode is arranged;

in a case where the partition mode is set, setting prediction blocks of first to fourth luma signals acquired by partitioning the luma signal of the minimal decoding block horizontally and vertically and predicting the luma signal based on the neighboring blocks of decoded luma signals in accordance with each luma intra prediction mode acquired based on the information relating to the luma intra prediction mode for each prediction block of the decoded luma signal; and in a case where the partition mode is set, and a chroma format is 4:4:4, setting prediction blocks of first to fourth chroma signals acquired by partitioning the chroma signal of the minimal decoding block horizontally and vertically and predicting the chroma signal based on neighboring blocks of decoded chroma signals in accordance with each chroma intra prediction mode that is acquired based on the information relating to the chroma intra prediction mode for each prediction block of the decoded chroma signal, wherein, in the setting of prediction blocks and predicting of the chroma signal, in a case where the chroma format is 4:4:4 and a mode for setting the chroma intra prediction mode in accordance with the luma intra prediction mode is designated based on the information relating to the chroma intra prediction mode for each prediction block of the decoded chroma signal, chroma intra prediction modes of prediction blocks of the first, second, third, and fourth chroma signals are set by using values representing the luma intra prediction modes of the prediction blocks of the first, second, third, and fourth luma signals within the minimal decoding block as values representing the chroma intra prediction modes of the prediction blocks of the first, second, third, and fourth chroma signals within the minimal decoding block that are located at respective same reference positions.

[Item 26]

A picture decoding method for performing intra prediction decoding of a picture signal including a luma signal and a chroma signal in units of blocks by decoding information relating to an intra prediction mode, the picture decoding method including:

deriving a partition mode in which the luma signal is partitioned horizontally and vertically when an intra prediction of a picture signal is made in units of minimal decoding blocks set in advance and decoding information relating to a luma intra prediction mode for each prediction block of the luma signal and information relating to a chroma intra prediction mode for each prediction block of the chroma signal based on a bitstream in which coding information relating to the prediction mode is arranged;

in a case where the partition mode is set, setting prediction blocks of first to fourth luma signals acquired by partitioning the luma signal of the minimal decoding block horizontally and vertically and predicting the luma signal based on neighboring blocks of decoded luma signals in accordance with each luma intra prediction mode acquired based on the information relating to the luma intra prediction mode for each prediction block of the decoded luma signal; and in a case where the partition mode is set, and a chroma format is 4:2:2, setting prediction blocks of first and second chroma signals acquired by partitioning the chroma signal of the minimal decoding block horizontally and vertically and predicting the chroma signal based on neighboring blocks of decoded chroma signals in accordance with each chroma intra prediction mode that is acquired based on the information relating to the chroma intra prediction mode for each prediction block of the decoded chroma signal, wherein, in the setting of prediction blocks and predicting of the chroma signal, in a case where the chroma format is 4:2:2 and a mode for setting the chroma intra prediction mode in accordance with the luma intra prediction mode is designated based on the information relating to the chroma intra prediction mode for each prediction block of the decoded chroma signal, chroma intra prediction modes of the prediction blocks of the first and second chroma signals are set by converting values representing the luma intra prediction modes of the prediction blocks of the first and third luma signals within the minimal decoding block into values representing the chroma intra prediction modes of the prediction blocks of the first and second chroma signals within the minimal decoding block that are located at respective same reference positions in accordance with a conversion rule set in advance.

[Item 27]

A picture decoding program for performing intra prediction decoding of a picture signal including a luma signal and a chroma signal in units of blocks by decoding information relating to an intra prediction mode, the picture decoding program causing a computer to execute, when an intra prediction of the picture signal is made in units of coding blocks, in a case where a chroma format is 4:2:2, in a mode for setting a chroma intra prediction mode in accordance with a luma intra prediction mode, setting a chroma intra prediction mode based on the luma intra prediction mode and the chroma format and making an intra prediction of the chroma signal.

[Item 28]

A picture decoding program for performing intra prediction decoding of a picture signal including a luma signal and a chroma signal in units of blocks by decoding information relating to an intra prediction mode, the picture decoding program causing a computer to execute:

consecutively decoding information relating to a luma intra prediction mode of a prediction block of a luma signal and information relating to a chroma intra prediction mode of a prediction block of a chroma signal based on a bitstream in which the information relating to the luma intra prediction mode of the prediction block of the luma signal and the information relating to the chroma intra prediction mode of the prediction block of the chroma signal located at a reference position that is the same as the position of the prediction block of the luma signal are continuous; and when an intra prediction of the picture signal is made in units of minimal decoding blocks set in advance, in a case where a partition mode in which the luma signal is partitioned horizontally and vertically is set, making an intra prediction of the chroma signal based on the decoded chroma intra prediction mode in units of prediction blocks of the intra prediction of the chroma signal within the minimal decoding block set in accordance with a chroma format.

[Item 29]

A picture decoding program for performing intra prediction decoding of a picture signal including a luma signal and a chroma signal in units of blocks by decoding information relating to an intra prediction mode, the picture decoding program causing a computer to execute:

deriving a partition mode in which the luma signal is partitioned horizontally and vertically when an intra prediction of a picture signal is made in units of minimal decoding blocks set in advance and decoding information relating to a luma intra prediction mode for each prediction block of the luma signal and information relating to a chroma intra prediction mode for each prediction block of the chroma signal based on a bitstream in which coding information relating to the prediction mode is arranged;

in a case where the partition mode is set, setting prediction blocks of first to fourth luma signals acquired by partitioning the luma signal of the minimal decoding block horizontally and vertically and predicting the luma signal based on the neighboring blocks of decoded luma signals in accordance with each luma intra prediction mode acquired based on the information relating to the luma intra prediction mode for each prediction block of the decoded luma signal; and in a case where the partition mode is set, and a chroma format is 4:4:4, setting prediction blocks of first to fourth chroma signals acquired by partitioning the chroma signal of the minimal decoding block and predicting the chroma signal based on neighboring blocks of decoded chroma signals in accordance with each chroma intra prediction mode that is acquired based on the information relating to the chroma intra prediction mode for each prediction block of the decoded chroma signal, wherein, in the setting of prediction blocks and predicting of the chroma signal, in a case where the chroma format is 4:4:4 and a mode for setting the chroma intra prediction mode in accordance with the luma intra prediction mode is designated based on the information relating to the chroma intra prediction mode for each prediction block of the decoded chroma signal, chroma intra prediction modes of the prediction blocks of the first, second, third, and fourth chroma signals are set by using values representing the luma intra prediction modes of the prediction blocks of the first, second, third, and fourth luma signals within the minimal decoding block as values representing the chroma intra prediction modes of the prediction blocks of the first, second, third, and fourth chroma signals within the minimal decoding block that are located at respective same reference positions.

[Item 30]

A picture decoding program for performing intra prediction decoding of a picture signal including a luma signal and a chroma signal in units of blocks by decoding information relating to an intra prediction mode, the picture decoding program causing a computer to execute:

deriving a partition mode in which the luma signal is partitioned horizontally and vertically when an intra prediction of a picture signal is made in units of minimal decoding blocks set in advance and decoding information relating to a luma intra prediction mode for each prediction block of the luma signal and information relating to a chroma intra prediction mode for each prediction block of the chroma signal based on a bitstream in which coding information relating to the prediction mode is arranged;

in a case where the partition mode is set, setting prediction blocks of first to fourth luma signals acquired by partitioning the luma signal of the minimal decoding block horizontally and vertically and predicting the luma signal based on neighboring blocks of decoded luma signals in accordance with each luma intra prediction mode acquired based on the information relating to the luma intra prediction mode for each prediction block of the decoded luma signal; and in a case where the partition mode is set, and a chroma format is 4:2:2, setting prediction blocks of first and second chroma signals acquired by partitioning the chroma signal of the minimal decoding block horizontally and vertically and predicting the chroma signal based on neighboring blocks of decoded chroma signals in accordance with each chroma intra prediction mode that is acquired based on the information relating to the chroma intra prediction mode for each prediction block of the decoded chroma signal, wherein, in the setting of prediction blocks and predicting of the chroma signal, in a case where the chroma format is 4:2:2 and a mode for setting the chroma intra prediction mode in accordance with the luma intra prediction mode is designated based on the information relating to the chroma intra prediction mode for each prediction block of the decoded chroma signal, chroma intra prediction modes of the first and second chroma signals are set by converting values representing the luma intra prediction modes of the prediction blocks of the first and third luma signals within the minimal decoding block into values representing the chroma intra prediction modes of the prediction blocks of the first and second chroma signals within the minimal decoding block that are located at respective same reference positions in accordance with a conversion rule set in advance.

[Item 31]

A picture decoding device that performs intra prediction decoding of a picture signal including a luma signal and a chroma signal in units of blocks by decoding information relating to an intra prediction mode, the picture decoding device including:

a luma intra prediction mode derivation unit that derives a value of a luma intra prediction mode; and an intra prediction mode derivation unit that derives a value of a chroma intra prediction mode from a conversion table representing a value of the chroma intra prediction mode having a chroma format of 4:2:2 based on a value of the luma intra prediction mode of a prediction block located at a same position as the position of a prediction block of the chroma signal, which is derived by the luma intra prediction mode derivation unit, in a case where the chroma format is 4:2:2 and derives a value of the chroma intra prediction mode based on a value of the luma intra prediction mode of a prediction block located at a same position as the position of a prediction block of the chroma signal without using the conversion table in a case where the chroma format is not 4:2:2.

[Item 32]

The picture decoding device described in Item 31, wherein, in the conversion table, at least values representing a plurality of chroma intra prediction modes in prediction directions that are respectively closest to a plurality of directions derived by scaling ½ times of prediction directions of a plurality of luma intra prediction modes in which reference destinations are aligned in a horizontal direction in the horizontal direction.

What is claimed is:

1. A picture coding device that performs intra prediction coding of a picture signal including a luma signal and a chroma signal in units of blocks and codes information relating to an intra prediction mode, the picture coding device comprising:

when a chroma format is 4:2:0, and a partition mode is a mode indicating that a coding target block in a luma signal is partitioned to first to fourth blocks of luma signals horizontally and vertically, and the coding target block in a chroma signal is a minimum size without being partitioned, a luma signal intra prediction unit configured to set the first to fourth blocks of luma signals acquired by partitioning the coding target block of luma signals horizontally and vertically and predict a luma signal based on a coded neighboring block of luma signals in accordance with luma intra prediction modes of the first to fourth blocks of luma signals;

a chroma signal intra prediction unit configured to set a fifth block of chroma signals without partitioning the coding target block of chroma signals and predict a chroma signal based on a coded neighboring block of chroma signals in accordance with a chroma intra prediction mode;

a syntax element calculating unit relating to a luma intra prediction mode configured to calculate each of a syntax element relating to the luma intra prediction mode of the first to fourth blocks of luma signals from each of a value of the luma intra prediction mode of the first to fourth blocks of luma signals, respectively;

a syntax element calculating unit relating to a chroma intra prediction mode configured to calculate a syntax element relating to the chroma intra prediction mode of the fifth block of chroma signals; and a bitstream constructing unit configured to code the syntax element relating to the luma intra prediction mode of the first block of luma signals, and subsequently code the syntax element relating to the chroma intra prediction mode of the fifth block of chroma signals, and subsequently code the syntax element relating to the luma intra prediction mode of the second block of luma signals, the syntax element relating to the luma intra prediction mode of the third block of luma signals, and the syntax element relating to the luma intra prediction mode of the fourth block of luma signals, wherein the chroma signal intra prediction unit is further configured to be able to set a value indicating horizontal prediction in which a prediction direction is a horizontal direction as one of predefined values of the chroma intra prediction mode of the prediction block of the chroma signals, in accordance with the value of the syntax element relating to the chroma intra prediction mode of the prediction block of chroma signals.

2. A picture coding method for performing intra prediction coding of a picture signal including a luma signal and a chroma signal in units of blocks and coding information relating to an intra prediction mode, the picture coding method comprising:

when a chroma format is 4:2:0, and a partition mode is a mode indicating that a coding target block in a luma signal is partitioned to first to fourth blocks of luma signals horizontally and vertically, and the coding target block in a chroma signal is a minimum size without being partitioned, a luma signal intra prediction step of setting the first to fourth blocks of luma signals acquired by partitioning the coding target block of luma signals horizontally and vertically and predicting a luma signal based on a coded neighboring block of luma signals in accordance with luma intra prediction modes of the first to fourth blocks of luma signals;

a chroma signal intra prediction step of setting a fifth block of chroma signals without partitioning the coding target block of chroma signals and predicting a chroma signal based on a coded neighboring block of chroma signals in accordance with a chroma intra prediction mode;

a syntax element calculating step relating to a luma intra prediction mode of calculating each of a syntax element relating to the luma intra prediction mode of the first to fourth blocks of luma signals from each of a value of the luma intra prediction mode of the first to fourth blocks of luma signals, respectively;

a syntax element calculating step relating to a chroma intra prediction mode of calculating a syntax element relating to the chroma intra prediction mode of the fifth block of chroma signals; and a bitstream constructing step of coding the syntax element relating to the luma intra prediction mode of the first block of luma signals, and subsequently coding the syntax element relating to the chroma intra prediction mode of the fifth block of chroma signals, and subsequently coding the syntax element relating to the luma intra prediction mode of the second block of luma signals, the syntax element relating to the luma intra prediction mode of the third block of luma signals, and the syntax element relating to the luma intra prediction mode of the fourth block of luma signals, wherein the chroma signal intra prediction step is operable to be able to set a value indicating horizontal prediction in which a prediction direction is a horizontal direction as one of predefined values of the chroma intra prediction mode of the prediction block of the chroma signals, in accordance with the value of the syntax element relating to the chroma intra prediction mode of the prediction block of chroma signals.

3. A non-transitory computer-readable recording medium having embodied thereon a picture coding program for performing intra prediction coding of a picture signal including a luma signal and a chroma signal in units of blocks and coding information relating to an intra prediction mode, the picture coding program causing a computer to execute:

when a chroma format is 4:2:0, and a partition mode is a mode indicating that a coding target block in a luma signal is partitioned to first to fourth blocks of luma signals horizontally and vertically, and the coding target block in a chroma signal is a minimum size without being partitioned, a luma signal intra prediction step of setting the first to fourth blocks of luma signals acquired by partitioning the coding target block of luma signals horizontally and vertically and predicting a luma signal based on a coded neighboring block of luma signals in accordance with luma intra prediction modes of the first to fourth blocks of luma signals;

a chroma signal intra prediction step of setting a fifth block of chroma signals without partitioning the coding target block of chroma signals and predicting a chroma signal based on a coded neighboring block of chroma signals in accordance with a chroma intra prediction mode;

a syntax element calculating step relating to a luma intra prediction mode of calculating each of a syntax element relating to the luma intra prediction mode of the first to fourth blocks of luma signals from each of a value of the luma intra prediction mode of the first to fourth blocks of luma signals, respectively;

a syntax element calculating step relating to a chroma intra prediction mode of calculating a syntax element relating to the chroma intra prediction mode of the fifth block of chroma signals; and a bitstream constructing step of coding the syntax element relating to the luma intra prediction mode of the first block of luma signals, and subsequently coding the syntax element relating to the chroma intra prediction mode of the fifth block of chroma signals, and subsequently coding the syntax element relating to the luma intra prediction mode of the second block of luma signals, the syntax element relating to the luma intra prediction mode of the third block of luma signals, and the syntax element relating to the luma intra prediction mode of the fourth block of luma signals, wherein the chroma signal intra prediction step is operable to be able to set a value indicating horizontal prediction in which a prediction direction is a horizontal direction as one of predefined values of the chroma intra prediction mode of the prediction block of the chroma signals, in accordance with the value of the syntax element relating to the chroma intra prediction mode of the prediction block of chroma signals.

* * * * *